US00RE46934E

(19) United States
(12) Reissued Patent
Ishikawa et al.

(10) Patent Number: US RE46,934 E
(45) Date of Reissued Patent: *Jul. 3, 2018

(54) SLOT MACHINE WITH LIGHTED SATELLITE SPEAKERS

(71) Applicant: UNIVERSAL ENTERTAINMENT CORPORATION, Koto-ku, Tokyo (JP)

(72) Inventors: Masato Ishikawa, Tokyo (JP); Yasuaki Tanabe, Tokyo (JP)

(73) Assignee: Universal Entertainment Corporation, Koto-Ku, Tokyo (JP)

( * ) Notice: This patent is subject to a terminal disclaimer.

(21) Appl. No.: 14/963,012

(22) Filed: Dec. 8, 2015

Related U.S. Patent Documents

Reissue of:
(64) Patent No.: 8,690,686
Issued: Apr. 8, 2014
Appl. No.: 11/756,928
Filed: Jun. 1, 2007

(30) Foreign Application Priority Data

Jun. 9, 2006 (JP) ..... P2006-161660

(51) Int. Cl.
*G07F 17/32* (2006.01)

(52) U.S. Cl.
CPC ..... *G07F 17/32* (2013.01); *G07F 17/3202* (2013.01); *G07F 17/3216* (2013.01)

(58) Field of Classification Search
CPC ... G07F 17/32; G07F 17/3216; G07F 17/3202
USPC ..... 463/30, 31, 35, 46
See application file for complete search history.

(56) References Cited

U.S. PATENT DOCUMENTS

| | | | | |
|---|---|---|---|---|
| 5,813,914 | A * | 9/1998 | McKay et al. | 463/46 |
| 6,227,968 | B1 * | 5/2001 | Suzuki et al. | 463/7 |
| 6,334,612 | B1 | 1/2002 | Wurz et al. | |
| 6,379,244 | B1 * | 4/2002 | Sagawa et al. | 463/7 |
| 6,475,087 | B1 * | 11/2002 | Cole | 463/20 |
| 6,491,298 | B1 * | 12/2002 | Criss-Puszkiewicz et al. | 273/148 R |
| 7,476,154 | B2 * | 1/2009 | Kogo | A63F 13/08 434/227 |
| 7,699,315 | B2 | 4/2010 | Hirato et al. | |
| 2003/0060280 | A1 * | 3/2003 | Oles et al. | 463/29 |
| 2003/0109298 | A1 * | 6/2003 | Oishi et al. | 463/8 |
| 2003/0130026 | A1 * | 7/2003 | Breckner et al. | 463/20 |
| 2004/0171426 | A1 * | 9/2004 | Nagano | 463/46 |
| 2005/0049043 | A1 | 3/2005 | Crivelli et al. | |
| 2005/0282631 | A1 * | 12/2005 | Bonney et al. | 463/35 |
| 2006/0025206 | A1 * | 2/2006 | Walker et al. | 463/20 |
| 2007/0287527 | A1 | 12/2007 | Tanabe et al. | |

(Continued)

OTHER PUBLICATIONS

Office Action, European Pat. App. No. EP 07011121.6, dated Jan. 18, 2011.

(Continued)

*Primary Examiner* — Joseph Kaufman
(74) *Attorney, Agent, or Firm* — Simpson & Simpson, PLLC; S. Peter Konzel

(57) ABSTRACT

In the gaming machine, an effect producing unit is disposed behind the opened door which protrudes laterally outside the side face plane of the cabinet. The effect producing unit is disposed in the space between the cabinets of adjacent gaming machines so that the space can be efficiently utilized. In addition, the effects of the gaming machine can be enhanced since the effect producing unit produces the attractive effects to a game.

13 Claims, 46 Drawing Sheets

(56) References Cited

U.S. PATENT DOCUMENTS

| | | | |
|---|---|---|---|
| 2007/0287528 | A1 | 12/2007 | Hirato et al. |
| 2007/0287543 | A1 | 12/2007 | Tanabe et al. |
| 2007/0287544 | A1 | 12/2007 | Hirato et al. |
| 2008/0153569 | A1 | 6/2008 | Tanabe |

OTHER PUBLICATIONS

Dance Dance Revolution Operators Manual; Konami, 1998; pp. 1, 8-10, 12, 13, 24, 42, 43, 46, 48; 13 pages.
U.S. Appl. No. 11/753,765, filed May 25, 2007, Hirato, et al.
U.S. Appl. No. 11/753,692, filed May 25, 2007, Tanabe.
U.S. Appl. No. 11/757,136, filed Jun. 1, 2007, Tanabe.
U.S. Appl. No. 11/757,606, filed Jun. 4, 2007, Tanabe, et al.
U.S. Appl. No. 11/757,785, filed Jun. 4, 2007, Hirato, et al.
U.S. Appl. No. 11/757,662, filed Jun. 4, 2007, Hirato, et al.

* cited by examiner

SLOT MACHINE WITH LIGHTED SATELLITE SPEAKERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*MULTIPLE REISSUE APPLICATIONS*

*More than one reissue application has been filed relative to U.S. Pat. No. 8,690,686. In addition to the instant reissue application, identified as U.S. patent application Ser. No. 14/963,012, which was filed on Dec. 8, 2015, a "sibling" reissue application of U.S. Pat. No. 8,690,686, and identified as U.S. patent application Ser. No. 14/963,039, was also filed on Dec. 8, 2015.*

CROSS-REFERENCE TO RELATED APPLICATION

This application is based upon the prior Japanese Patent Application No. 2006-161660, filed on Jun. 9, 2006, the entire contents of which are incorporated herein by reference.

BACKGROUND OF THE INVENTION

1. Field of the Invention

The present invention relates to gaming machines such as a slot machine with symbols aligned in a plurality of columns variably displayed thereon.

2. Description of Related Art

A gaming machine (e.g., a slot machine) is known which rotates reels (symbol display device) having a plurality of symbols on their periphery and then stops the rotation of the reels to rearrange the symbols. As the symbol display device built in such a gaming machine rotates the reels mechanically to scroll the symbols, or rotates the reels virtually on a display device such as a liquid crystal display or a CRT to scroll the symbols.

With such types of gaming machines (e.g., U.S. Pat. No. 6,334,612), generally, the symbol display device starts a game after insertion of at least one medal or coin (referred to as game media, hereafter) and a predefined start up operation (such as pressing a spin button). Subsequently, termination processing of the scrolling symbols is executed based on the result of lottery executed within the gaming machine. Then, predefined game media are paid out to a player based on the combination of the rearranged symbols.

SUMMARY OF THE INVENTION

In a game arcade such as a casino with such gaming machines, a plurality of gaming machines are installed by forming lines laterally. The gaming machines are disposed at predefined intervals in order to make space for opening front door which is provided on a cabinet of the gaming machine. Hence, useless spaces emerges between the cabinets of adjacent gaming machines.

It is an object of the present invention to provide a gaming machine which can efficiently utilize the spaces between the cabinets of adjacent gaming machines.

A gaming machine of the present invention comprises a cabinet, a door provided on the front face of the cabinet, and an effect producing unit for producing effects to a game. The effect producing unit is disposed behind the opened door which protrudes laterally outside the side face plane of the cabinet.

The gaming machine includes an effect producing unit which produces the effects to the game. The effect producing unit is disposed behind the opened door which protrudes laterally outside the side face plane of the cabinet. Since the effect producing unit is disposed in the space between the cabinets of adjacent gaming machines, the space can be efficiently utilized. The effect producing unit, disposed behind the opened door which protrudes laterally outside the side face plane of the cabinet, does not obstruct the opening and closing of the door. At the same time, the effect producing unit can enhance the effects. Here, the term "effect producing unit" means a unit that produces effects to a game, such as a speaker, a light emitting device, a display or the like. In addition, the door may swing substantially horizontally, or slides substantially horizontally.

It is preferable that the gaming machine further comprises a display installed on the front face of the cabinet for displaying information relating to the game, an operation unit installed on the front face of the cabinet and arranged for a player to input instructions relating to the game. The display is disposed above the operation unit. The effect producing unit is disposed above the operation unit and below the display. In this manner, the effect producing unit can be disposed near the player, whereby the effects to the player can be enhanced.

Further, it is preferable that the front face of the effect producing unit and the front face of the display are parallel. As thus described, the sight line of a spectator who is paying attention to the effect producing unit can be drawn to the display too, by disposing the front face of the effect producing unit and the front face of the display in parallel. As a result, appealing effect of the gaming machine to the spectator around the gaming machine can be enhanced.

Further, it is preferable that the effect producing unit includes a sound source unit which outputs sound. With such an arrangement, the sound effects output from the sound source unit can be produced. Additionally, since the effect producing unit has the sound source unit, the player can concentrate on the game without moving his/her sight line to the sound effect device, unlike illumination effects by a light emitting device or image effects on a display.

Further, it is preferable that the effect producing unit includes a first and a second sound source units each of which outputs sound. The first sound source unit is disposed on one side face of the cabinet, whereas the second sound source unit is disposed on the other side face of the cabinet. At least one of the first and the second sound source units is disposed behind the opened door which protrudes laterally outside the side face plane of the cabinet. As thus described, an interval between the sound source units can be expanded in comparison with prior art models by disposing the sound source units on the both sides of the cabinet. As a result, sound effects (stereo effect, surround effect) by the sound source unit can be enhanced. At the same time, the spaces at both sides of the cabinet can be utilized efficiently. Here, the sounds which are output from the first and the second sound source units, may be the same or may be different from each other.

DETAILED DESCRIPTION OF THE EMBODIMENT

Figure 1:
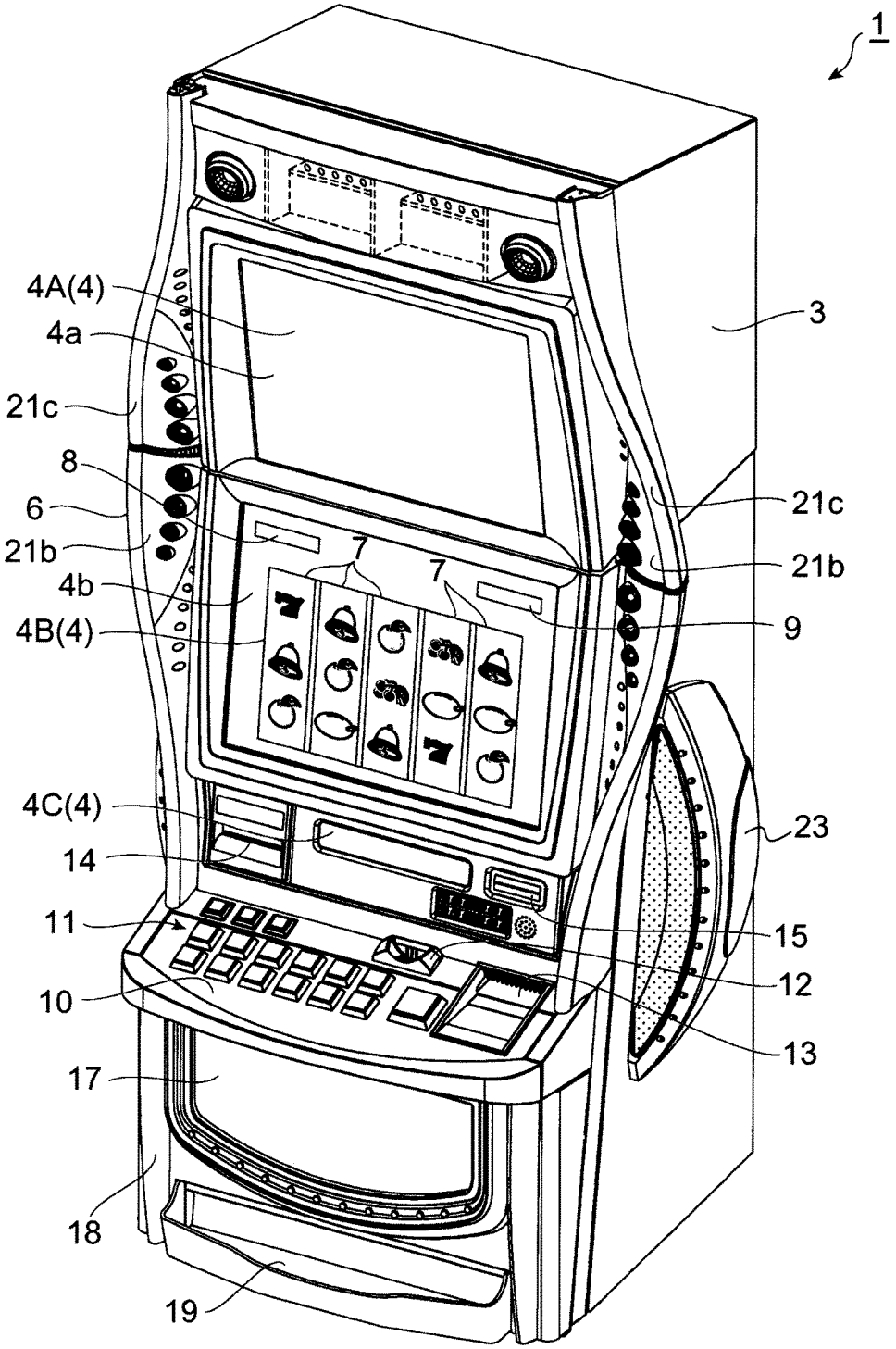
FIG. 1 is a perspective view illustrating an embodiment of the gaming machine according to the present invention.

A preferred embodiment of the gaming machine of the present invention will be described in detail below, referring to the drawings.

Overall Description of the Gaming Machine

Figure 2:
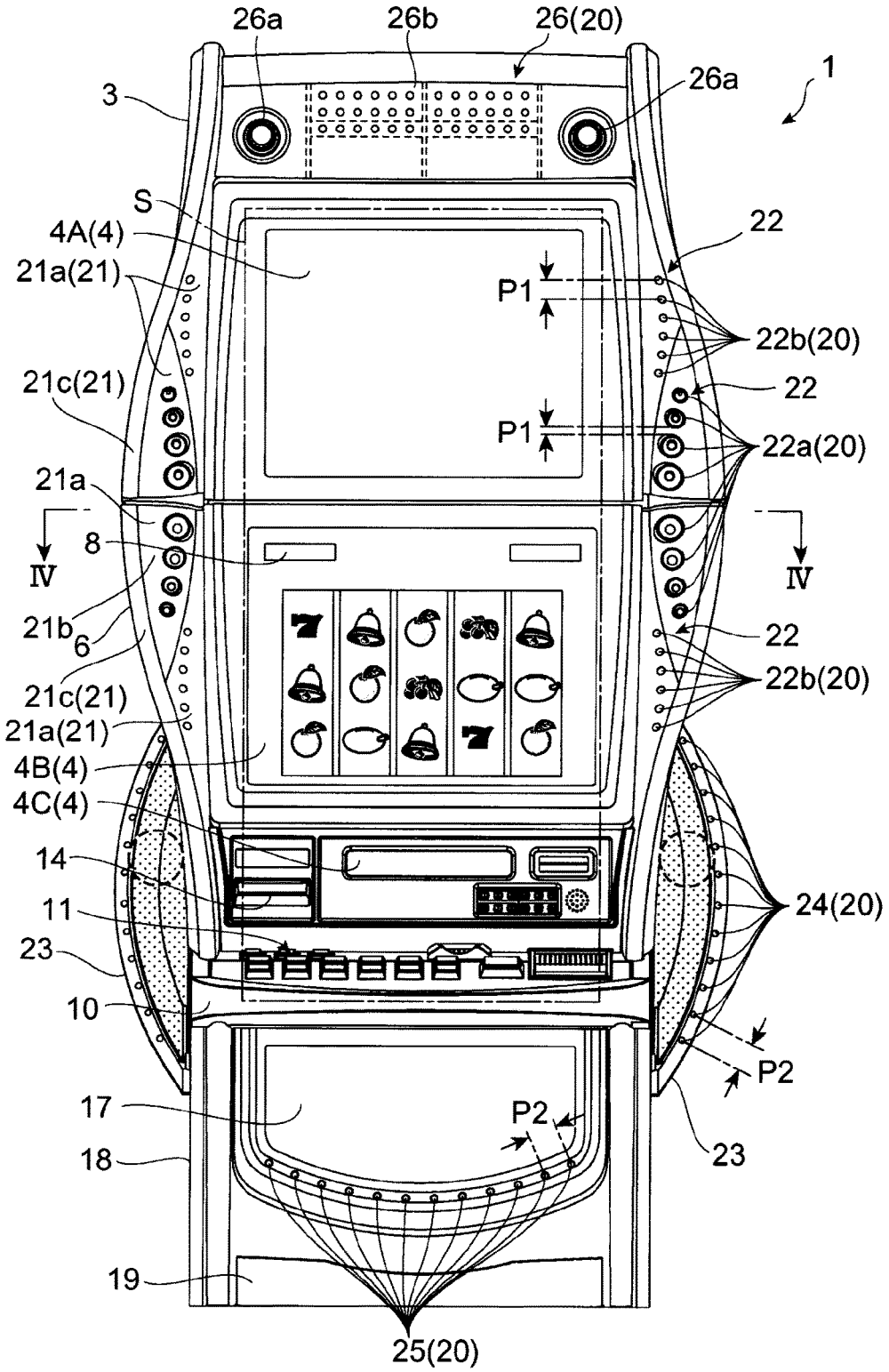
FIG. 2 is a front view of the gaming machine shown in FIG. 1.
Figure 3:
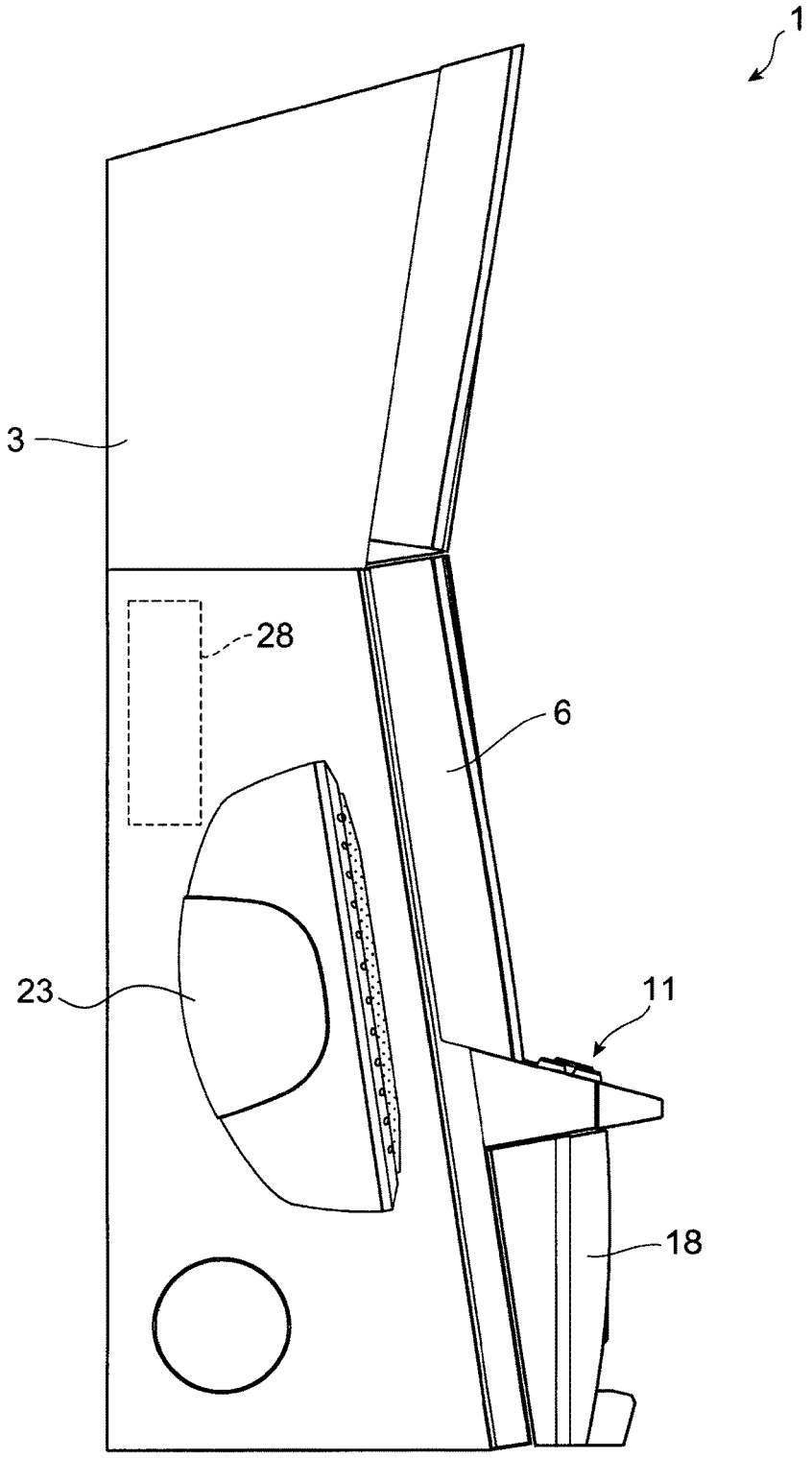
FIG. 3 is a side view of the gaming machine shown in FIG. 1.

As shown in FIGS. 1 to 3, the gaming machine 1 of the present embodiment is an upright-type slot machine, which may be installed in game arcades such as casinos. The gaming machine 1 includes a cabinet 3 for accommodating electric components and mechanical components for executing predefined games. The gaming machine 1, for example, has displays 4 (an upper display 4A, a center display 4B, and a lower display 4C) for displaying gaming information based on the player's operation. The displays 4A to 4C are provided on the front face of the vertically long cabinet 3.

The upper display 4A includes a liquid crystal display (LCD) panel for displaying a game payout table, a game rule, and a notification of a bonus game. The LCD panel is inclined forwardly in order to enhance visibility from the player's eye point positioned at the height of the center display 4B.

The center display 4B is a display panel which the player is mainly watching. The center display 4B is a transmissive LCD panel which is fixed to a front door 6 of the cabinet 3. Five transmissive display windows 7 are provided on the center display 4B. The five-column mechanical reels are disposed inside the cabinet 3. The symbols on the reels are visible from the outside through respective display windows 7. In addition, a plurality of paylines running horizontally and diagonally across the display windows 7 are set on the center display 4B. Motion picture effects are provided on the center display 4B when a winning prize is awarded. Furthermore, a payout counter 8 and a credit counter 9 are provided on the upper area of the center display 4B. The center display 4B is slightly inclined backwardly. The player can watch the screen at ease, since the screen of the center display 4B is watched slightly downward from the player's eye point which is positioned at the height of the center display 4B. Here, although mechanical reels are provided behind the center display 4B so that the symbols are displayed in scrolling or resting state through the display windows 7, the symbols may be displayed in scrolling or resting state on the LCD panel of the center display 4B. The number of reels is not limited to five.

The lower display 4C is an LCD panel for displaying points recorded on the card or game points. The numerical values on the lower display 4C are displayed based on an outcome of the game displayed on the center display 4B. If the symbols align on the center display 4B to award "a winning prize", the game points displayed on the lower display 4C are added based on the winning prize. A ticket printer 14 is provided at the left side on the lower display 4C and a card reader 15 is provided at the right side on the lower display 4C.

An operation table (operation unit) 10 projecting from the front face of the cabinet 3 is provided beneath the lower display 4C. Operation buttons 11 (e.g., bet buttons, collect button, start button, stop button or the like) are arranged on the operation table 10 to be operated by the player. Furthermore, a coin insertion slot 12 and a bill insertion slot 13 are provided on the operation table 10.

A waist panel (effect producing unit) 17 is provided beneath the operation table 10. The waist panel 17 is a plastics panel with images relating to the game printed thereon. The waist panel 17, being fixed to a front sub-door 18, is illuminated by a cold cathode tube (lighting unit) 18b from the rear face. Furthermore, a coin tray 19 is provided beneath the waist panel 17 for storing coins that have been paid out based on the game outcome.

[Illumination]

Figure 7:
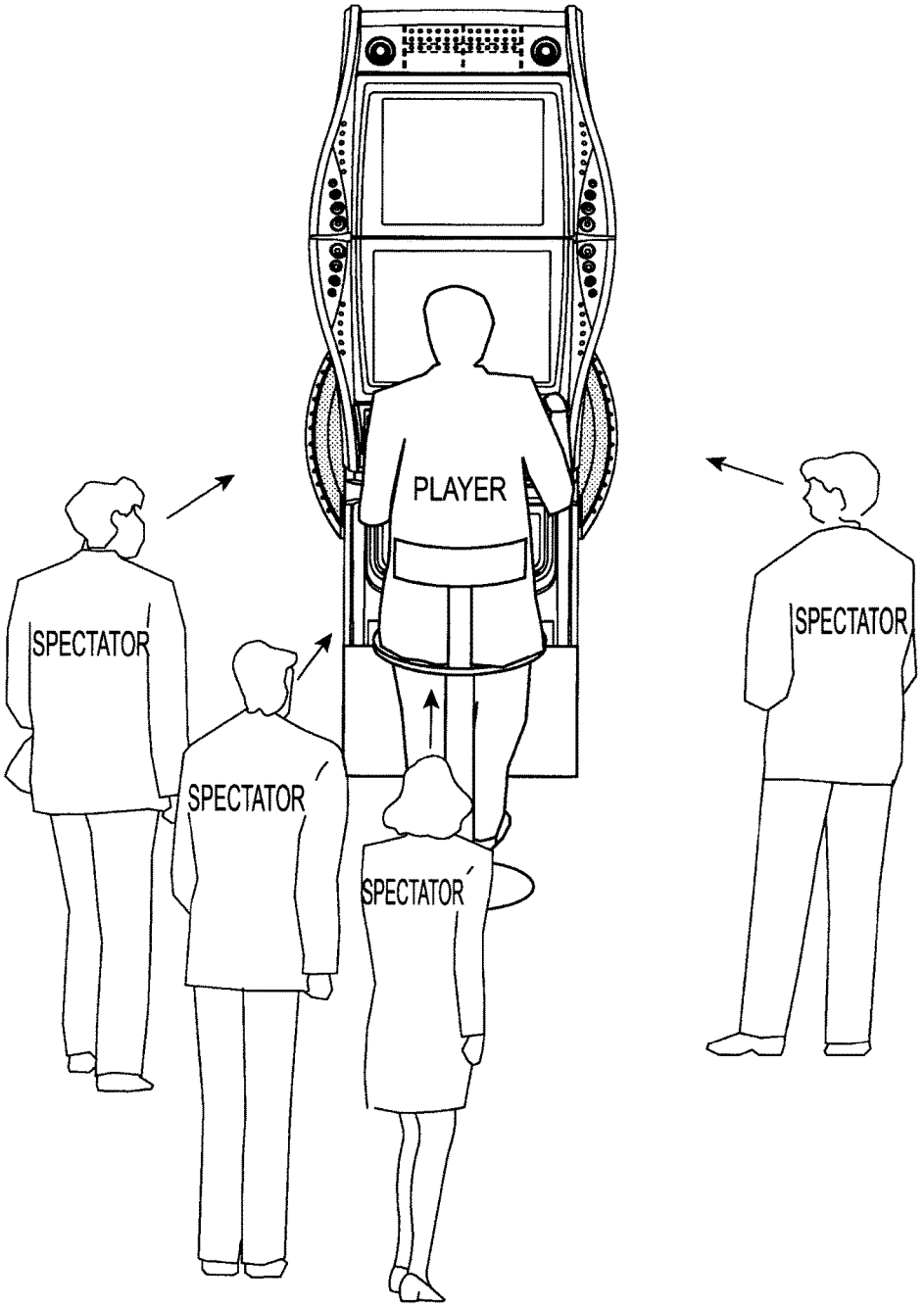
FIG. 7 is a front view illustrating the relationship between a player and spectators positioned in front of the gaming machine.

As shown in FIG. 2, illuminants 20 are disposed on the cabinet 3 such that they surround a gaming region S including the displays 4 (upper display 4A, center display 4B, and lower display 4C) and the operation buttons (control units) 11 on the operation table 10. As shown in FIG. 7, the player's eye point is generally positioned at the height of the center display 4B. The player's eye position is generally at the center of the gaming region S, that is, the gaming region S draws the player's attention best. The illuminants 20 include side lamps 22, speaker lamps 24, under lamps 25, and top lamps 26. The side lamps 22 (22a and 22b), located at the right and left sides of the cabinet 3, are provided on laterally projecting recurved-bow-shaped limbs (illuminating unit) 21. The side lamps 22 are provided along the sides of the upper display 4A and the lower display 4C. The speaker lamps 24, located at the right and left sides of the cabinet 3, are arranged along the edges of laterally projecting arc-shaped speakers 23. The speaker lamps 24 are provided near the sides of the operation table 10. The under lamps 25, provided on the front sub-door 18, are arranged along the lower edge of the waist panel 17. The top lamps 26 (26a and 26b) are provided above the upper display 4A. These illuminants 20 produce attractive illumination by controlling light emission.

Figure 4:
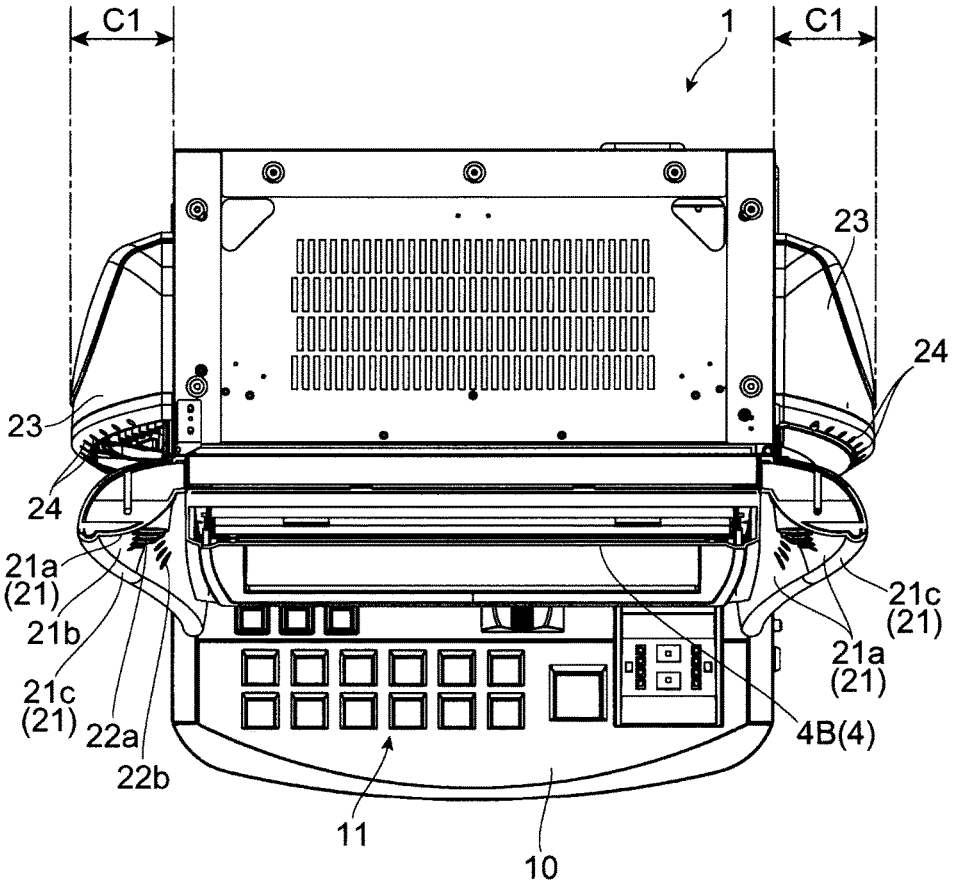
FIG. 4 is a sectional view taken along line IV-IV in FIG. 2.

As shown in FIGS. 2 and 4, the limbs 21 include an inclined surface 21a and a trimming frame 21c. The inclined surface 21a is inclined laterally. The inclined surface 21a extends the more backward, the nearer to the displays 4A and 4B. A chrome-plated reflection surface 21b is provided on the center of the inclined surface 21a. The non-chrome-plated surface of the inclined surface 21 (i.e. outside of the reflection surface 21b), on which the sub-lamps 22b are provided, is textured (grained). A bow-shaped trimming frame 21c, of which middle part is swollen outward, extend vertically along the outer edge of the each limb 21. The trimming frames 21c, having a semi-circular cross section, are chrome-plated. Furthermore, eight main side lamps 22a are disposed vertically along the each reflection surface 21b. The main side lamps 22a are illuminants that become smaller in size as they are located further from the vertical center. Sub-side lamps 22b are vertically provided above and beneath the main side lamps 22a. The sub-side lamps 22b are provided linearly such that they are aligned substantially continuous to the main side lamps 22a.

As thus described, the gaming machine 1 includes displays 4 for displaying information relating to the game, the cabinet 3 having operation buttons 11 operated by the player for game operations, and illuminants 20 surrounding the gaming region S including the displays 4 and the operation buttons 11.

Since the illuminants 20 are disposed around the periphery of the displays 4 and the gaming region S, the outer periphery of the gaming region S of the gaming machine 1 can be light-emitted. As a result, the gaming machine 1 can appeals itself to surrounding spectators. At the same time, the display units on which the contents of the currently played game are displayed and the control units at which the player's gaming operations are exposed, draw attention of the spectators most. Therefore, the illuminants 20 produce an effect to focus attentions to the gaming region S including the display units and the control units. For example, spectators may watch the game at positions shown in FIG. 7.

Figure 6:
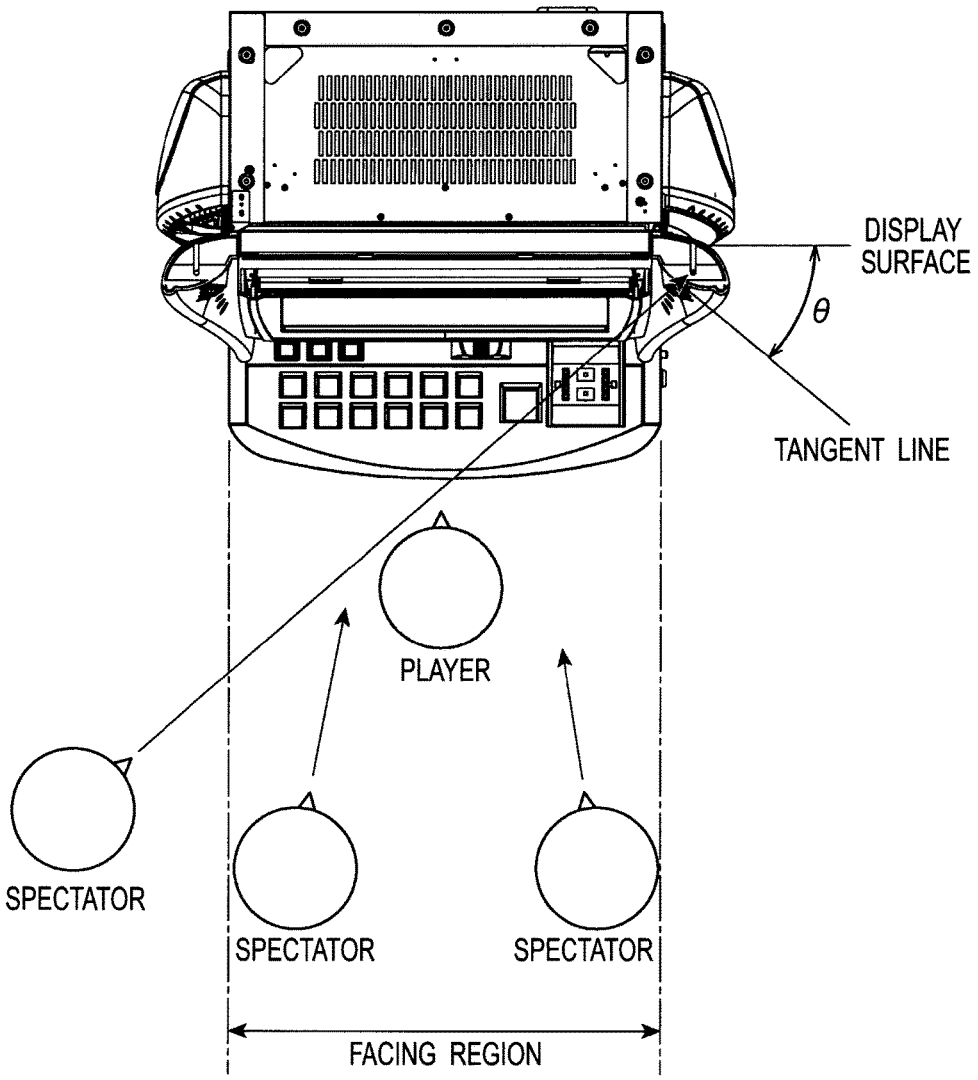
FIG. 6 is a plan view illustrating the relationship between a player and spectators positioned in front of the gaming machine.

Some of the illuminants 20 are provided on the inclined surfaces 21a. Each of the inclined surface 21a is inclined inwardly so that its surface faces to the player. Then, as shown in FIG. 6, the limb 21 provided at the right-hand side of the player substantially faces a spectator positioned diagonally backward on the left side of the player. Similarly, the limb 21 provided at the left-hand side of the player substantially faces a spectator positioned at the diagonally backward of the right side of the player. Since the inclined surfaces 21a substantially face the spectators positioned at the diagonally backward of the player, the side lamps 22a and 22b on the inclined surfaces 21a can be easily seen by the spectators. Thus, light from the side lamps 22a and 22b on the inclined surface 21a can appeal the gaming machine 1 also to the spectators, whereby a more appealing effect can be provided. As shown in FIG. 6, the illuminants 20 on the inclined surfaces 21a are inclined against the front faces 4a and 4b of the displays 4A and 4B by an angle θ (see FIG. 1). In this manner, the illumination can be more easily visible from spectators (especially spectators positioned at the diagonally backward of the player) positioned other than the front region (right in the front of the gaming machine 1). A view point of the spectator who sees the illumination can be easily guided to the displays 4A and 4B of the gaming machine 1. Here, the angle θ is preferred to be around 30 to 60 degrees.

Figure 5A:
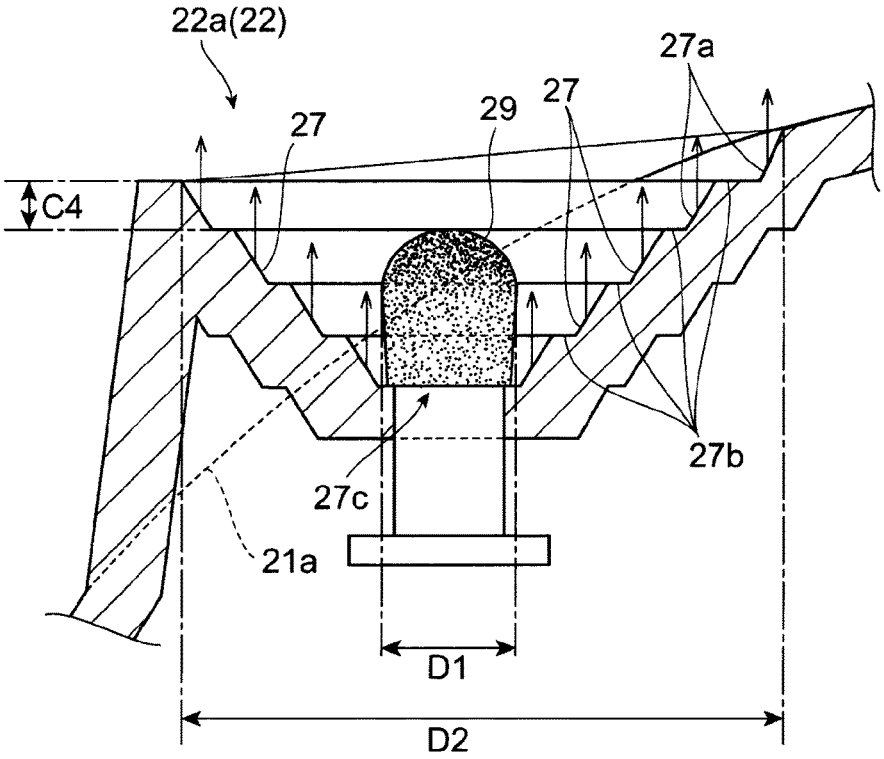
FIG. 5A is an enlarged sectional view illustrating a reflection surface.

Furthermore, as shown in FIG. 5A, the main side lamp 22a disposed on the limb 21 includes an LED (light source) 29 and a funnel-shaped reflection surface 27 surrounding the LED 29. Because light from the LED 29 is reflected by the reflection surface 27, the apparent diameter D2 of the light spot can be seen larger than the diameter D1 of the LED 29. As a result, the appealing effect can be enhanced. In addition, even if the light intensity of the LED 29 is suppressed, the larger apparent diameter than the diameter D1 of the LED 29 can be given. Accordingly, the LED 29 can be down-sized for energy-saving. Furthermore, in the vicinity of the gaming region S, the LED 29 is located further backward by a distance C4 since the reflection surface 27 is funnel-shaped. As a result, light from the main side lamps 22a does not enter the player's view field directly, whereby reducing the burden on the player's eyes and the fatigue of the player's eyes.

Figure 5B:
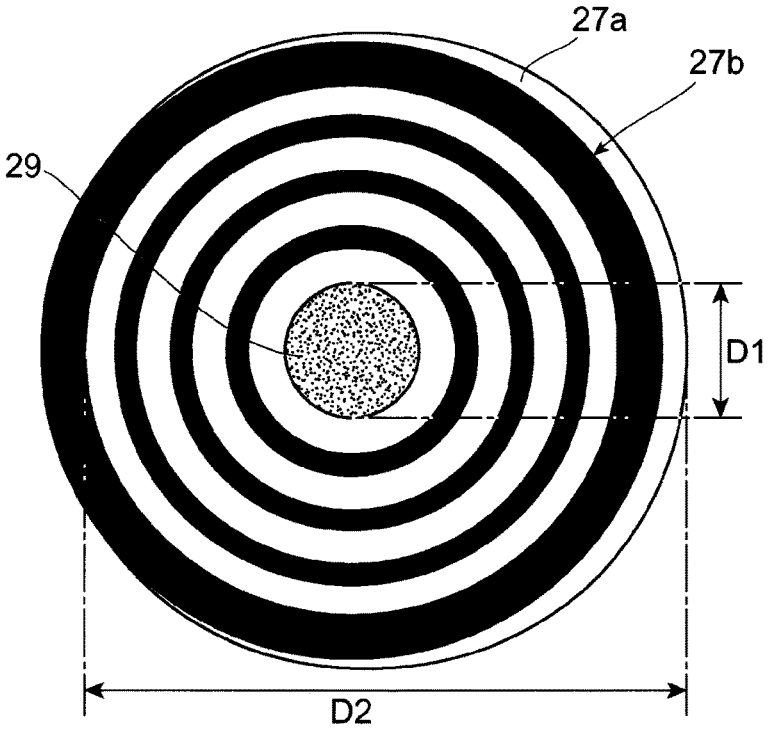
FIG. 5B is a plan view illustrating reflected light.

As shown in the cross section of FIG. 5A, the reflection surface 27 is formed in a stepwise pattern. Light from the LED 29 is reflected to the front (direction indicated by the arrow in FIG. 5A) by the inclined surfaces 27a of the funnel-shaped reflection surface 27. On the other hand, light is not reflected by the surfaces 27b which are parallel to the installation surface 27c of the LED 29. Thus, as shown in FIG. 5B, shades are formed in concentric circles on the reflection surface 27, whereby creating concentric circles of light in accordance with the number of steps. In this manner, the light may be provided with decorative characteristics to enhance appealing effect to the spectators nearby. Furthermore, due to formation of the shades described above, the light entering into the player's view field can be reduced, whereby reducing the burden on the player's eyes and the fatigue of the player's eyes.

Furthermore, as shown in FIGS. 2 and 3, the speaker lamps 24 provided on the sides of the cabinet 3 are installed at a position backward from the front face of the cabinet 3 with a predefined distance. The speaker lamps 24, however, are disposed so that they can be seen continuously with the sub-side lamps 22b and under lamps 25 from the front. Since the speaker lamps 24 are disposed along the edges of the speakers 23, the speakers 23 laterally projecting from the cabinet 3 and the side faces of the cabinet 3 can be made more outstanding.

Furthermore, the under lamps 25 are provided so that they can be seen continuously with the speaker lamps 24. The under lamps 25 thus make the waist panel 4C more outstanding.

The top lamps 26 include a pair of power lamps 26a provided on the right and left sides, and belt lamps 26b disposed horizontally in the middle. Each of the power lamps 26a generates very strong light by fisheye lens. The belt lamps 26b, composed of a plurality of horizontally disposed LEDs, generate belt-shaped light. The top lamps 26 thus composed are disposed so that they can be seen continuously with the sub-side lamps 22b.

Furthermore, a control device 28 (see FIG. 3) for controlling the lighting of the illuminants 20 is provided in the cabinet 3. Respective lamps 22a, 22b, 24, 25, 26a and 26b controlled by the control device 28 are disposed so that they can be seen continuously from the front. This arrangement may create dynamic effects of light such as flowing of the illumination lights, whereby enhancing the appealing effect to spectators of the gaming machine 1. Additionally, for example, the whole illuminants 20 in their entirety may produce illumination effects to form a frame that fringes the gaming region S. This effect can be produced even if the speaker 23, on which some of the illuminants 20 are provided, is not located in a coplanar manner with the front door 6 and the displays 4 but is located at a position further backward. Also, this effect can be produced even if the area in which the illuminants 20 are installed has undulation and the intervals between each of the illuminants 20 are not the same. Thus, spectators or the players who are about to start the game can easily focus their attention to the gaming region S.

Additionally, as shown in FIG. 2, the interval P1 of the side lamps 22 is smaller than the interval P2 of the speaker lamps 24 and the under lamps 25. When the control device 28 executes an lighting control with same blinking intervals in order to produce lights flow with the side lamps 22, the speaker lamps 24 and the under lamps 25, the flow velocity of the side lamps 24 with a first intervals P1 appear to be slower than the flow velocity of the speaker lamps 24 and the under lamps 25 with a second intervals P2, because the second interval P2 is wider than the first interval P1. Therefore, attentions to the displays 4 can be raised, because the flow velocity of the lights around the displays 4 which should draw highest attention in the gaming region S becomes slow. Here, the intervals P1 of the main side lamps 22a don't have to be the same as the intervals P1 of the sub-side lamps 22b, provided that the intervals P1 are set wider than the intervals P2. Similarly, the intervals P2 of the under lamps 25 and the intervals P2 of the speaker lamps 24 don't have to be the same.

[Front Door]

Figure 8:
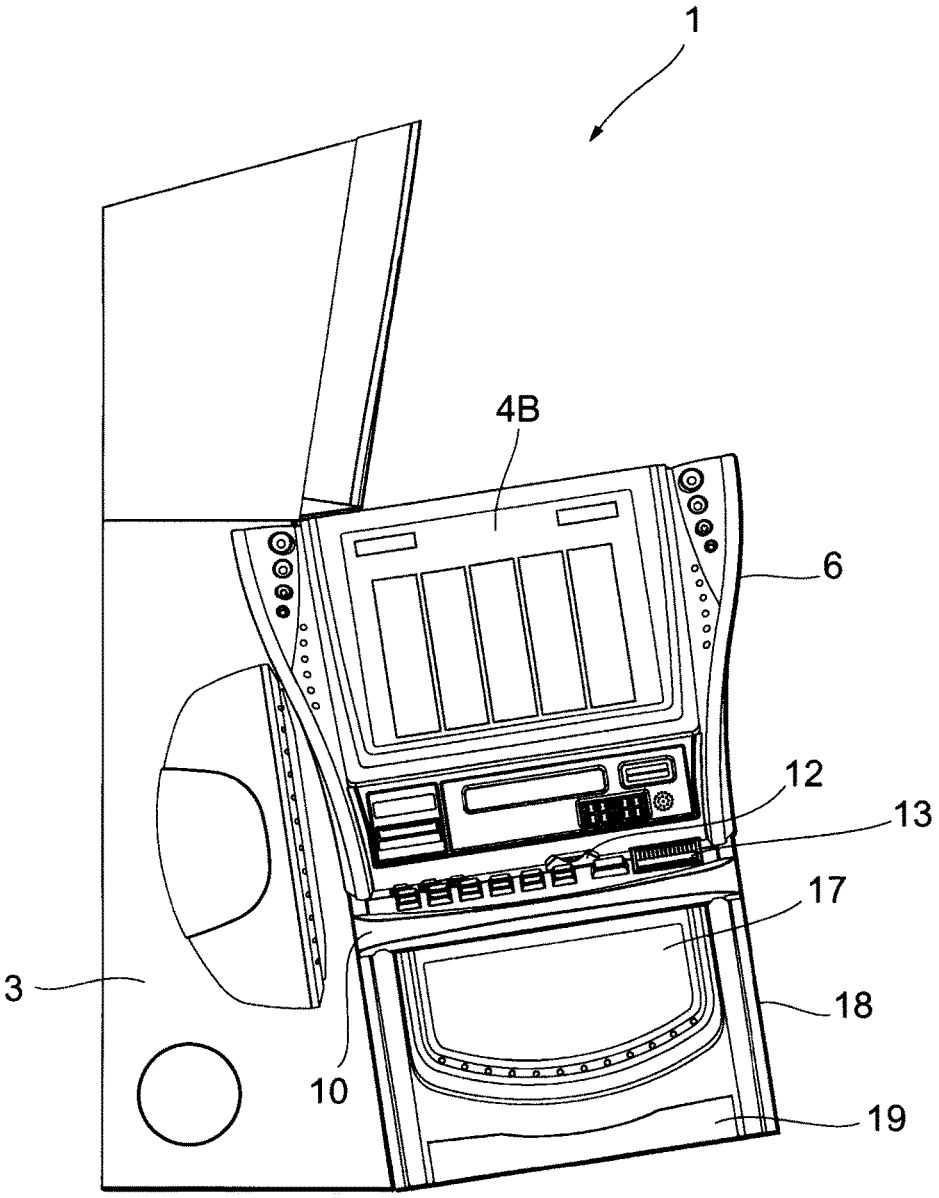
FIG. 8 is a side view illustrating the front door (the first door) being open.
Figure 9:
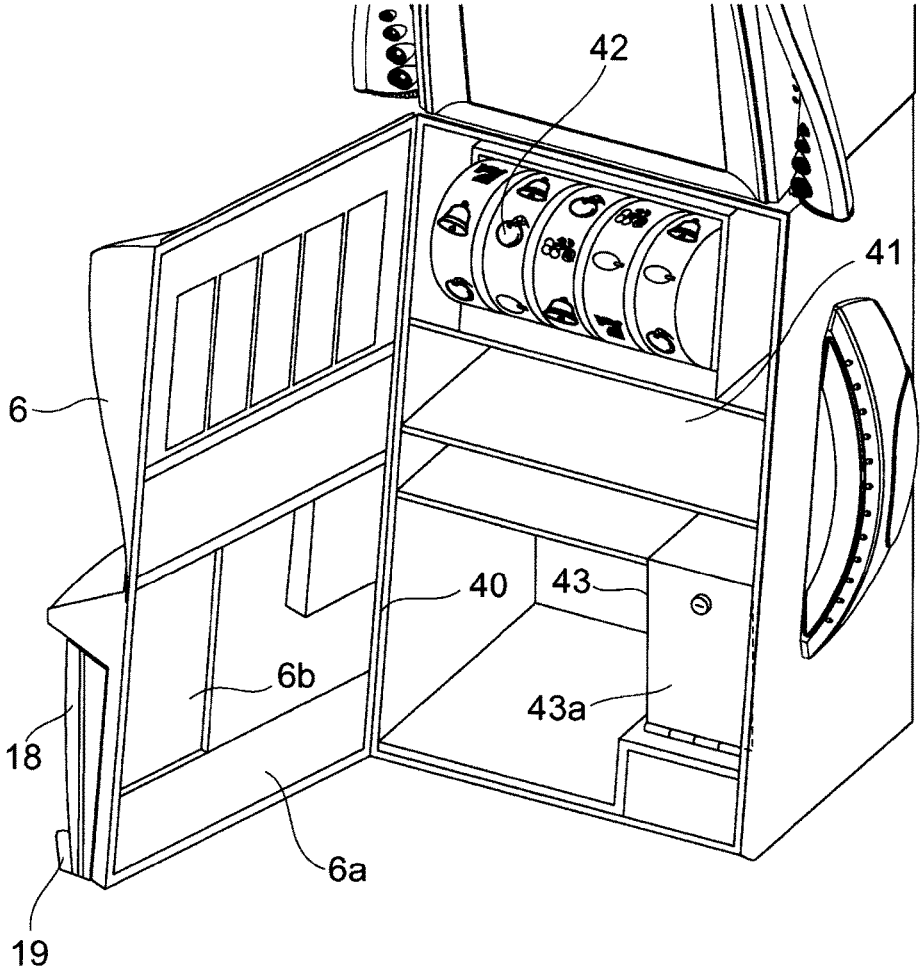
FIG. 9 is a perspective view illustrating the front door kept open.

As shown in FIGS. 8 and 9, the gaming machine 1 includes the front door (first door) 6 having the center display 4B and the operation table 10 provided thereon. The front sub-door (second door) 18 having the waist panel 17 and the coin tray 19 is provided on the front lower part of the front door 6. The front door 6 (front sub-door 18) opens sideways to be able to be opened and closed. The front door 6, provided on the front face of the cabinet 3, is attached via a hinge 40 to the leftmost edge of the cabinet 3. Since the front door 6 is coupled via the hinge 40 to the cabinet 3 which has the backwardly inclined front face, a force to keep the front door 6 open would work if the front door 6 is opened wider than 90 degrees.

Figure 10:
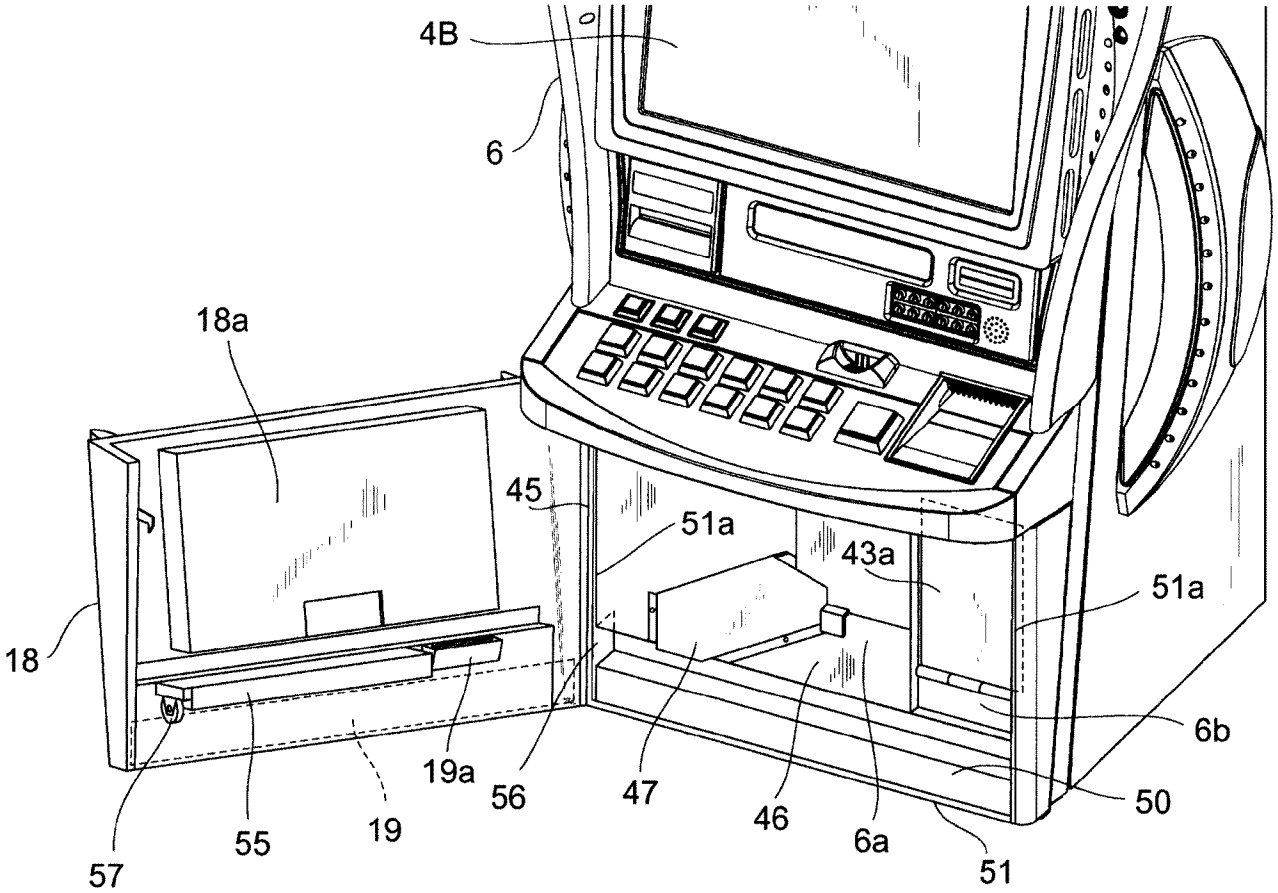
FIG. 10 is a perspective view illustrating the front sub-door (the second door) being open.

If the front door 6 is opened, the front sub-door 18 swings together with the front door 6, whereby a large opening 41 is revealed in the front face of the cabinet 3. Then, maintenances on the mechanical reel 42 or wiring in the cabinet 3 can be performed by opening the front door 6, and the collection box 43 within the cabinet 3 is also exposed. The collection box 43 stores the bills inserted from the bill insertion slot 13. In addition, a coin hopper (not shown) is provided in the cabinet 3 for stocking the coins inserted from the coin insertion slot 12. As shown in FIG. 10, the coins in the coin hopper are paid out onto the coin tray 19 via a chute 47 and a tray chute 19a. The tray chute 19a is attached to the rear face 18a of the front sub-door 18.

The LCD (display 4B) is fixed to the upper part of the front door 6. Additionally, as shown in FIGS. 9 and 10, a partition plate 6a is provided at the lower part of the front door 6. The partition plate 6a is positioned behind the closed front sub-door 18. A rectangular opening 6b for exposing the cover 43a of the collection box 43 is provided at the right side of the partition plate 6a. The worker can access the collection box 43 via the opening 6b.

As shown in FIG. 10, the front sub-door (second door) 18 for partially opening and closing the front door 6 is provided in front of the partition plate 6a. The leftmost edge of the front sub-door 18 is attached to the leftmost edge of the front door (first door) 6 via the hinge 45. A rectangular opening 46 appears upon opening the front sub-door 18, and the partition plate 6a is exposed in the opening 46. The chute 47 for paying out coins to the coin tray 19 is fixed to the front face of the partition plate 6a. The worker can unlock the cover 43a of the collection box 43 via the opening 6b of the partition plate 6a. The worker can unlock and open the cover 43a and collects the bills in the collection box 43 through the opening 6b.

The coin tray 19 is fixed to the lower end of the front face of the front sub-door 18 which is mainly used for collecting the bills. The coin tray 19 extends across substantially the entire width of the front sub-door 18. The coins which have been paid out from the coin hopper (not shown) which is located backward from the opening 41 are stocked on the coin tray 19 after passing the chute 47 and the tray chute 19a. Even if maintenances of the gaming machine 1 or collecting the bills from the collection box 43 must be done when the coins are accumulated exceeding the upper end of the coin tray 19, the front door 6 or the front sub-door 18 can be opened. Here, the front door 6 or the front sub-door 18 can be opened smoothly since the coin tray 19 is attached to the front sub-door (second door) 18 (see FIGS. 8 and 10). In addition, operating efficiency can be improved, since the coin tray 19 does not interfere the operator's operation in the cabinet 3 when the front door 6 or the front sub-door 18 is opened. Here, game media (gaming media are not limited to coins and may be medals, tokens or tickets) paid out from the cabinet 3 are accumulated on the coin tray 19, or the player's belonging (for example, a cigarette or wallet) may be placed on the coin tray 19.

Figure 11:
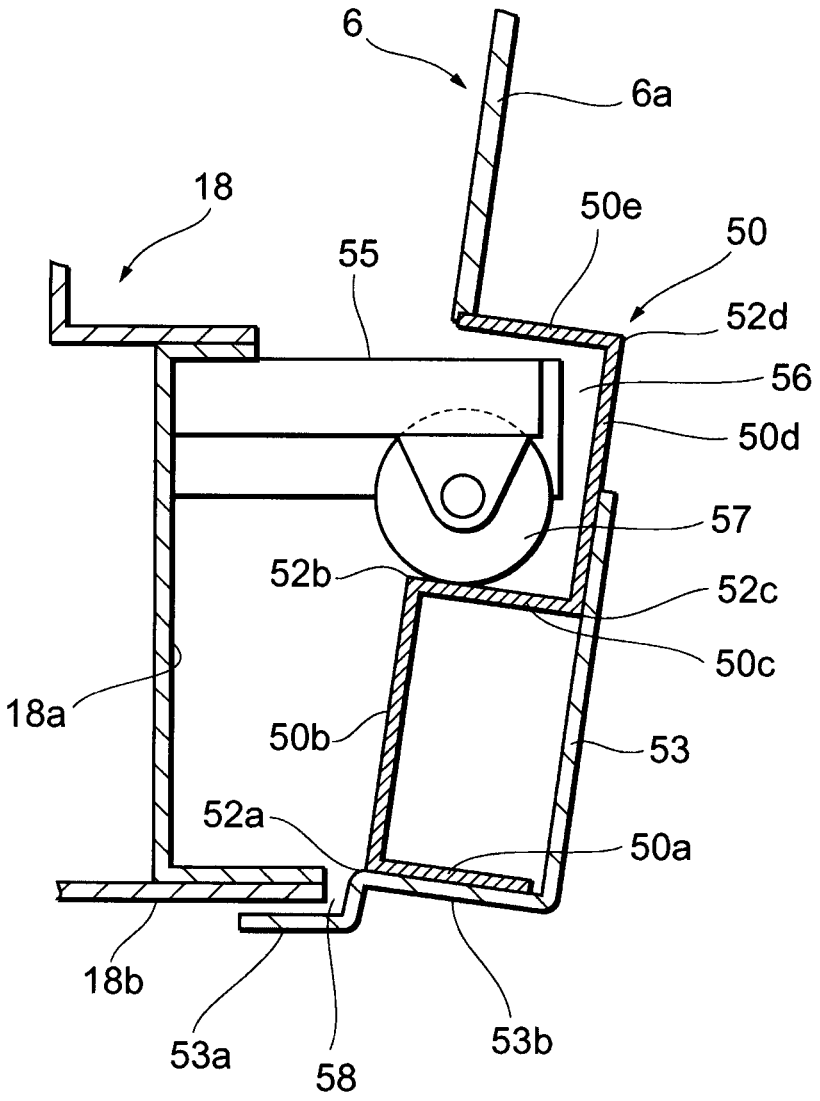
FIG. 11 is an enlarged sectional view of the lower main part of the front door and the front sub-door.

As shown in FIGS. 10 and 11, a reinforcement 50 which is formed by bending a metal plate is provided at the lower part of the partition plate 6a of the front door 6. The reinforcement 50 is attached so that it bridges between both sides 51a of the frame 51 formed along the periphery of a rectangular opening 46 which appears when the front sub-door 18 is opened. The upper end of the reinforcement 50 is fixed to the lower end of the partition plate 6a by welding. The periphery of the partition plate 6a is fixed to the frame 51. In addition, the reinforcement 50 enhances rigidity of the frame region 51, which results in reduced distortion of the frame 51.

The reinforcement 50 is formed by bending a metal plate along bending lines 52a to 52d in the direction of the bridging. Thus, rigidity of the reinforcement 50 can be enhanced with a simple structure. Specifically, the reinforcement 50 is bent along the bending lines 52a to 52d to form an S-shaped cross section. As shown in FIG. 11, the reinforcement 50 is composed of first to fifth plates 50a to 50e, which are substantially horizontal. The first plate 50a extends substantially horizontally at the bottom of the reinforcement 50. The second plate 50b stands substantially vertically straight from the front end of the first plate 50a. The third plate 50c extends substantially horizontally inward from the upper end of the second plate 50b. The fourth plate 50d stands substantially vertically straight from the back end of the third plate 50c. The fifth plate 50e extends substantially horizontally outward from the upper end of the fourth plate 50d. The lowermost first plate 50a is welded to the patch plate 53. Both side ends of the patch plate 53 are fixed to the frame 51. The uppermost fringe edge of the fifth plate 50e is welded to the lower edge of the partition plate 6a. Here, the bending formation of the reinforcement 50 is not limited to the foregoing example. At least a single bending may be sufficient for the bending formation of the reinforcement 50.

Furthermore, a counter (protrusion) 55 is projected out horizontally toward the opening 46 from the rear face 18a of the front sub-door (second door) 18. The counter 55 is positioned above a roller 57. The counter 55 counts the coins which are inserted from the coin insertion slot 12. The front end of the counter 55 thrusts into a cavity 56 formed by the third, fourth and fifth plates 50c, 50d and 50e of the reinforcement 50, when the front sub-door 18 is closed. As a result, even if a wire is inserted through a gap 58 between the front door 6 and the front sub-door 18 for fraudulent acts, penetration of the wire can be prevented by the counter 55, whereby the fraudulent acts such as maliciously opening of the door is prevented. Furthermore, weight of the coin tray 19 and the front sub-door 18 can be supported by the entire front door 6 when the front sub-door 18 is closed, since the front sub-door 18 is supported by the reinforcement 50 via the counter 55 and the roller 57.

In addition, the fifth plate (first security plate) 50e which is bent from the upper end of the fourth plate 50d toward the front sub-door (second door) 18 is provided at the upper end of the reinforcement 50. Even if a wire is inserted through the gap 58 for fraudulent acts, penetration of the wire can be prevented by the fifth plate (first security plate) 50e, whereby the fraudulent acts such as maliciously opening of the door is prevented.

In addition, the second plate (second security plate) 50b extending in the direction of the bridging is provided at the lower end of the reinforcement 50. The second plate (second security plate) 50b is disposed substantially parallel with the patch plate 53. Even if a wire is inserted through the gap 58 for fraudulent acts, penetration of the wire can be prevented by the second plate (second security plate) 50b, whereby the fraudulent acts such as maliciously opening of the door is prevented. Furthermore, the first plate 50a is joined to the lower end 53b of the patch plate 53 to block the penetration of the wire for fraudulent acts.

A flange 53a is provided at the lower end of the patch plate 53, so that it overlaps the base surface 18b of the front sub-door 18. Even if a wire is inserted through the gap 58 for fraudulent acts, penetration of the wire can be prevented by the flange 53a, whereby the fraudulent acts such as maliciously opening of the door is prevented.

Furthermore, the roller 57 is provided beneath the counter 55 at the rear face of the front sub-door (second door) 18, so that it overlaps the reinforcement 50 at the lower part of the frame 51. In addition, the roller 57 is located behind the upper end of the coin tray 19. The roller 57 is supported by the third plate 50c of the reinforcement 50 when the front sub-door 18 is closed. It is preferable that the roller 57 is located far from the hinge 45 of the front sub-door 18 in order to support the front sub-door 18 firmly by the hinge 45 and the roller 47. Thus, the weight of the coin tray 19 and the front sub-door 18, or the weight of the coins accumulated on the coin tray 19 can be deconcentrated. Also, the fraudulent acts such as maliciously accessing to the collecting box 43 can be effectively prevented by providing the roller 57 between the lower edge of the front sub-door 18 and the collecting box 43. Furthermore, the rotatable roller 57 reduces abrasion to allow the front sub-door 18 to be opened and closed smoothly.

Figure 12:
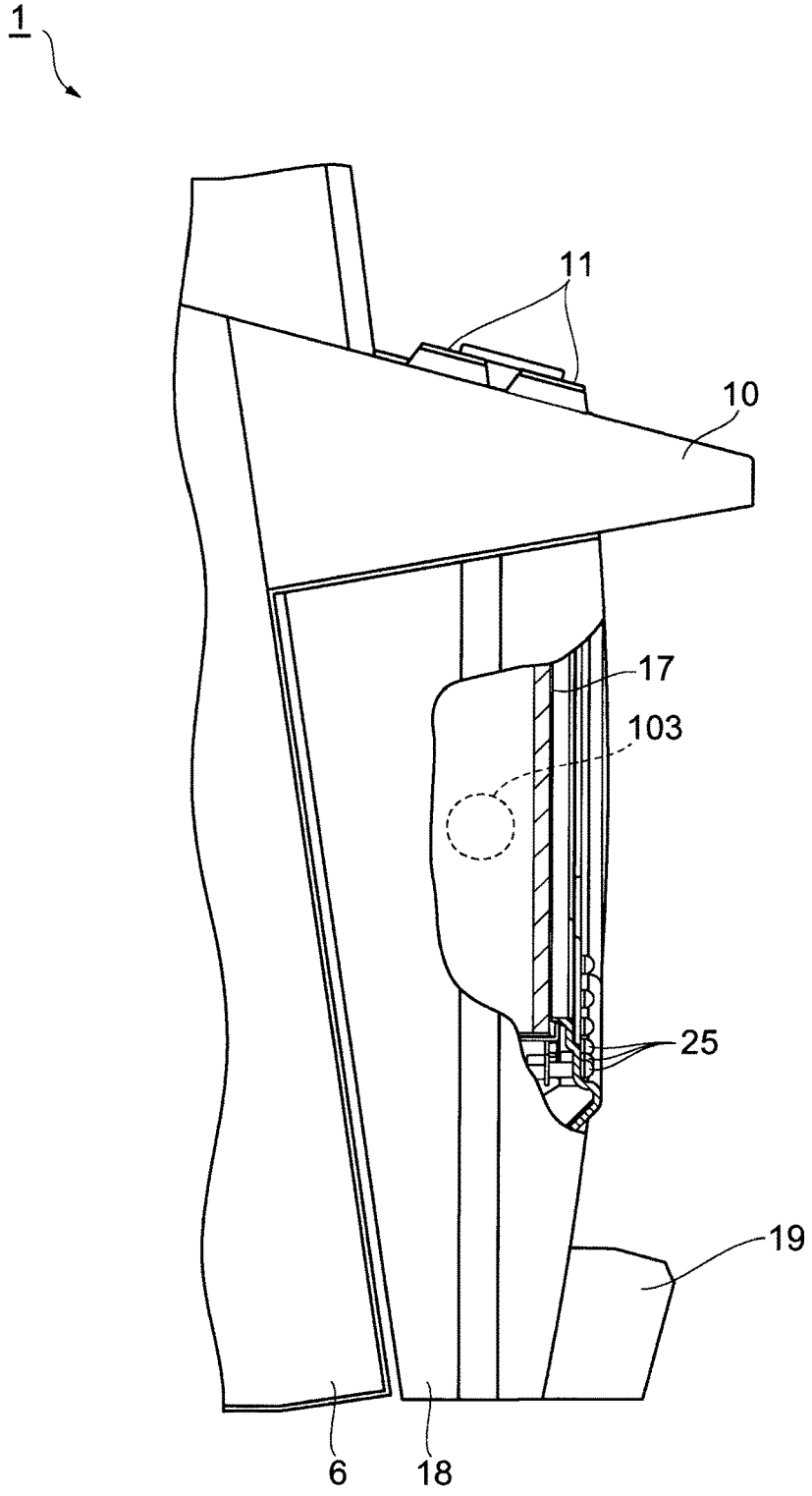
FIG. 12 is an enlarged side view of the main part of the front sub-door with a part of which being cut off.

Furthermore, the front door 6 is disposed so that it is inclined backwardly, as shown in FIG. 12. Since the front door 6 is inclined backwardly, the front door 6 can be prevented from suddenly opening fully due to the weight of the front door 6 when the front door 6 is opened (when the angle of opening is equal to or less than 90 degrees, self-weight of the front door 6 does not act on the full-open direction). In addition, the above-mentioned waist panel (effect producing unit) 17 is provided on the front face of the front sub-door 18. The front face of the front sub-door 18 is disposed closer to the front (near side to the player) than the front face of the front door 6 (see FIG. 3). As a result, the front face of the front sub-door 18 disposed perpendicularly to the bottom of the cabinet 3 so that the waist panel 17 can be disposed substantially perpendicularly. Thus, spectators who sees from afar can have a better view of the effect contents on the waist panel 17. In addition, inner space at the back of the front sub-door 18 can be expanded.

As shown in FIG. 12, the waist panel 17 with effect contents displayed thereon is illuminated by a lighting unit 18b (e.g., a fluorescent lamp 103, a cold cathode tube, an LED lamp) disposed at the back of the front sub-door 18. The inner space at the back of the above-mentioned front sub-door 18 can be used as heat radiation space for the lighting unit 18b (fluorescent lamp 103). Here, the waist panel 17 may be an LCD panel or the like.

[Operation Table, Waist Panel, and Under Lamp]

Figure 13:
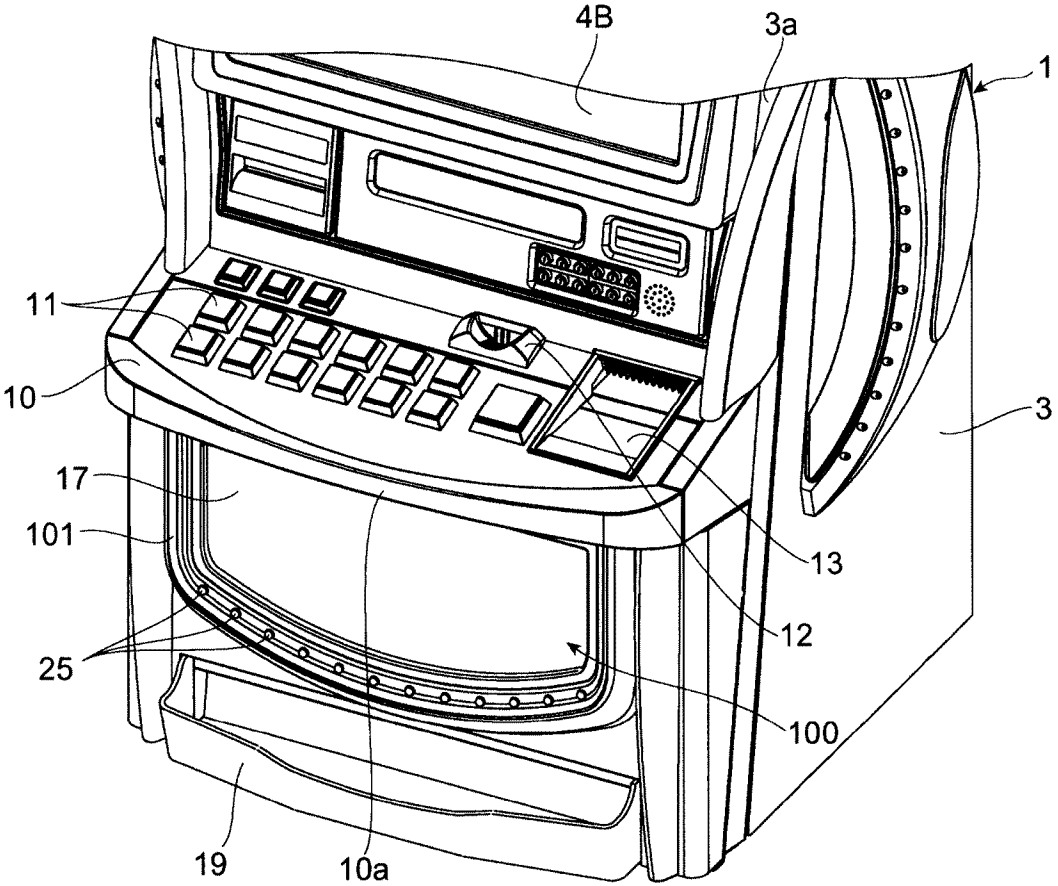
FIG. 13 is an enlarged perspective view illustrating the lower part of the gaming machine.
Figure 14:
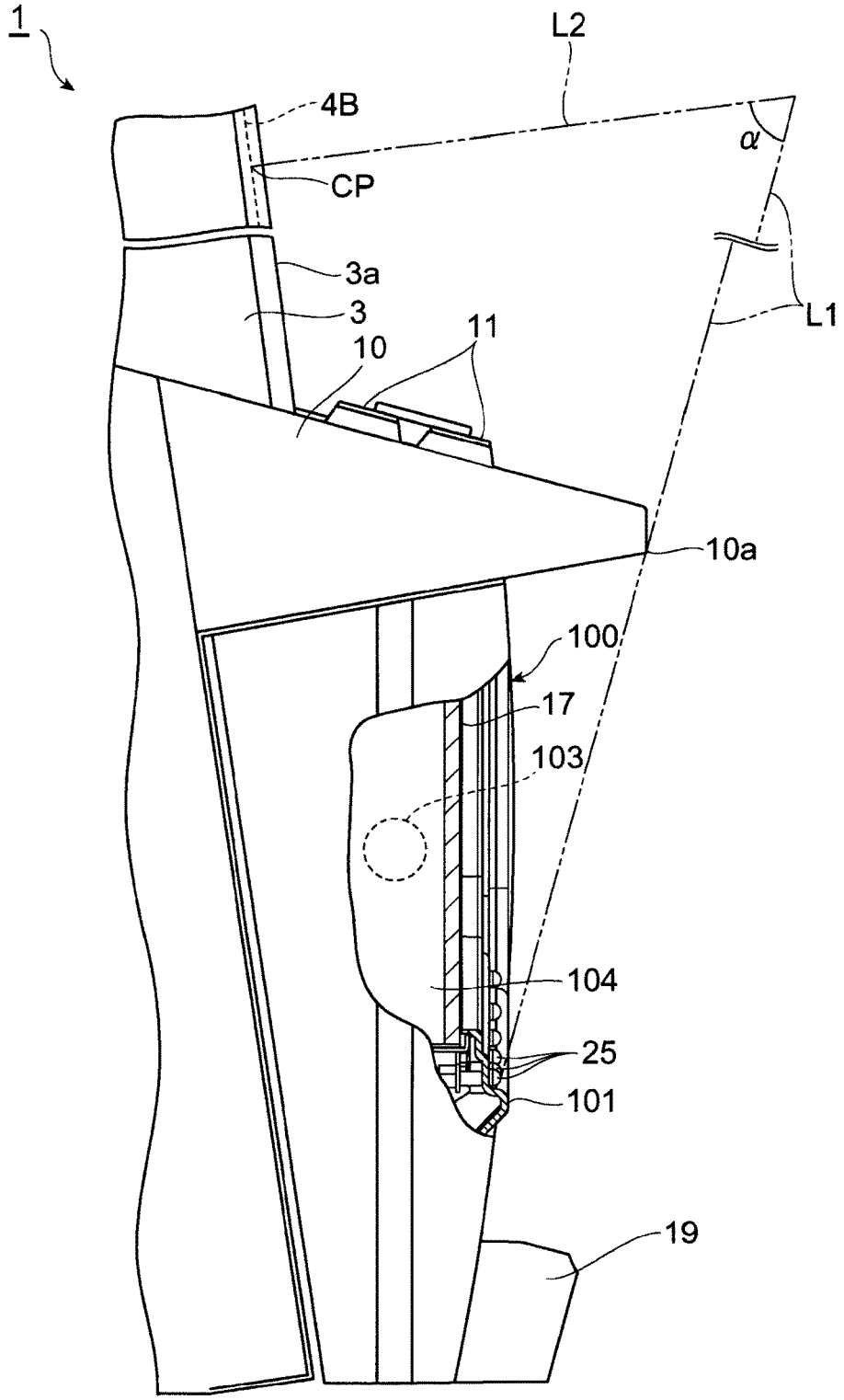
FIG. 14 is a side view illustrating the front face of the lower part with a part of which being cut off.
Figure 15:
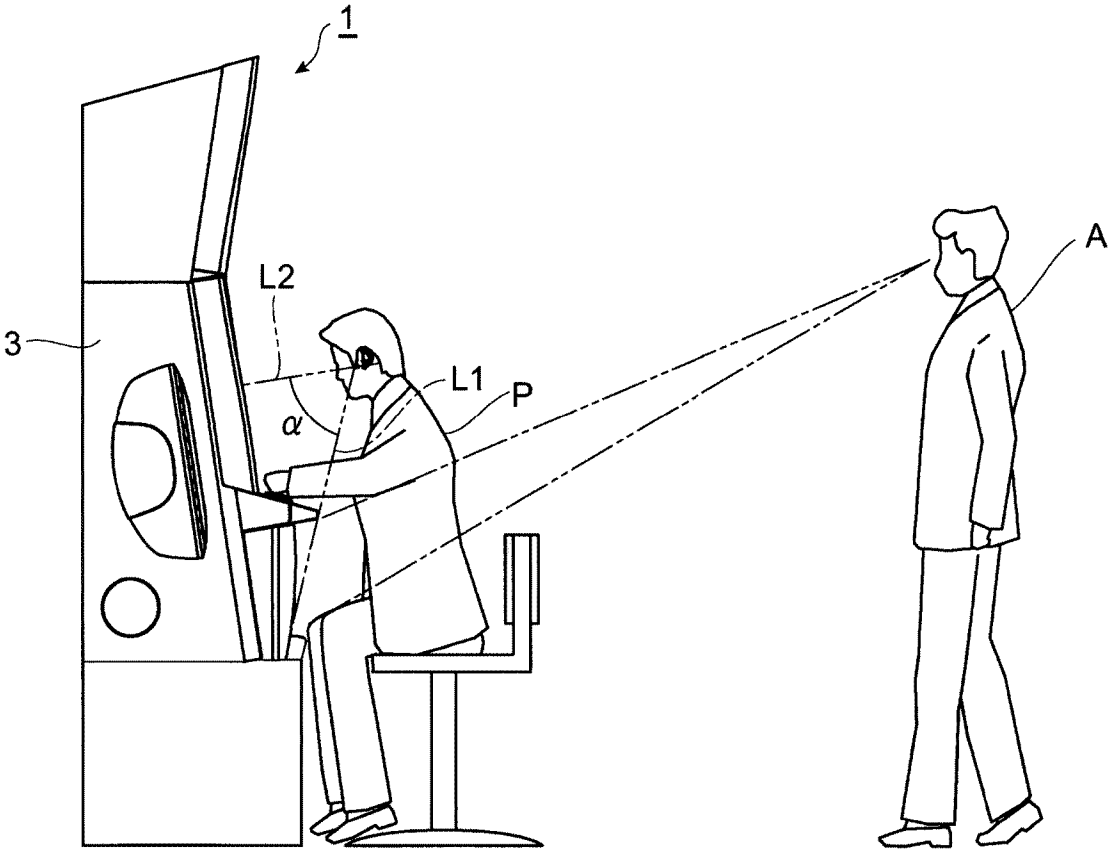
FIG. 15 is a side view illustrating a player operating the gaming machine and a spectator watching the slot game.

As shown in FIGS. 13 and 14, the operation table 10 is disposed on the front face 3a of the cabinet 3, projecting forward. The upper face of the operation table 10 is slightly down-sloped to the player P (see FIG. 15) so that the player P can place his/her hand and lean thereon easily. In addition, the operation buttons 11 are disposed on the operation table 10 as control units for inputting instructions related to the game. Furthermore, the coin insertion slot 12 and the bill insertion slot 13 are also provided on the operation table 10.

The lower display 100 (4C) is provided beneath the operation table 10. The lower display 100 is disposed backward than the front end 10a of the operation table 10. The lower display 100 includes the waist panel 17, a frame 101 surrounding the waist panel 17, the plurality of under lamps 25 provided on the lower frame of the frame 101, and the fluorescent lamp 103 installed behind the waist panel 17. The fluorescent lamp 103 irradiates light on the back of the waist panel 17.

The waist panel 17 is formed by laminating an image film and a transparent acrylic plate. The image film has images such as logo marks or characters indicating the name of the gaming machine 1 displayed thereon. The waist panel 17, which is disposed at the lower front face of the cabinet 3, is fixed between a fluorescent lamp box 104 provided inside the cabinet 3 and the frame 101. A pair of right and left sockets are fixed inside the fluorescent lamp box 104, pins of the fluorescent lamp 103 are inserted to the sockets. The light irradiated from the fluorescent lamp 103 transmits through the waist panel 17 and illuminates the images such as logo marks or characters. The images displayed on the waist panel 17 can easily enter the view field of a spectator A who watches the slot game from the diagonally backward of the player P (see FIG. 15), whereby it contributes to differentiate the gaming machine 1 from other models and enhancing the appealing effect of the gaming machine 1.

The outer edge of the frame 101 slightly bulges than the inner edge. The lower edge of the waist panel 17 is slightly curved downward, and the lower frame of the frame 101 is also curved downward in accordance with the shape of the waist panel 17. The under lamps 25 are disposed on the lower frame of the frame 101. Each of the under lamps 25 is a full color LED combined with three single LED elements each of which can emit red, blue, or green light (light's three primary colors). The under lamps 25 are implemented on a circuit board together with the LED driving circuit. In addition, the coin tray 19 is provided beneath the under lamps 25. The coin tray 19 stocks coins (game media) which have been paid out based on the outcome of the slot game. The under lamps 25 illuminate the waist panel 17 from below, and the coin tray 19 from above.

When seen from the side face of the cabinet 3, the line connecting the under lamps 25 and the front end 10a of the operation table 10 is denoted L1, and the line orthogonally penetrating the center point CP of the center display (variable display) 4B is denoted L2, as shown in FIG. 14. The under lamps 25 and the operation table 10 are disposed so that the angle $\alpha$ formed by lines L1 and L2 is acute-angled. Since the player P pays highest attention to the center display 4B which displays the on-going slot game, the position of the center display 4B is determined considering the sight line of the player P. Then, light from the under lamps 25 is blocked by the operation table 10 by arranging the under lamps 25 and the operation table 10 based on the above arranging position so that the light is prevented from reaching the eyes of the player P.

The gaming machine 1 can appeal to the spectator A by blinking or lighting the under lamps in various colors. At the same time, while the light from the under lamps 25 is prominent to the spectator A, the light is prevented from reaching the eyes of the player P since the light is blocked by the operation table 10. As a result, prominence to the spectator A and reduction of eye-fatigue of the player P due to the under lamps 25 can be balanced. In other words, it becomes possible to let the player P concentrate on the game with less burden while attracting the spectator A. Furthermore, the player P can play the slot game for a long time with less fatigue or less physical exhaustion, since the player P can operate the slot game with his/her hand or arm placed on the operation table 10.

Furthermore, the under lamps 25 are disposed along the lower edge of the waist panel 17 (see FIGS. 13 and 14). The waist panel 17 is illuminated by the under lamps 25 so that the waist panel 17 can be easily noticed by the spectator A. As a result, the appealing effect to the spectator A by the waist panel 17 can be enhanced.

Furthermore, if the position of the center display 4B which displays the game content is determined, arrangement of the under lamps 25 and the operation table 10, or dimension of the operation table 10 can be readily determined. As a result, such a layout can be readily adapted to gaming machines of other various models.

Furthermore, the light intensity around the coin tray 19 can be increased, since the under lamps 25 are disposed above the coin tray 19.

[Concealed Lighting]

Figure 16:
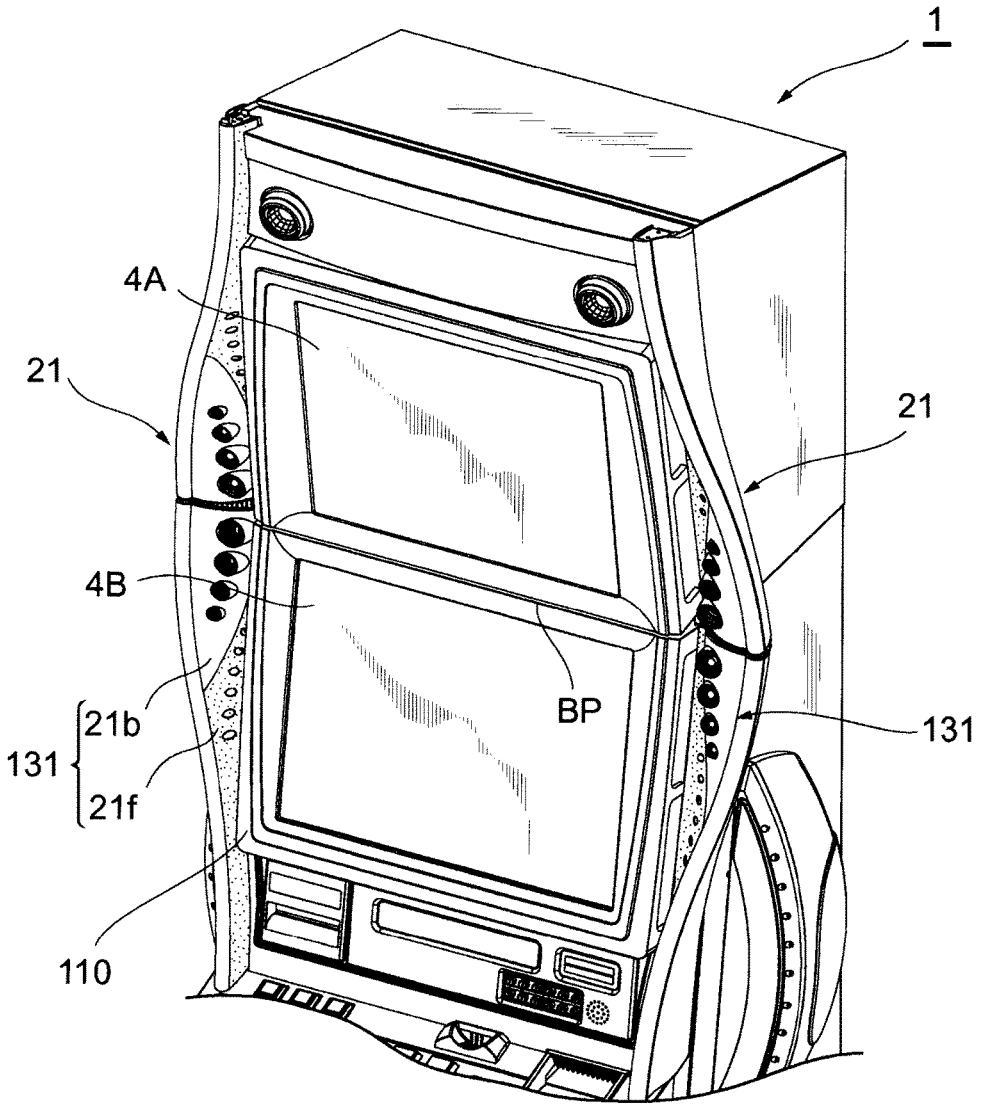
FIG. 16 is a perspective view of the upper part of the gaming machine according to the embodiment.
Figure 17:
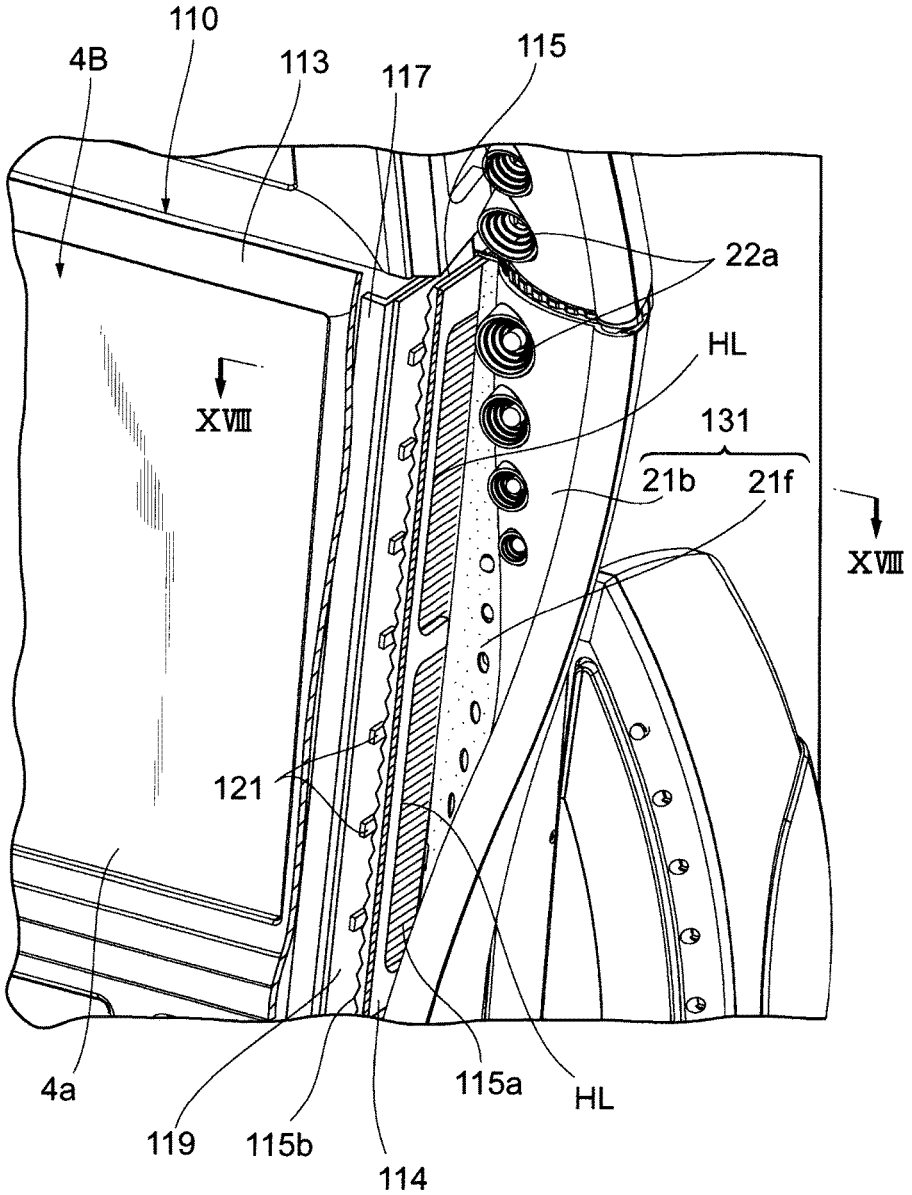
FIG. 17 is an enlarged perspective view illustrating the right-hand side of a display.
Figure 18:
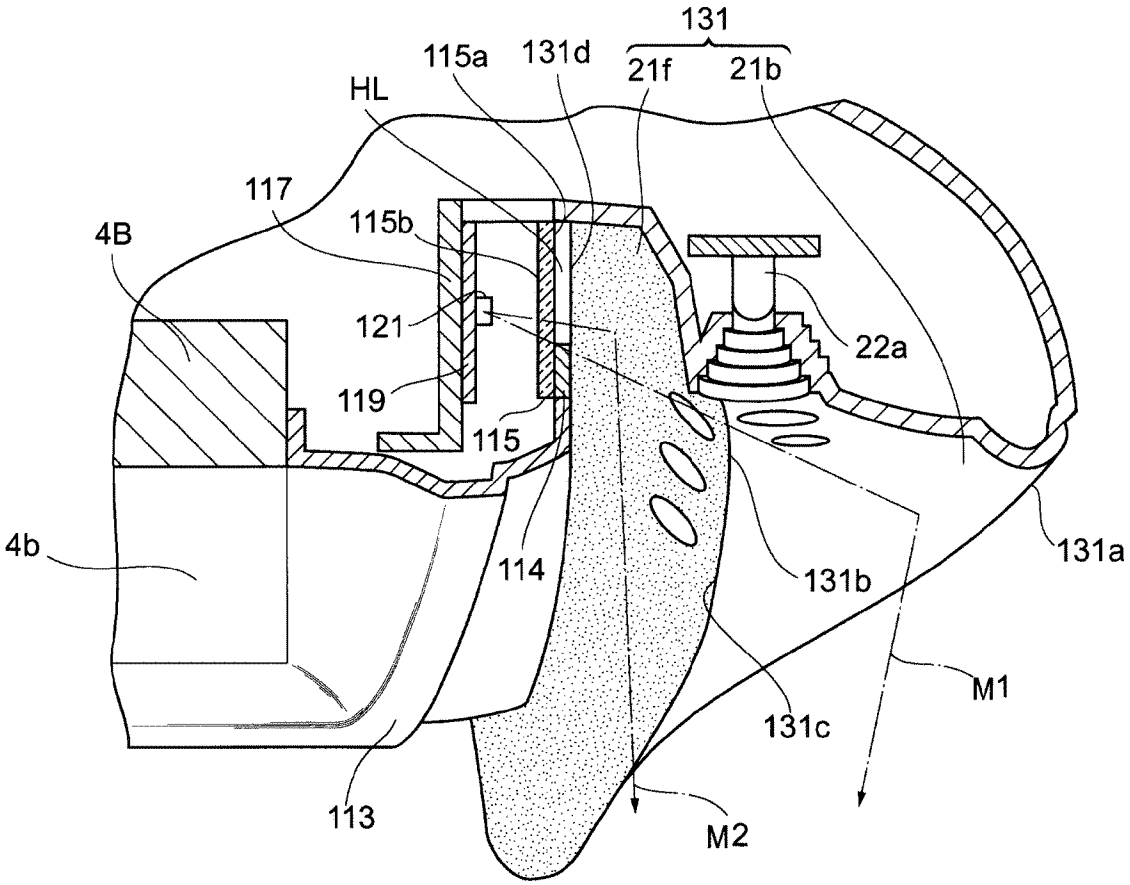
FIG. 18 is a sectional view taken along line XVIII-XVIII in FIG. 17.

As shown in FIGS. 16 to 18, the center display 4B is an LCD, with a rectangular frame 110 fixed to the periphery of the center display 4B. The frame 110 includes a front douser 113, a side douser 114, and a transparent plate 115. The front douser 113 is a resin frame that fringes around the center display 4B. The side douser 114, extending vertically along the side edge of the front douser 113, is fixed to the right and left sides of the front douser 113. The transparent plate 115 is an acrylic plate adhered to the back of the side douser 114. The side douser 114 is orthogonally coupled to the front douser 113. Two gate holes HL are formed on the side douser 114. The transparent plate 115 has a wave-shaped internal surface 115b and a flat external surface 115a. The external surface 115a contacts the side douser 114.

A bracket 117 is provided behind the front douser 113 in a vertical direction. A circuit board 119 is fixed to the bracket 117 in parallel with the transparent plate 115. The circuit board 119 has an LED driving circuit installed thereon and a plurality of full color LEDs (illuminants) 121 installed along the longitudinal direction. Each of the full color LED 121 is composed by combining three single LED elements each of which can emit red, blue, or green light (light's three primary colors). Some of the light emitted from the full color LEDs 121 is blocked by the front douser 113 and the side douser 114, whereas the rest of the light transmits through the transparent plate 115 after being refracted by the wave-shaped inner surface 115b of the transparent plate 115. The transmitted light further passes through the gate hole HL and is irradiated toward the side of the frame 110.

Figure 19:
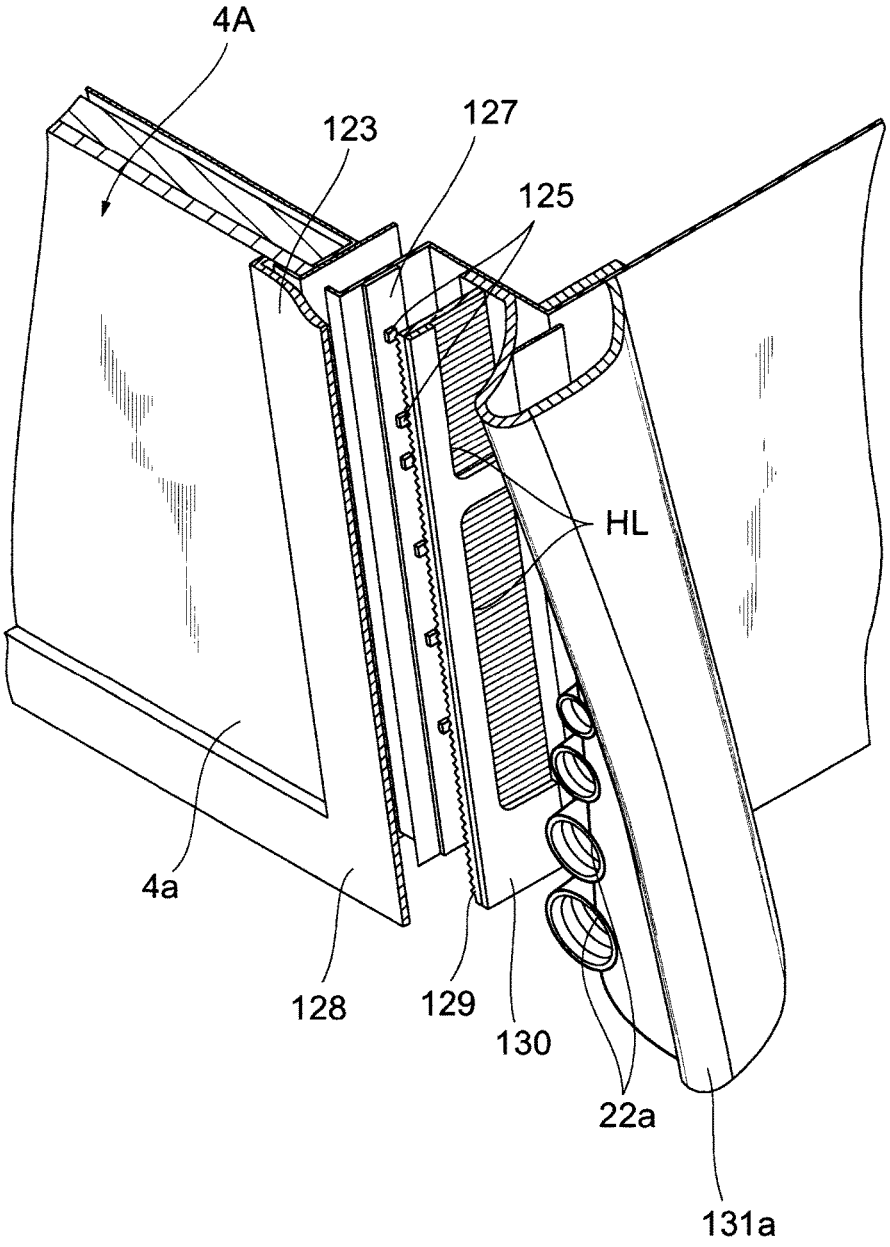
FIG. 19 is an enlarged perspective view illustrating the right-hand side of an upper display.

As shown in FIG. 19, the upper display 4A is also an LCD, as well as the center display 4B, and a rectangular frame 123 is also fixed to the upper display 4A. Additionally, a circuit board 127 is provided within the frame 123. The circuit board 127 has a plurality of full color LEDs (illuminants) 125 installed therein. The frame 123 includes, as well as the frame 110 of the center display 4B, a front douser 128, a side douser 130, and a transparent plate 129. Some of the light emitted from the full color LEDs 125 is blocked by the front douser 128 and the side douser 130, whereas the rest of the light transmits through the transparent plate 129. The transmitted light further passes through the gate hole HL and is irradiated toward the side of the frame 123.

As shown in FIGS. 16 to 19, laterally projecting recurved-bow-shaped limbs 21 are formed on the right and left sides of the cabinet 3. The limbs 21 are positioned along the displays 4A and 4B. Each of the limbs 21 includes, as stated above, the inclined surface 21a and the trimming frame 21c. The chrome-plated reflection surface 21b is provided on the center of the inclined surface 21a. Other regions of the inclined surface 21a have an irregular reflection surface 21f which is textured (grained). In addition, the trimming frame 21c is also chrome-plated to reflect light well. In other words, the reflector 131 of the limbs 21 is composed of the reflection surface 21b and the irregular reflection surface 21f. Furthermore, eight main side lamps 22a are disposed on the reflection surface 21b in a vertical direction. The more upper (or lower) position from the center the main side lamps 22a are located at, the smaller the main side lamps 22a are.

The reflection surface 21b and the irregular reflection surface 21f are substantially plane-symmetric with respect to the boundary plane BP between displays 4A and 4B (see FIG. 16). The irregular reflection surface 21f is formed inside near the displays 4A and 4B. The reflection surface 21b is formed at a distance with the displays 4A and 4B, and near the boundary plane BP. Furthermore, the more far from the center (boundary plane BP) of the limbs 21, the wider the irregular reflection surface 21f is. On the contrary, the nearer to the center (boundary plane BP) of the limbs 21, the narrower the reflection surface 21b is.

The outer edge 131a (see FIGS. 18 and 19) of the reflection surface 21b is located substantially on an extension plane of the front faces 4a and 4b of the displays 4A and 4B. The inner edge 131b of the reflection surface 21b lies further backward than the front faces 4a and 4b, and is located closer to the displays 4A and 4B than the outer edge 131a. As thus described, the inner edge 131b of the reflection surface 21b is located further backward than the outer edge 131a. Further, the reflection surface 21b is inclined so that its surface is located more backward as the distance from the displays 4A and 4B becomes nearer.

The outer edge 131c of the irregular reflection surface 21f corresponds to the inner edge 131b of the reflection surface 21b. In addition, the inner edge 131d of the irregular reflection surface 21f reaches the transparent plates 115, 129. The inner edge 131d of the irregular reflection surface 21f is located further backward than the outer edge 131c. Further, the irregular reflection surface 21f is also inclined so that its surface is located more backward as the distance from the displays 4A and 4B becomes nearer.

Effects on the gaming machine 1 can be produced by blinking the full color LEDs 121 & 125 within the frames 110 & 123, or lighting them in various colors. Some of the light emitted from the full color LEDs 121 & 125 is blocked by the front douser 110 & 128 and the side douser 114 & 130 of the frames 110 & 123, and prevented from reaching the player's eyes. The rest of the light transmits through the transparent plate 115 & 129, passes through the gate holes HL, and is reflected by the reflector 131. The reflected light M1, M2 enter the view fields of the player and the spectator, and enhance the appealing effect of the gaming machine 1.

Light can be prevented from easily entering the player's view field with the gaming machine 1, since the full color LEDs 121 & 125 are disposed at further inside the cabinet 3 than the front faces 4a and 4b of the displays 4A and 4B. Furthermore, burden on the player's eyes can be reduced, since the reflected light intensity from the reflector 131 is suppressed, compared with the irradiated light intensity from the full color LEDs 121 & 125. As a result, illumination effects by the full color LEDs 121 & 125 can reduce fatigue of the player's eyes. Furthermore, the player cannot broke the full color LEDs 121 & 125, since the full color LEDs 121 & 125 are disposed inside the cabinet 3.

Furthermore, the light intensity of the reflected light M2 by the irregular reflection face 21f formed on the reflector 131 is suppressed, compared with the light intensity of the reflected light M1 by the reflection surface 21b. Therefore the dazzle that the player feels is reduced and the player can concentrate on the game.

Furthermore, the reflector 131 is disposed along the right and left edges of the displays 4A and 4B. The player and the spectator focuses their attention to the displays 4A and 4B on which game information is being presented. The illumination light near the side edges of the displays 4A and 4B is enhanced by the reflected light M1, M2 from the reflector 131. As a result, the displays 4A and 4B are emphasized so that the appealing effect to the spectator of the gaming machine 1 is enhanced, while reducing the burden on the player's eyes.

Furthermore, the full color LEDs 121 & 125 are disposed inside the frames 110 & 123, facing the reflector 131, at a location near the displays 4A and 4B. Wiring can be made simpler, since the full color LEDs 121 & 125 and the displays 4A and 4B are close to each other so that the displays 4A and 4B and the full color LEDs 121 & 125 can receive electric power from a common power supply. Furthermore, the full color LEDs 121 & 125 are arranged inside the frames 110 & 123, so that the appealing effect of the gaming machine 1 can be enhanced and the displays 4A and 4B can be also emphasized by the leaking light from the frames 110 & 123.

The reflection surfaces 21b of the reflector 131 are disposed on the right and left sides of the displays 4A and 4B. Furthermore, the reflection surface 21b is inclined so that its surface is located more backward as the distance from the displays 4A and 4B becomes nearer. As a result, the reflected light M1 from the reflection surface 21b can be reach the view field of a spectator positioned at the diagonally backward of the player and can enhance the appealing effect to the spectator without the burden on the player's eyes.

[Display Device]

Figure 20:
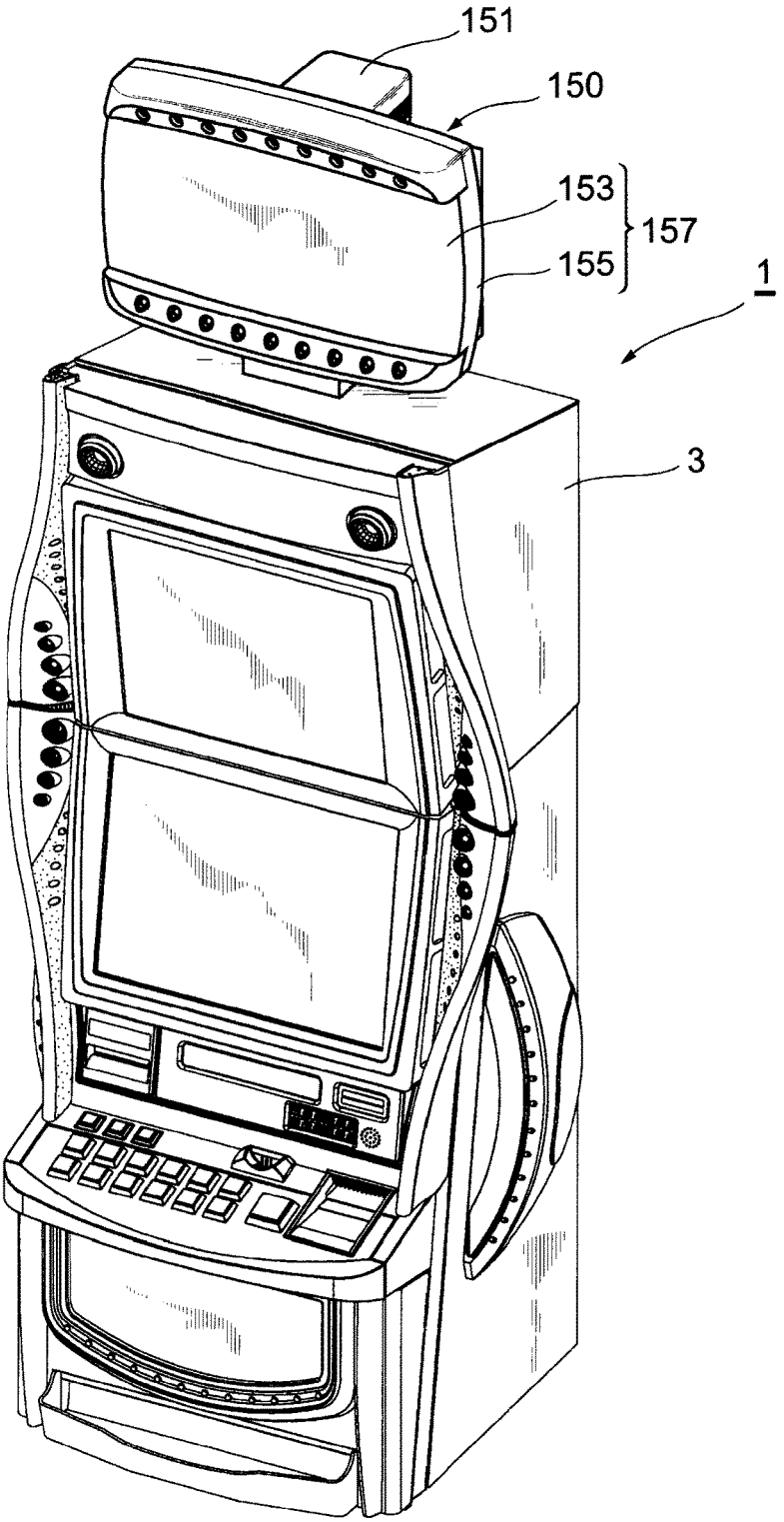
FIG. 20 is a perspective view of the gaming machine with a display device attached thereto.
Figure 21:
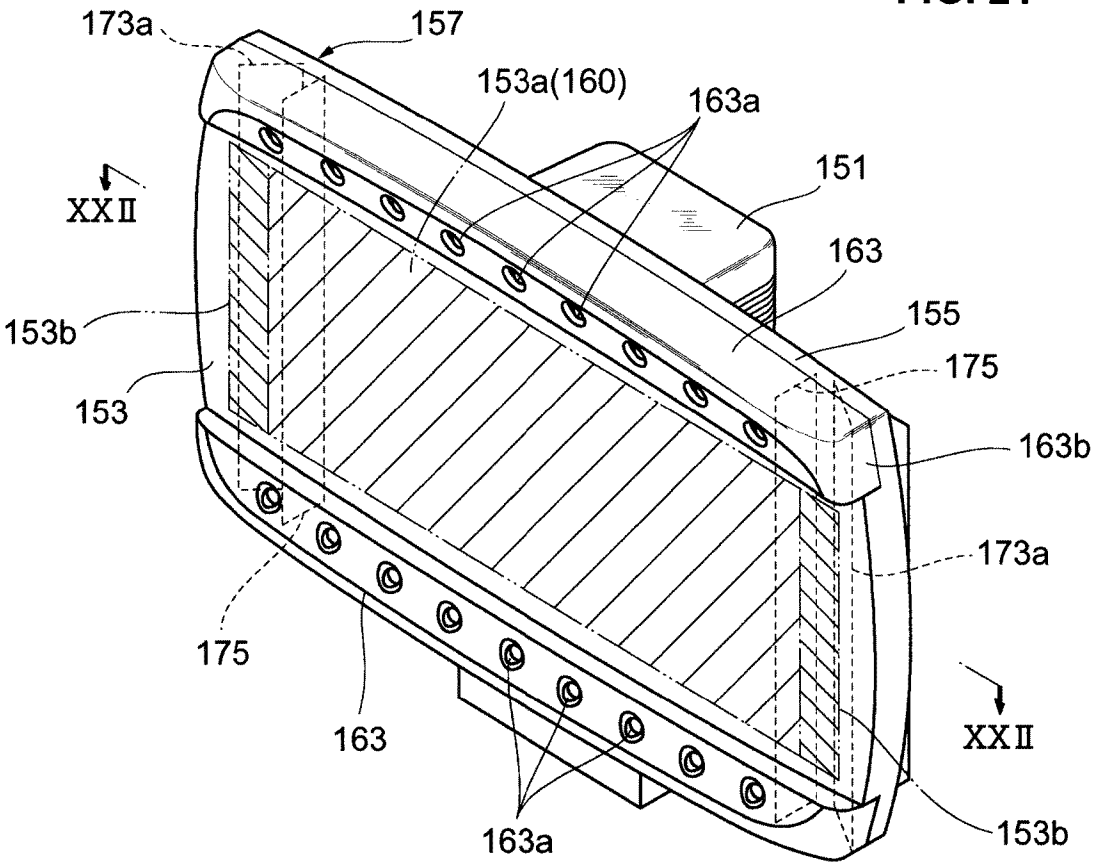
FIG. 21 is a perspective view of the display device.
Figure 22:
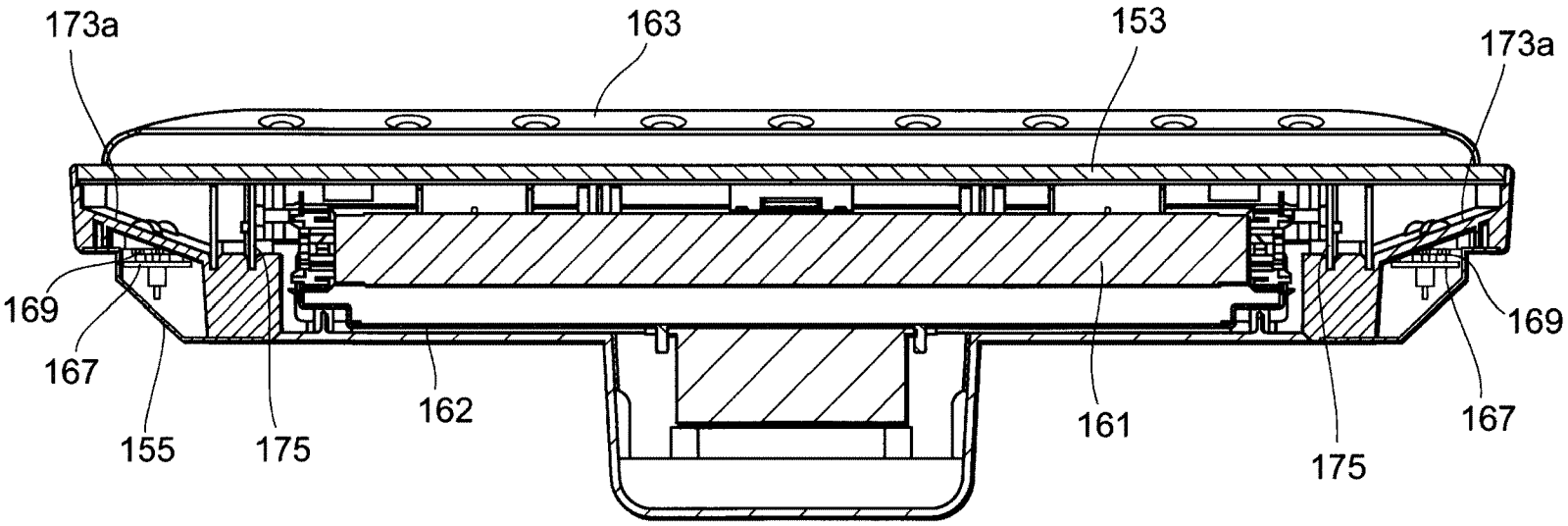
FIG. 22 is a sectional view taken along line XXII-XXII in FIG. 21.
Figure 23:
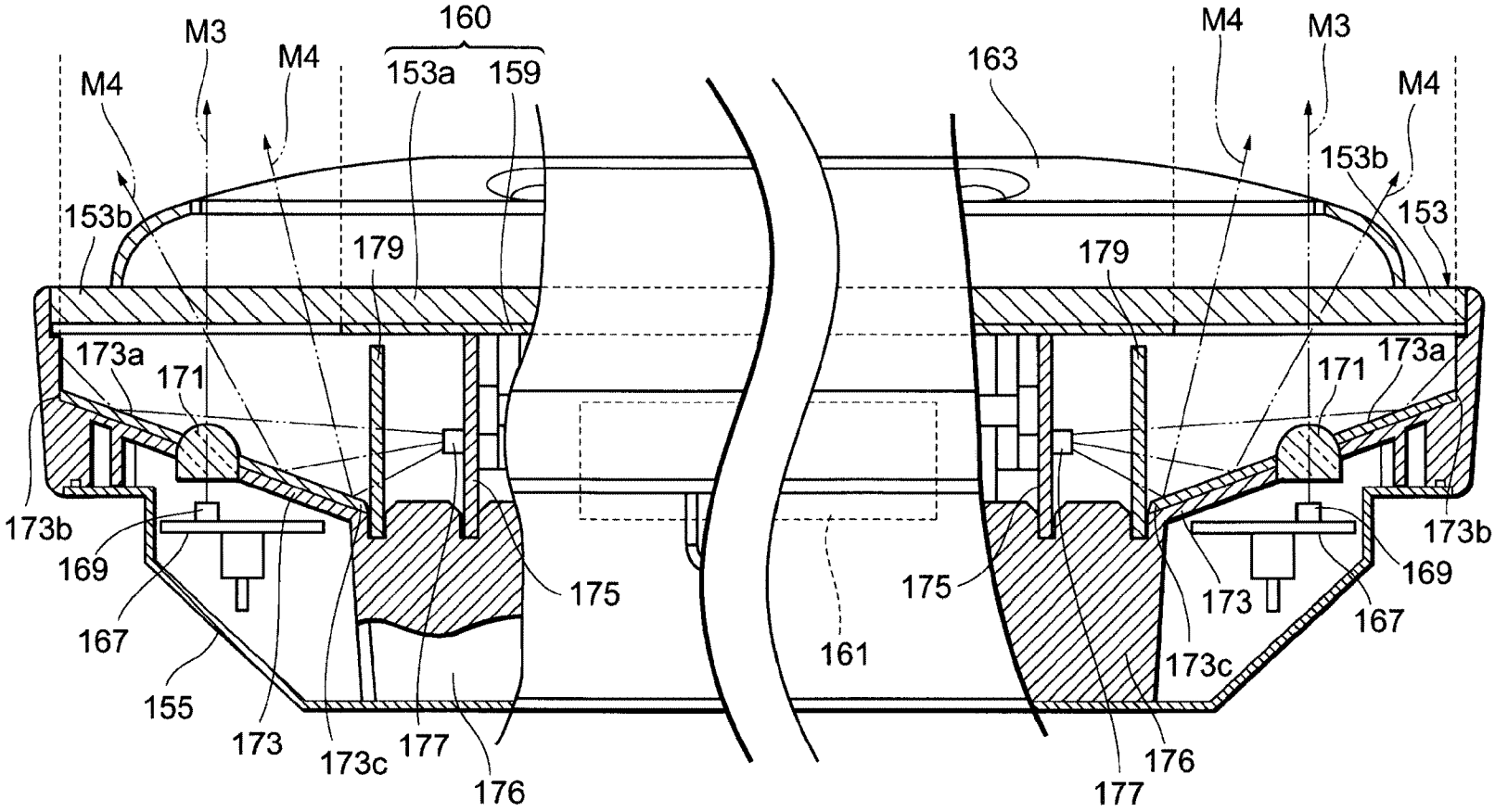
FIG. 23 is an enlarged sectional view of the right and left sides of the display device.
Figure 24:
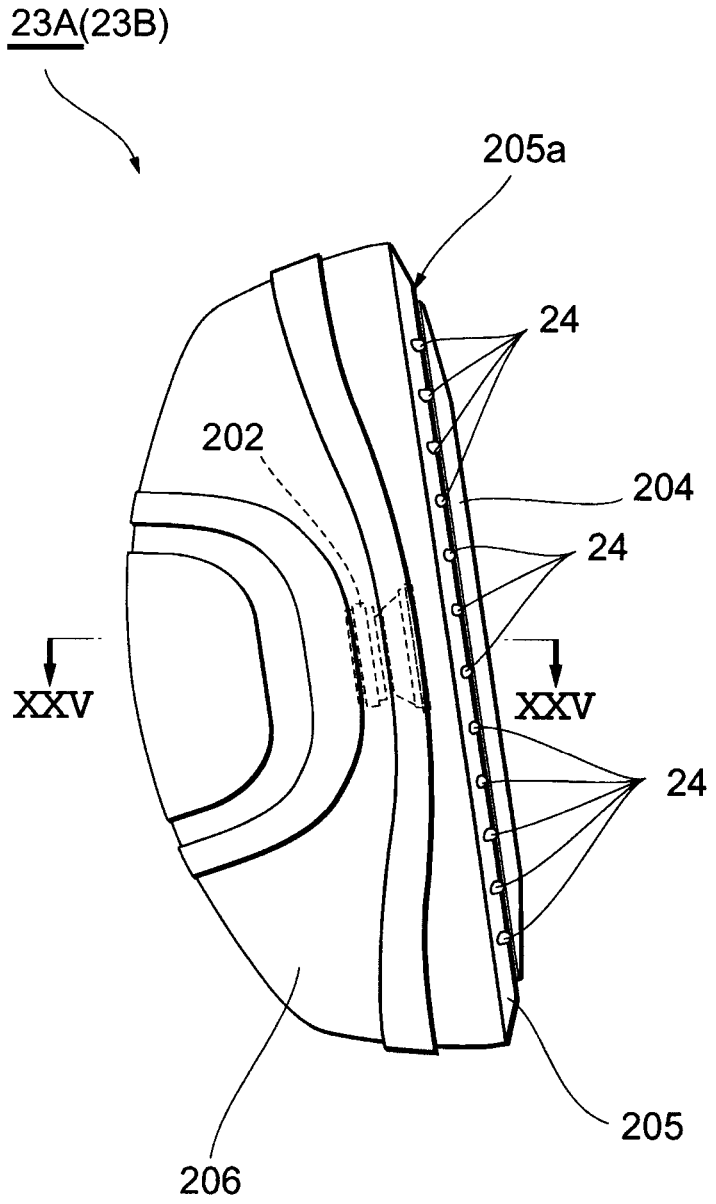
FIG. 24 is an enlarged side view of the speaker in FIG. 2.

As shown in FIG. 20, a display device (topper effect producing unit) 150 is fixed to the uppermost part of the cabinet 3 of the gaming machine 1 via a column 151. The display device 150 includes, as shown in FIGS. 21 to 23, a housing 157 composed of a transparent acrylic plate 153 on the front and an opaque rear cover 155 on the back. A film 159 (see FIG. 23) is disposed on substantially center of the back of the acrylic plate 153. The film 159 has logo marks or character images displayed thereon which indicate the title of the slot game. A fluorescent lamp box 162 (see FIG. 22) which accommodates the fluorescent lamp 161 is provided behind the film 159. The film 159 is fixed between the acrylic plate 153 and the fluorescent lamp box 162. A display area 160 (see FIG. 23) for presenting information relating to the game includes a central portion 153a of the acrylic plate 153 which contacts the film 159, and the film 159. The light irradiated from the fluorescent lamp 161 transmits through the display area 160 and illuminates the images of the film 159.

An LED unit 163 is fixed to the upper part of the housing 157 along the upper edge of the acrylic plate 153 (see FIG. 21). The LED unit 163 is chrome plated. In addition, the LED unit 163 has a laterally long casing 163b, a circuit board, and a plurality of white LEDs. A plurality of lenses 163a are attached to the front face of the casing 163b. The circuit board is accommodated inside the casing 163b along the longitudinal direction of the casing 163b. The plurality of white LEDs are installed on the circuit board, corresponding to the position of the plurality of lenses 163a. A similar LED unit 163 is also provided at the lower part of the housing 157. The white light emitted from the white LEDs in the LED unit 163 transmits through the lenses 163a and is irradiated forward.

Circuit boards 167 (see FIGS. 22 and 23) are fixed to the right and left edges of the rear cover 155 along the vertical direction. The circuit boards 167 have a plurality of white LEDs 169 installed toward the front. An inclined plate 173 is provided between the circuit board 167 and the acrylic plate 153. The inclined plate 173 has a plurality of lenses 171 attached thereon along the longitudinal direction of the circuit board 167. The white light emitted from the white LEDs 169 transmits through the lenses 171 on the inclined plate 173 and the acrylic plate 153, and is irradiated forward. Furthermore, a chrome-plated reflection surface 173a which can reflect light is formed on the surface of the inclined plate 173. The reflection surface 173a faces the acrylic plate 153 and is inclined so that the outer edge 173b which is far from the display area 160 is close to the acrylic plate 153, and the inner edge 173c which is near the display area 160 is far from the acrylic plate 153.

Circuit boards 175 are provided laterally inside the right and left side inclined plates 173 along the vertical direction respectively. The circuit board 175 is located behind the display area 160 and fixed to a bracket 176. The bracket 176, which is fixed to the inner surface of the rear cover 155, projects from the inner surface toward the front. A plurality of full color LEDs (illuminants) 177 are installed on the circuit board 175 toward the reflection surface 173a. A semitransparent opalescent plate 179 is fixed to the bracket 176 between the circuit board 175 and the reflection surface 173a. The light irradiated from the full color LEDs 177 is reflected by the reflection surface 173a after transmitting through the opalescent plate 179. The reflected light M4 from the reflection surface 173a transmits through the right and left areas 153b of the acrylic plate 153 and is irradiated forward.

With the display device 150, light emitted from the full color LEDs 177 can not easily enter the player's view field, since the full color LEDs 177 are disposed inside the housing 157. Furthermore, burden on the player's eyes can be reduced, because the light intensity of the reflected light M4 from the reflector 173a is suppressed, compared with the light intensity of the light emitted from the full color LEDs 177. As a result, illumination effects by the full color LEDs 177 can reduce fatigue of the player's eyes. Furthermore, the player cannot broke the full color LEDs 177, since the full color LEDs 177 are disposed inside the housing 157.

Furthermore, the reflection surfaces 173a are disposed along the side edges of the display area 160 which shows the game information. The player who are pondering to select which type of gaming machine to play checks not only the displays 4A and 4B, but also the display area 160 of the display device 150. The light intensity of the right and left edges of the display area 160 is reinforced by the reflected light M4 from the reflection surface 173a. As a result, the display area 160 is emphasized, whereby the appealing effect of the gaming machine 1 to the spectator is enhanced with reducing the burden on the player's eyes.

Furthermore, the reflection surface 173a is inclined as stated above. As a result, the reflected light M4 from the reflection surface 173a becomes easier to reach the view field of a spectator positioned at the diagonally backward of the player, whereby the appealing effect to the spectator is enhanced with reducing the burden on the player's eyes.

[Speaker (Sound Module)]

As shown in FIG. 3, laterally projecting speakers (sound modules) 23 are provided on the right and left sides of the cabinet 3 as an effect producing unit relating to the game. The speakers 23 are positioned along the sides of the center display 4B and the operation table 10. The speaker 23A is provided on the right side (on the observers' left) of the cabinet 3, and the speaker 23B is provided on the left side (on the observers' right) of the cabinet 3. The speaker 23A is located behind the front door 6 when the side-opening front door (first door) 6 is opened and held at the side of the cabinet 3. The sound source unit 201 disposed within the speaker 23A corresponds to the first sound source unit of the present invention, and the sound source unit 201 disposed within the speaker 23A corresponds to the second sound source unit of the present invention.

The speaker 23 has a laterally projecting arch-shaped front face. As shown in FIGS. 24 to 27, the speaker 23 has a sound source unit 201 which outputs sound disposed therein. The sound source unit 201 includes a speaker unit 202 and an enclosure 203 which accommodates the speaker unit 202. The speaker unit 202 is fixed to the front wall of the enclosure 203. The enclosure 203 is fixed to the side face of the cabinet 3.

The speaker unit 202 is disposed above the operation table 10 and below the center display 4B. In addition, the speaker 23 is inclined backwardly so that the front face of the speaker unit 202 is in parallel with the front face 4b of the center display 4B (see FIG. 1). Sound effect to the player can be enhanced by tilting the speaker unit 202 backwardly in this manner and directing the output sound from the speaker unit to the player.

Figure 28:
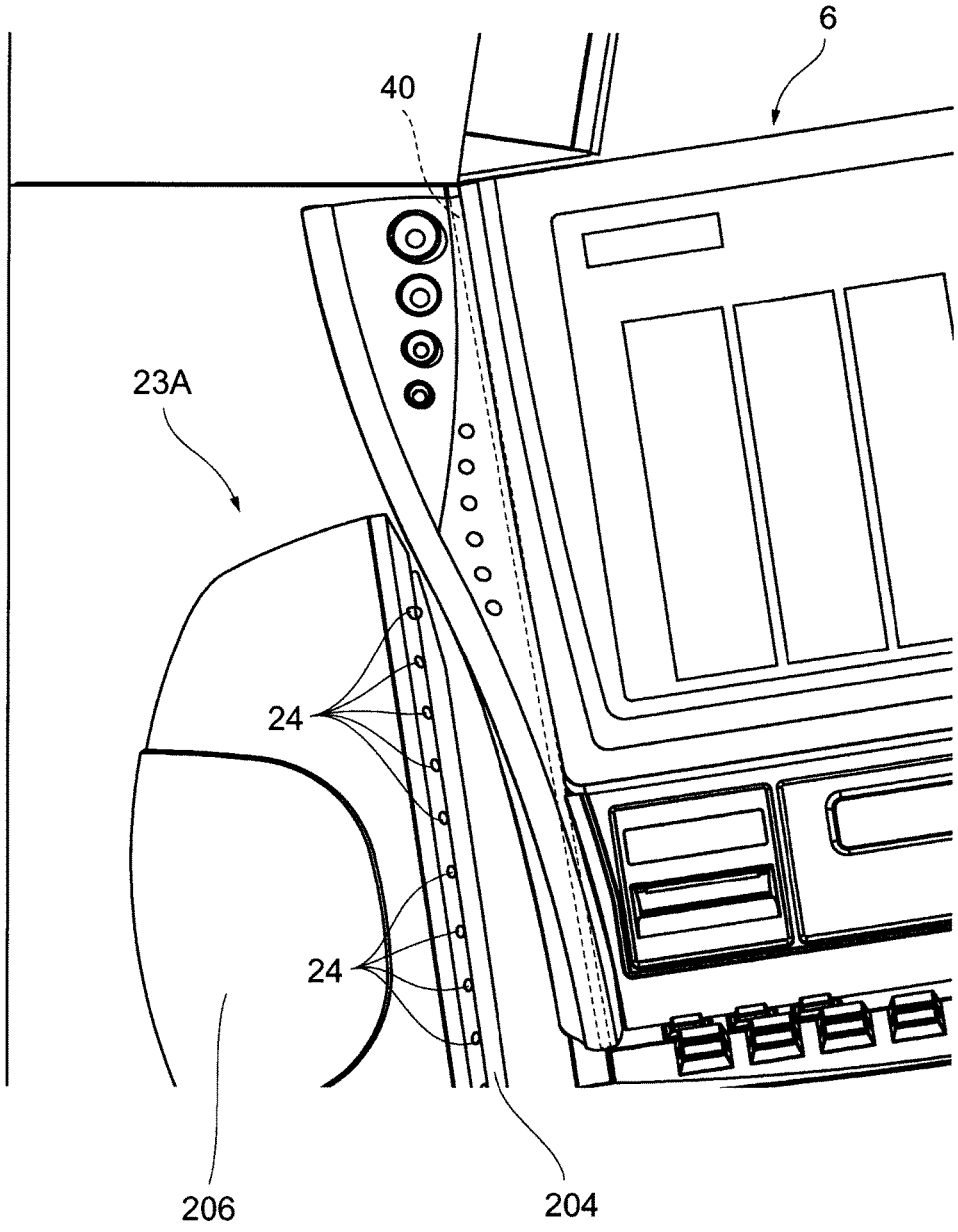
FIG. 28 is a right-hand side view of the gaming machine with the front door kept open.

FIG. 28 is a right side view of the gaming machine 1 with the front door 6 being open. The front door 6, which is opened and closed by swinging substantially horizontally, is attached to the front face of the cabinet 3 via a hinge 40 which is slightly inclined backwardly. The speaker 23A is disposed further backward than the hinge 40. Specifically, the speaker 23A is disposed at a position that does not obstruct the opening motion of the front door 6. Even if the front door 6 is fully opened, contact between the front door 6 and the speaker 23A can be avoided, whereby damage due to interference between the front door 6 and the speaker 23A is prevented.

The speaker 23 further includes, as shown in FIGS. 24 to 27, a net 204, a frame 205, and a rear cover 206. The net 204 covers the front face of the sound source unit 201. The net 204 is fixed to the frame 205, and the frame 205 is fixed to the front of the rear cover 206. The rear cover 206 covers the side face and the rear face of the sound source unit 201. The frame 205 and the rear cover 206 are attached to the side face of the cabinet 3.

The frame 205, which constitutes the front periphery of the speaker 23, is disposed on the front of the sound source unit 201. In addition, the periphery surface of the frame 205 is formed as an inclined surface 205a. The inclined surface 205a is formed so that it tilts further backwardly to the edge. In other words, the inclined surface 205a faces diagonally outward of the gaming machine 1.

The inclined surface 205a has openings 205b (see FIG. 26) formed thereon for exposing the speaker lamps 24. The front peripheries of the speakers 23A and 23B have some of the above-mentioned illuminants 20 disposed thereon. The illuminants 20 (the speaker lamps 24) are projected from the inclined surface 205a (see FIGS. 30 to 32).). In addition, the speakers 23A and 23B are formed as a part of the illuminants 20.

Figure 25:
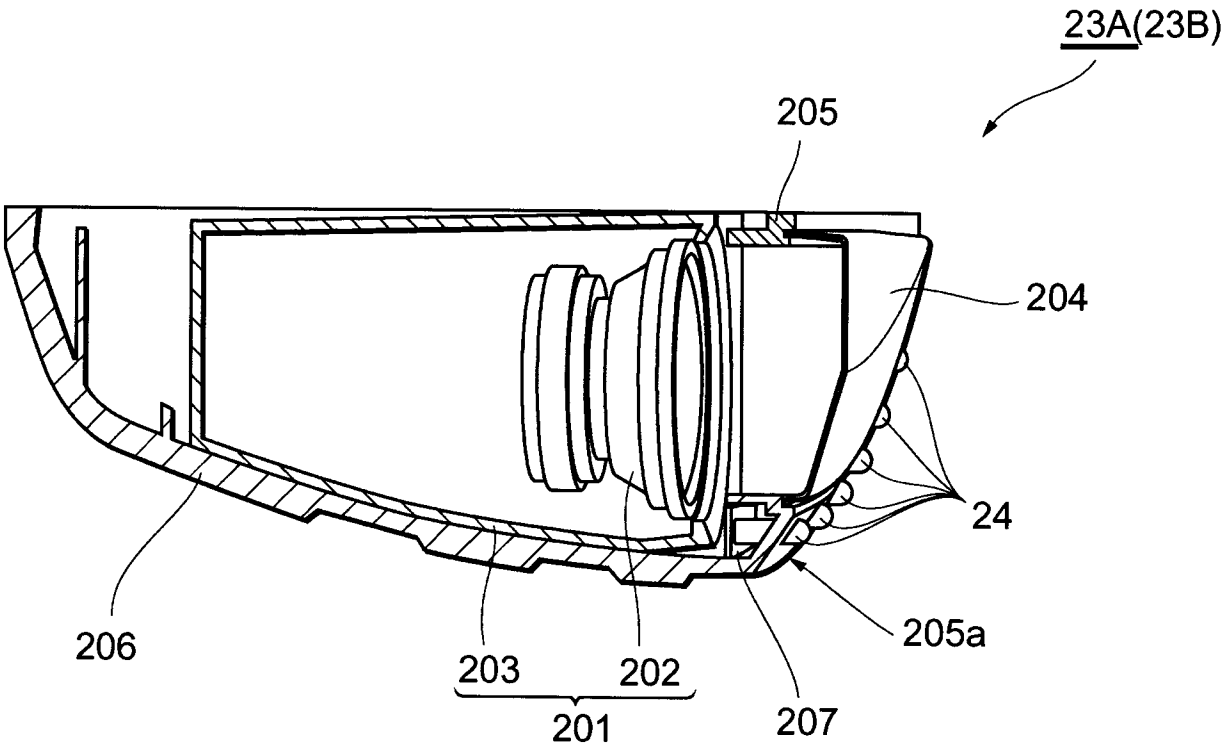
FIG. 25 is a sectional view taken along line XXV-XXV in FIG. 24.
Figure 26:
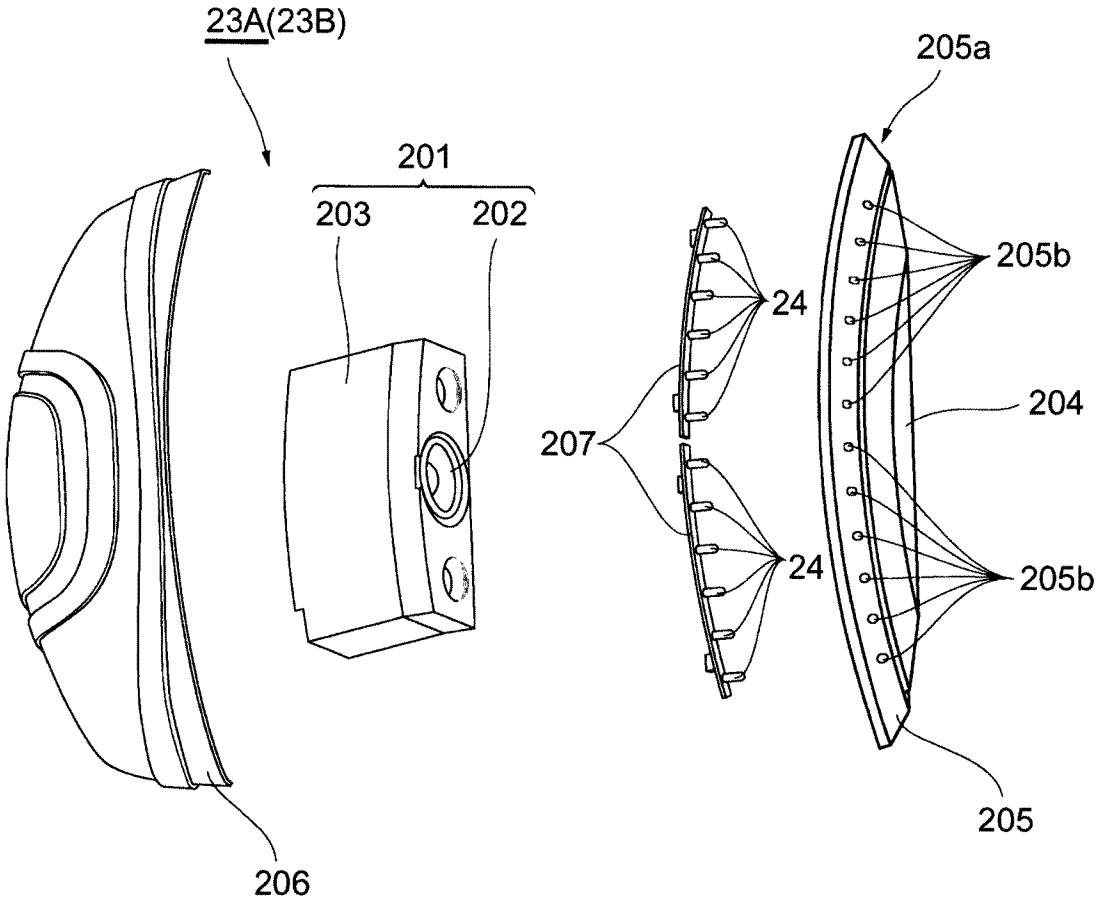
FIG. 26 is an exploded perspective view of the speaker in FIG. 24.
Figure 27:
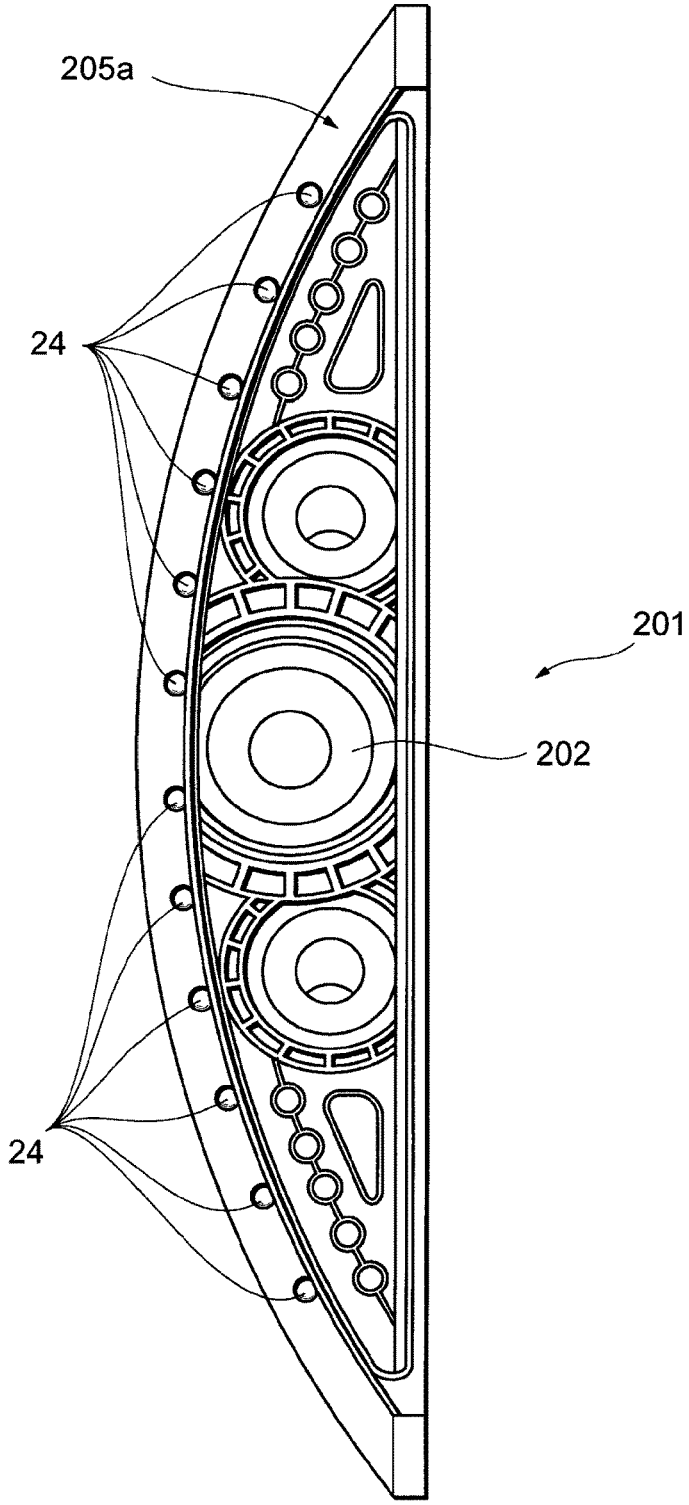
FIG. 27 is a front view of the speaker with the net being removed.
Figure 29:
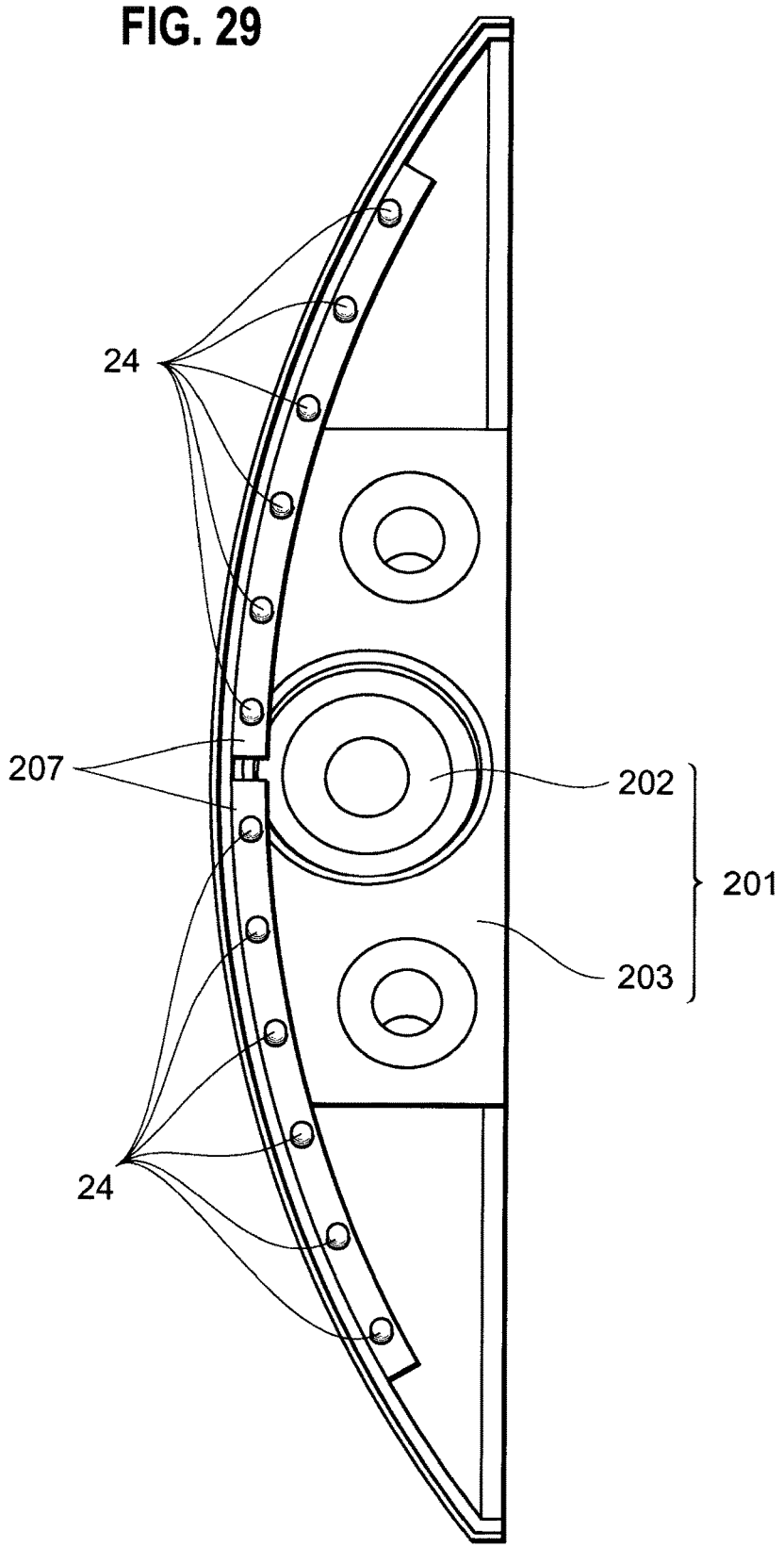
FIG. 29 is a front view illustrating an arrangement of a sound source, a circuit board, and a speaker lamp in the speaker.

As shown in FIGS. 25 and 26, the speaker lamps 24 are fixed on a circuit boards 207 and disposed along the periphery of the speaker 23. FIG. 29 is a front view illustrating the arrangement of the sound source unit 201, the circuit boards 207, and the speaker lamps 24 inside the speaker 23. The circuit boards 207 are fixed in front of the sound source unit 201 as shown in FIG. 29. When seen from the front, some of the speaker lamps 24 overlaps the sound source unit 201. As a result, it may result in space saving of the lateral width of the gaming machine 1.

Figure 30:
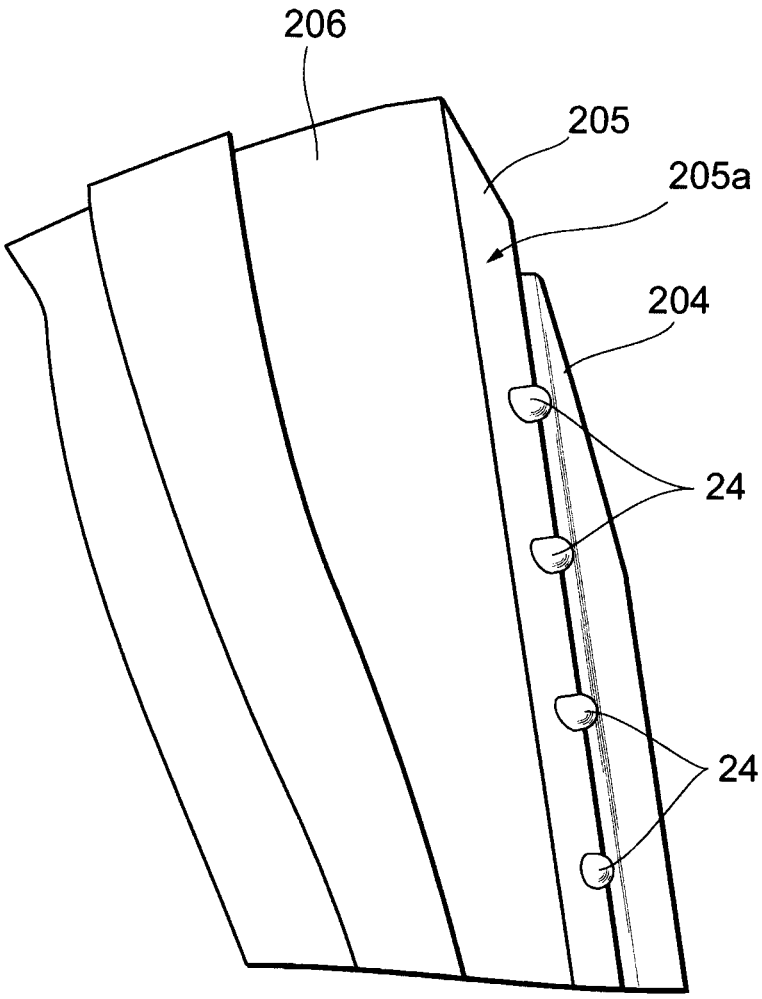
FIG. 30 is an enlarged side view illustrating an inclined surface and the speaker lamp.
Figure 31:
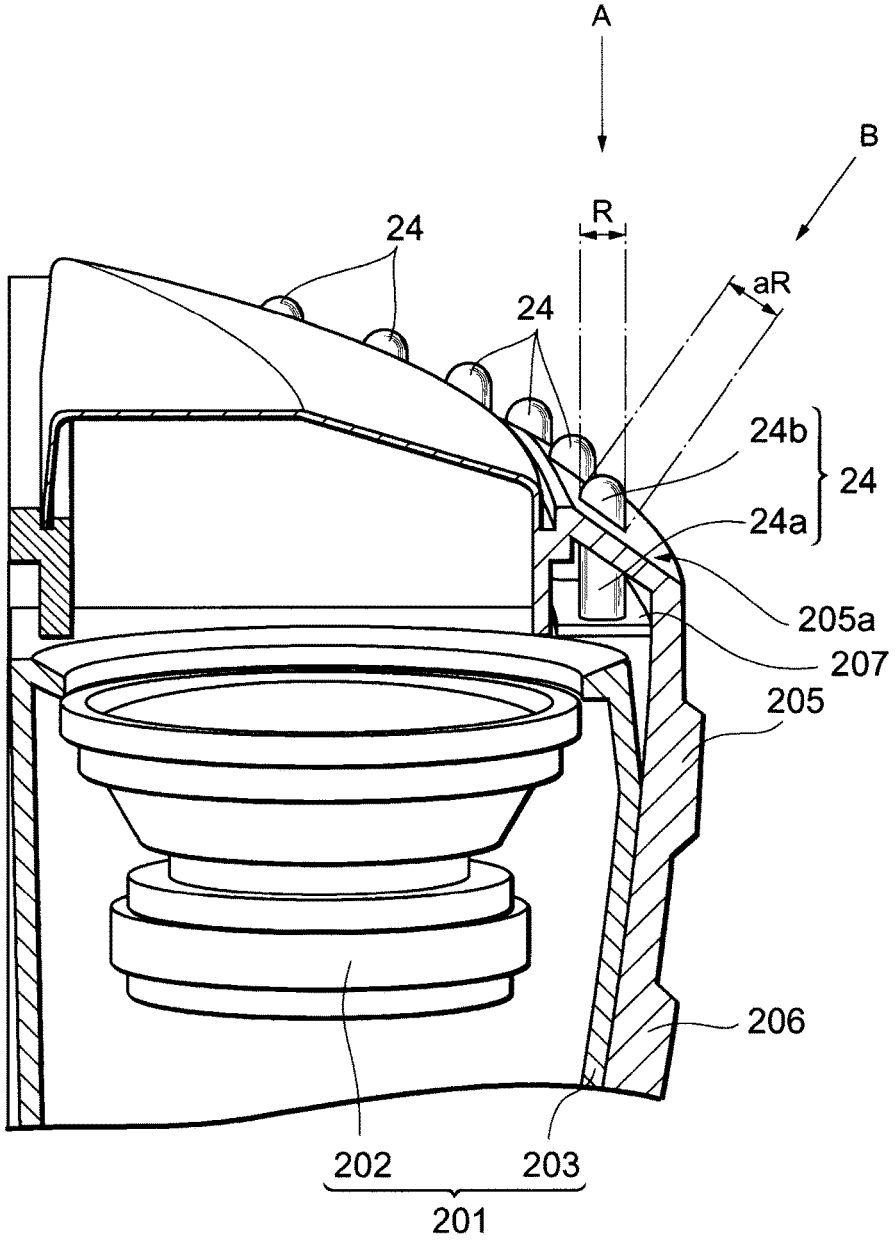
FIG. 31 is an enlarged sectional view illustrating the inclined surface and the speaker lamp.
Figure 32:
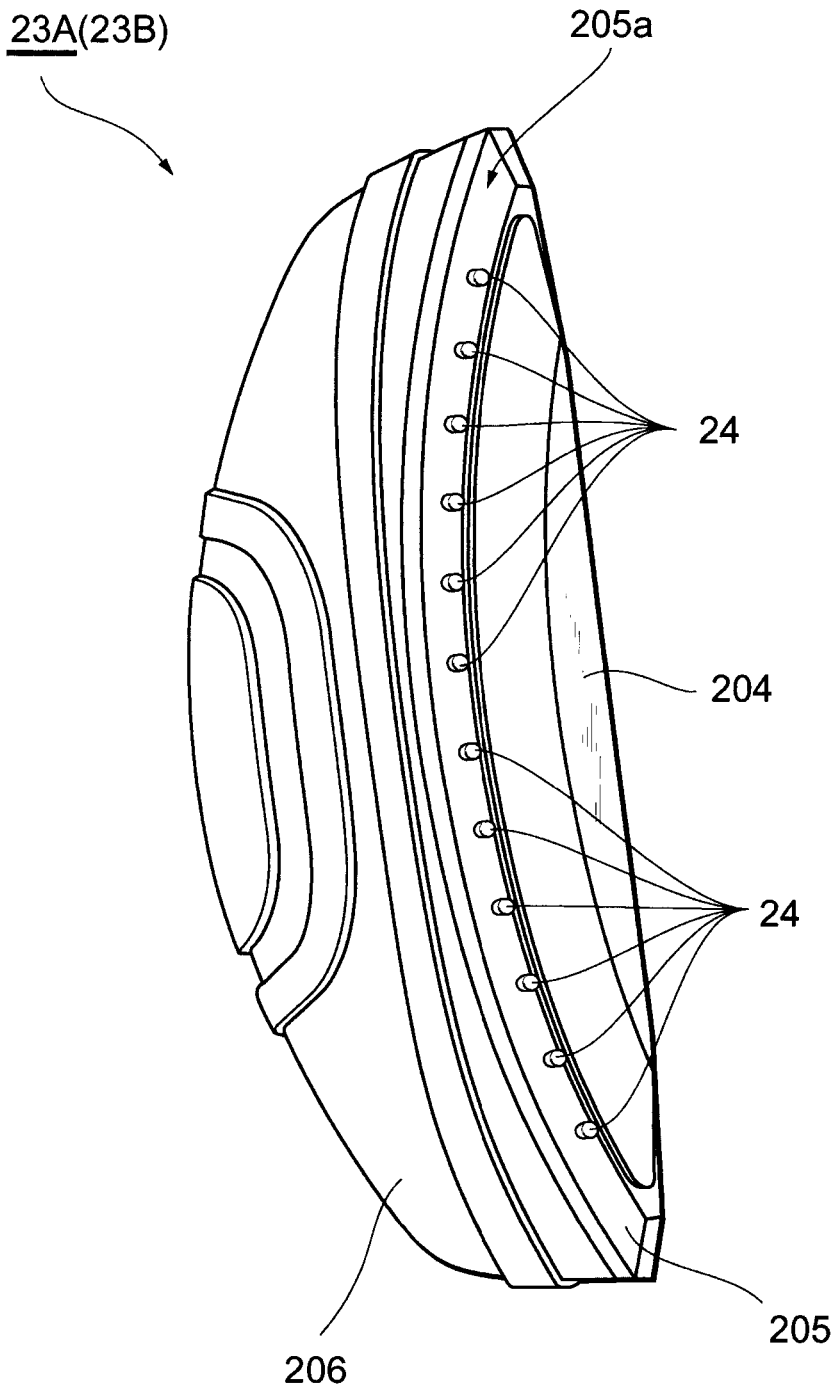
FIG. 32 is a perspective view illustrating the speaker shown in FIG. 24 from a direction opposing the inclined surface.

Each of the speaker lamps 24 has a cylindrical base portion 24a as shown in FIG. 31. The cylindrical base portion 24a is disposed so that its axial direction conforms with the back-forward direction of the cabinet 3. In addition, the tip-end portion 24b of the speaker lamp 24 has a semispherical shape. The circuit boards 207 are fixed to the front edge of the enclosure 203. The surface of the circuit boards 207 face toward the front of the cabinet 3. As shown in FIGS. 30 to 32, the speaker lamps 24 project from the inclined surface 205a. In other words, the axial line of the speaker lamps 24 and the inclined surface 205a intersect with a predefined angle. The tip-end portion 24b is exposed from the inclined surface 205a. The cylindrical base portion 24a is also partially exposed from the inclined surface 205a.

Next, how the speaker lamps 24 are seen from the spectator positioned near the gaming machine 1 will be described. As shown in FIG. 31, when the speaker lamps 24 are seen from the front (direction A) of the gaming machine 1, a diameter of the light emission range of the speaker lamps 24 is the diameter R of the speaker lamps 24 itself. On the other hand, when the speaker lamps 24 are seen diagonally from the front (direction B: that the inclined surface 205a is facing), the a major axis of the light emission range of the speaker lamps 24 is aR (aR is larger than R). In other words, the speaker lamps 24 can easily draw attention of a spectator positioned at the position substantially facing the inclined surface 205a, whereby the appealing effect of the gaming machine 1 is enhanced.

Figure 33:
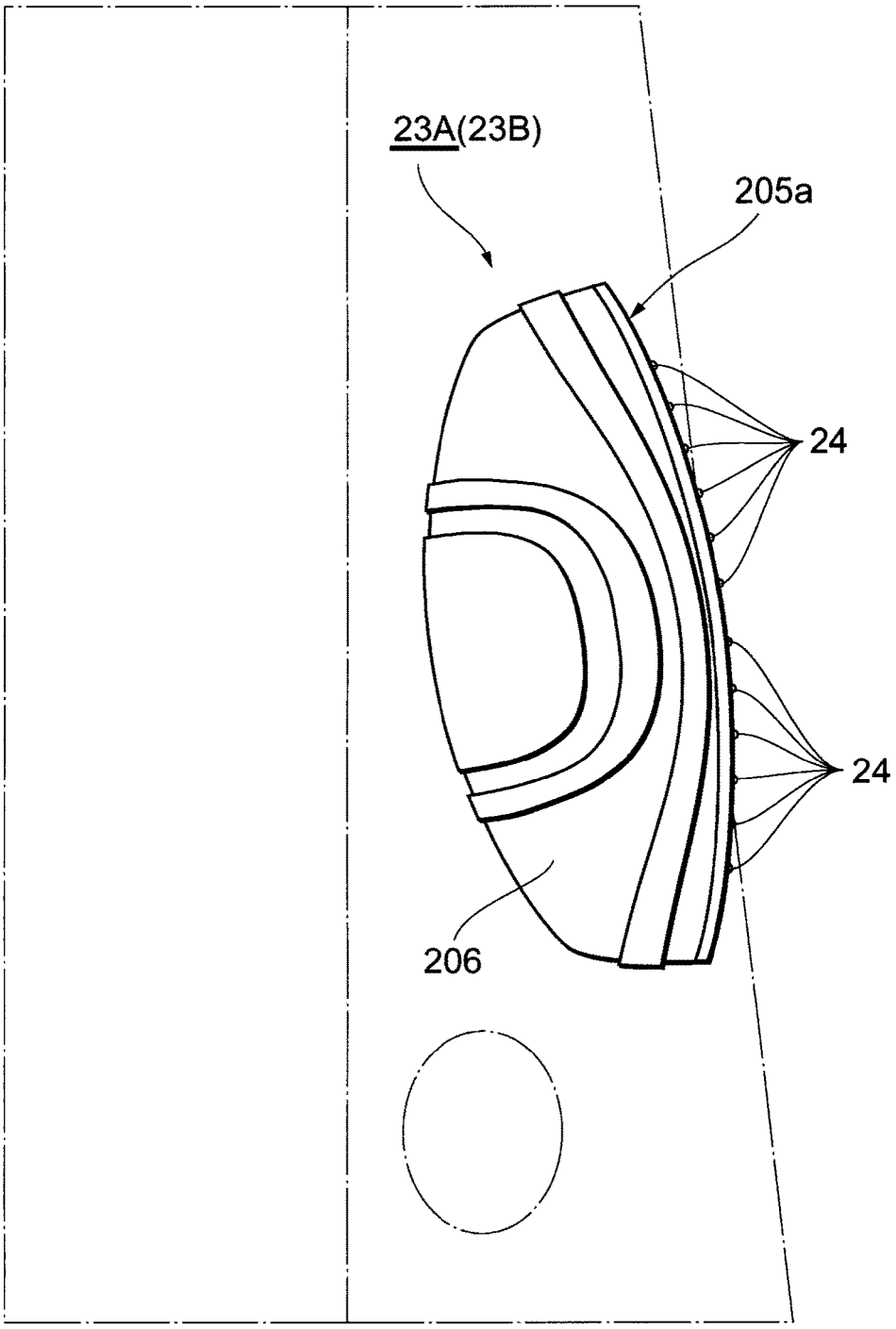
FIG. 33 is a perspective view illustrating the speaker shown in FIG. 24 from diagonally backward from the gaming machine.

As shown in FIG. 33, the front periphery of the speaker 23 is the inclined surface 205a inclining backwardly, on which the speaker lamps 24 are disposed. Therefore, the speaker lamps 24 can also be viewed diagonally from the back side of the gaming machine 1. In other words, the range in which the light from the speaker lamps 24 is visible extends diagonally backward from the gaming machine 1, whereby the appealing effect of the gaming machine 1 is enhanced to the spectator positioned at the diagonally backward of the gaming machine 1.

With the gaming machine 1 of the present embodiment, the speaker 23A is provided in the backward region of the front door 6 while the front door 6 is open. Therefore, the spaces between the adjacent gaming machines 1 can be utilized efficiently, while the sound effect is enhanced by the speaker 23. Here, the gaming machine 1 of the present embodiment is disposed to include the speaker 23 as the "effect producing unit". However, the gaming machine 1 may include another effect producing unit such a light emitting device, a display, or the like. In addition, the front door 6 may swing substantially horizontally or slides substantially horizontally.

In addition, the gaming machine 1 of the present embodiment includes the center display 4B and the operation table 10, wherein the center display 4B is disposed above the operation table 10. The speaker units 202 are disposed above the operation table 10 and below the center display 4B. In this manner, the speaker units 202 can be disposed near the player, whereby the sound effect to the player is further enhanced.

In addition, the center display 4B is inclined backwardly and the front face of speaker unit 202 is parallel with the front face of the center display 4B. The player can watch the display in a comfortable position by inclining the center display 4B backwardly in this manner. Furthermore, the sound effect to the player can be further enhanced by inclining the speaker unit 202 backwardly in parallel with the center display 4B.

In addition, the sound effect can be produced by the output sound from the sound source unit 201 within the speaker 23 since the gaming machine 1 has the speaker 23 as the effect producing unit. In addition, the player can concentrate on the game without moving his/her sight line to the speaker 23, since the sound source unit 201 disposed at the side of the cabinet 3 is employed as the effect producing unit, unlike the case of illumination effects by the light emitting device or image effects on the displays.

In addition, the interval between the sound source units 201 can be expanded in comparison with prior art models since the sound source units 201 are provided on the both sides face of the cabinet 3. As a result, the sound effects such as stereo effect and surround effect by the sound source units 201 (especially speaker units 202) can be enhanced, and the spaces between the adjacent gaming machines 1 can be efficiently utilized for the sound effects.

Additionally, with the gaming machine 1, light from the speaker lamps 24 can enhance the appealing effect of the gaming machine 1 to a spectator positioned around the gaming machine 1 without interfering with the game player's play, since the center display 4B is provided on the front face of the cabinet 3 and the speaker lamps 24 are provided on the side of the cabinet 3.

In addition, the speaker lamps 24 are projected from the inclined surface 205a which faces diagonally outward. Thus, light from the speaker lamps 24 appear wider when the speaker lamps 24 are seen diagonally than when the speaker lamps 24 are seen from the front of the cabinet 3. As a result, the appealing effect of the gaming machine 1 can be enhanced since the speaker lamps 24 can easily draw attention of the spectator positioned diagonally from the cabinet 3.

It becomes further more difficult for the light from the speaker lamps 24 to enter the player's view field and the appealing effect to spectators who are watching the gaming machine 1 from a distant location can be further enhanced, since the speaker lamps 24 are disposed at a predefined distance from the edge of the center display 4B.

In addition, the sight line of the spectator who is looking at the speaker lamps 24 can be directly focused on the center display 4B, since the speaker lamps 24 are disposed above the operation table 10 and below the center display 4B (i.e. the speaker lamps 24 extend from operation table 10 to the center display 4B). In addition, the sight line of the spectator who is looking at the speaker lamps 24 can be directly focused on the center display 4B by disposing the speaker lamps 24 in parallel with the center display 4B.

In addition, the speaker lamps 24 are disposed on the front face of the sound source unit 201 projecting laterally from the cabinet 3. In other words, the speaker lamps 24 are disposed at positions overlapping with the sound source unit 201 when seen from the front. This may result in space saving of the lateral width of the gaming machine 1. For example, space saving of the lateral width of the gaming machine 1 can be also achieved even if the aperture of the speaker units 202 is expanded to overcome lack of bass level and enhance sound quality.

Here, although some of the speaker lamps 24 and the speaker units 202 are disposed above the operation table 10 and below the center display 4B, the speaker lamps 24 and the speaker units 202 may be disposed at other height positions.

[Top Lamp]

Figure 34:
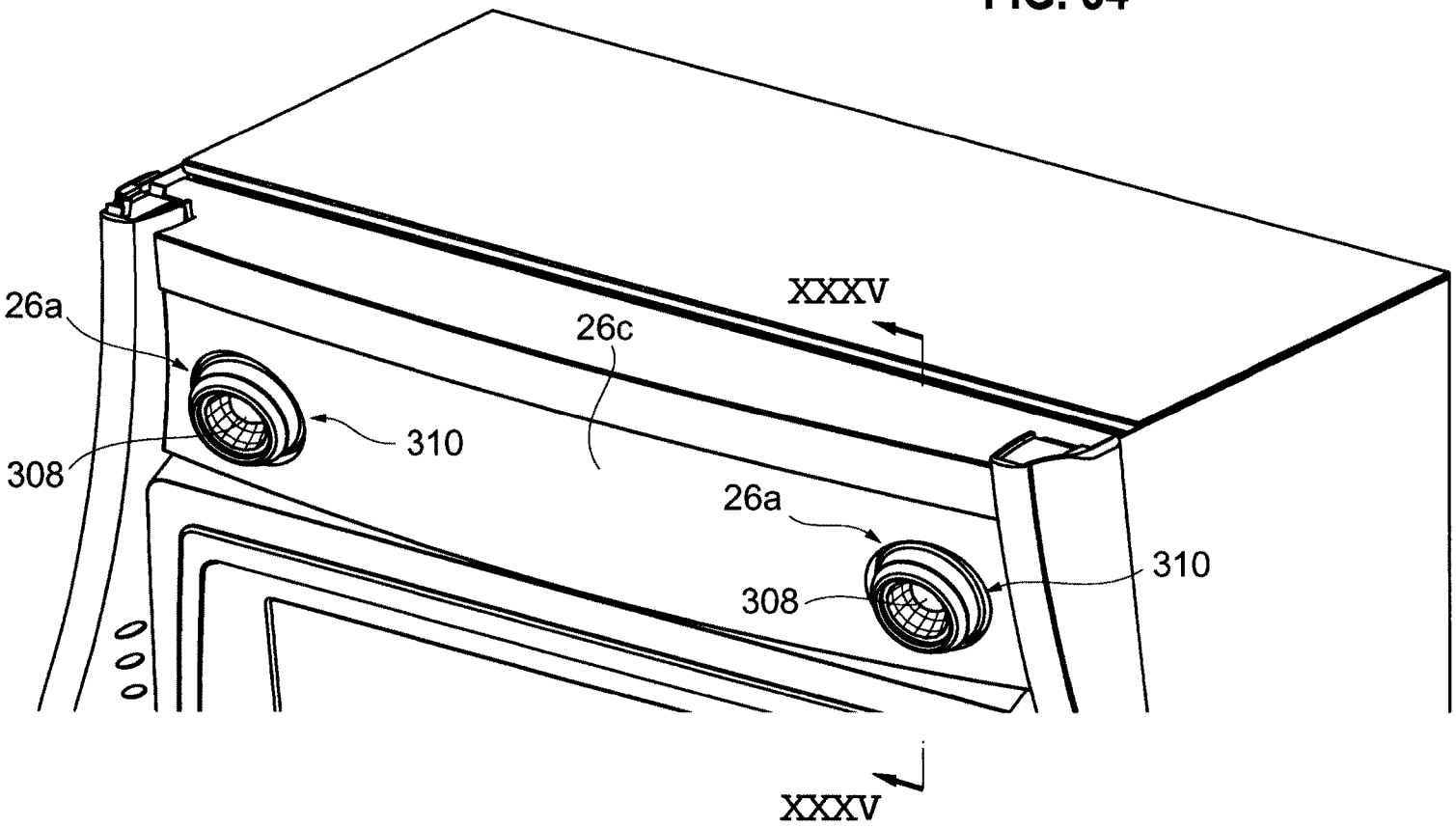
FIG. 34 is an enlarged view illustrating a main part of a top lamp of the gaming machine of FIG. 1.
Figure 35:
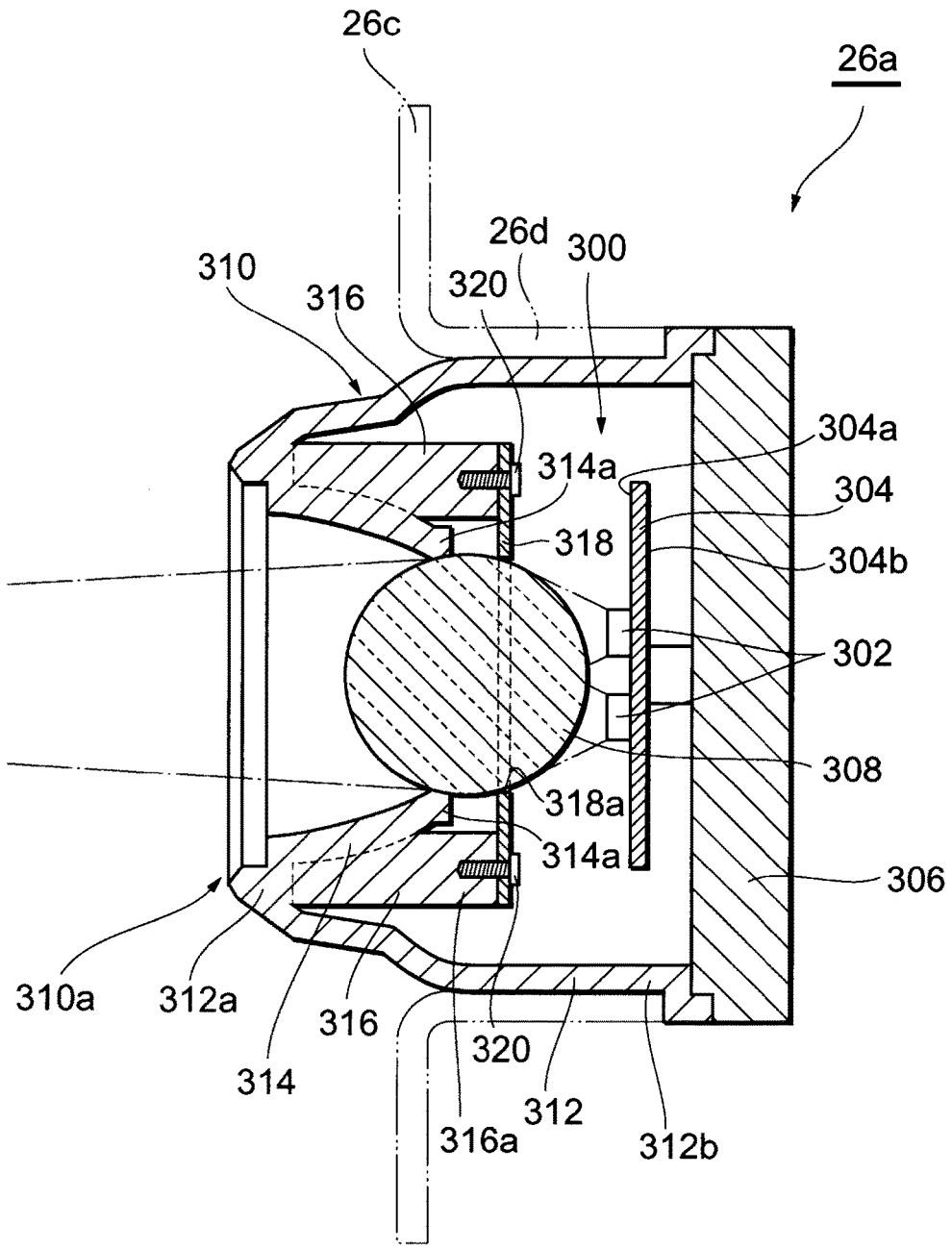
FIG. 35 is a sectional view taken along line XXXV-XXXV of the top lamp shown in FIG. 34.

The power lamps 26a of the top lamp 26 will be described in detail, referring to FIGS. 34 and 35.

A cover plate 26c is disposed on the front of the top lamp 26. The power lamps 26a are projected from the cover plate 26c. Each of the power lamp 26a emits light substantially horizontally. The power lamp 26a includes a power illuminant 300 and a barrel (light shield) 310. The barrel 310 guides the light emitted from the power illuminant 300 and outputs the light from the exit aperture 310a.

The power illuminant 300 includes a circuit board 304 having four LEDs 302 installed thereon, a base plate 306 supporting the circuit board 304, and a lens 308 through which the light from the LEDs 302 is transmitted. The circuit board 304 is disposed substantially perpendicular and its surface 304a is faced toward the exit aperture 310a of the barrel 310. Four LEDs 302 are aligned in two rows and two columns on the surface 304a of the circuit board 304. These LEDs 302 are full color LEDs whose lighting, blinking, and lighting color are controlled by a signal circuit (not shown).

The back surface 304b of the circuit board 304 is connected to the base plate 306. The base plate 306 itself is fixed to the cabinet 3. The lens 308 is a ball lens disposed just in front of the four LEDs 302. The light emitted from the LEDs 302 transmits through the lens 308 toward the exit aperture 310a. Here, the light emitted from the LEDs 302 is refracted while it transmits through the lens 308 and converged substantially horizontally as beam of light.

The barrel 310 has a cylindrical shape extending substantially horizontally. The barrel 310 is inserted into a tube-shaped lamp hole 26d provided on the cover plate 26c. The barrel 310 surrounds the lens 308 and the circuit board 304 of the power lamp illuminants 300. The light from the power illuminant 300 is emitted from the exit aperture 310a by the barrel 310.

The barrel 310 includes an outer cylinder 312 and an inner cylinder 314 which locates inside the outer cylinder 312. The outer cylinder 312 has a substantially cylindrical shape and is gradually tapered toward the front. The back end 312b of the outer cylinder 312 is fixed to the base plate 306. The inner cylinder 314 is joined with the front end 312a of the outer cylinder 312 and extends inside the outer cylinder 312. The inner cylinder 314 is funnel-shaped and tapered backward.

A pair of bosses 316 are formed between the outer cylinder 312 and the inner cylinder 314. The bosses 316 are columns extending backward from the front end 312a. The boss 316 extends between the outer cylinder 312 and the inner cylinder 314, and its back ends 316a are reached backward than the back end 314a of the inner cylinder 314. A plate 318 which is parallel with the circuit board 304 is bridged over the back ends 316a of the pair of bosses 316. The plate 318 is fixed to the back ends 316a of the bosses 316 with screws 320.

A round hole 318a is made in the center of the plate 318, and the above-mentioned lens 308 is fitted in the round hole 318a from the front. The lens 308 abuts with the back end 314a of the inner cylinder 314, and is sandwiched between the back end 314a and the plate 318.

With such a power lamp 26a, the light from the LEDs 302 is inputted into the lens 308 and refracted to the beam of light. In other words, the light from the LEDs 302 is converged by transmitting the lens 308 into the substantially horizontally beam of light with high rectilinearity. Then, the light which transmits through the lens 308 inside the inner cylinder 314 is emitted from the exit aperture 310a of the barrel 310.

In other words, only the light which transmits through the lens 308 among the light emitted from the LEDs 302 is emitted from the exit aperture 310a. And the rest of the light is blocked by the barrel 310, since the LEDs 302 and the lens 308 are surrounded by the barrel 310 in the power lamp 26a. Therefore, the irradiation region of the emitted light from the power lamp illuminants 300 is limited to the region of the substantially horizontal converging light (see dashed-dotted line of FIG. 35).

Therefore, the player, who is playing right below the power lamp 26a and is facing the display 4 and the operation table 10, is out of the irradiation region of the power lamp 26a, so that the light from the power lamp 26a is not irradiated to the player. As a result, the light from the power lamp 26a does not enter the player's view field, whereby the player's fatigue is reduced and the player can concentrate on the game.

In addition, the emitted light from the power lamp illuminants 300 can not be easily irradiated downward compared with the spreading light, since the light from the power lamp 26a is substantially horizontally converged by the lens 308. In other words, the situation such that the light from the power lamp illuminants 300 is effectively prevented from entering the player's view field by the lens 308. Additionally, the light converged by the lens 308 can easily reach a long distance, whereby the appealing effect of the light to the spectator positioned at a distance is enhanced. Moreover, various light effects, which are impossible by single-color illuminants, can be realized and the illumination effects are enhanced, since the power lamp 26a uses full color LEDs 302 as illuminants 200.

Here, the barrel (light shield) 310 need not surround the power lamp illuminants 300, but it suffices to be placed between the power lamp illuminants 300 and the player so as to block at least some of the light toward the player. However, it is preferable that the light shield surrounds the power lamp illuminants 300, because the light from the power lamp illuminants 300 is prevented from entering the player's view field.

Figure 36:
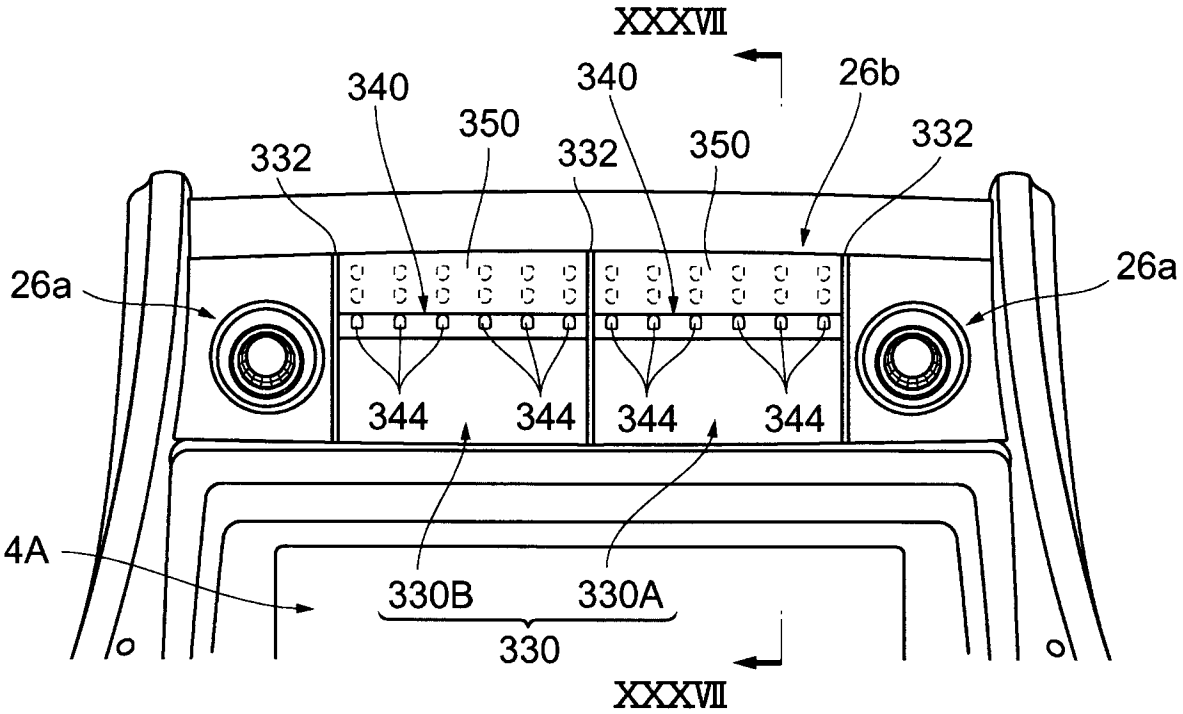
FIG. 36 is a front view of the top lamp of FIG. 34 with its cover plate being omitted.

Next, the belt lamp 26b of the top lamp 26 will be described in detail, referring to FIGS. 36 to 38.

Cavities 330 are provided between the above-mentioned power lamps 26a which are disposed at both sides of the top lamp 26. The cavity 330 is provided across substantially the full length between the power lamps 26a behind the cover plate 26c. The cavity 330 is a recessed space on the front face of the cabinet 3 and its cross section is substantially rectangular.

The cavity 330 is divided into a left cavity 330A and a right cavity 330B by three walls 332 which are perpendicular to the cover plate 26c. Illuminant units 340 and reflection plates 350 are accommodated inside the left cavity 330A and the right cavity 330B. The reflection plates 350 reflect the light from the illuminant units 340. The belt lamp (illuminant) 26b includes the cavity 330, the illuminant units 340, and the reflection plates 350.

The illuminant unit 340 is disposed laterally at the substantial middle level of respective cavities 330A and 330B. The illuminant unit 340 includes a reed-shaped circuit board 342 and six LEDs 344 which are installed on the circuit board 342 at regular intervals. The circuit board 342 is provided slightly inclined and its surface faces diagonally upward. Each of the LEDs 344 on the circuit board 342 is a white LED, for example, and its lighting or blinking is controlled by a signal circuit (not shown). As shown in FIG. 37, denoting the straight line connecting the LEDs 344 and the lower edge 330a of the cavity 330 as straight line N when seen from the side, a layout is provided in which straight line N intersects with a line which is perpendicular to the front face of the cabinet 3 (for example, line 4p which is perpendicular to the front face 4a of the upper display 4A) with an angle δ (acute angle).

The reflection plate 350 is fabricated by bending a stainless plate. The reflection plate 350 includes a base plate 352 supporting the illuminant unit 340 and a reflection plate 354 located above the base plate 352. The base plate 352 is erected from the base 330b of the cavity 330 and holds the circuit board 342. The reflection plate 354 extends from the upper end 352a of the base plate 352 diagonally upward to the front. The reflection plate 354 is bent along an bending line 354c near the middle between its lower edge 354a and upper edge 354b. The reflection plate 354 is divided into a first reflection plate 354A below the bending line 354c and a second reflection plate 354B above the bending line 354c.

Here, mirror finished reflection surfaces 356A and 356B are formed on respective surfaces of the first reflection plate 354A and the second reflection plate 354B. The reflection plane 356A of the first reflection plate 354A is inclined against the horizontal plane H with a first inclination angle β. And the reflection surface 356B of the second reflection plate 354B is inclined against the horizontal plane H with a second inclination angle γ. Additionally, as stated above, the reflection plate 354 is bent along the bending line 354c, and then the second inclination angle γ is smaller than the first inclination angle β.

Some of the light from the LEDs 344 is reflected by the reflection surfaces 356A and 356B and proceeds to the opening (exit aperture of the belt lamps 26b) of the cavity 330. In this occasion, the second reflection plate 354B is further from the LEDs 344 than the first reflection plate 354A and the second inclination angle γ is smaller than the first inclination angle β. Therefore, the reflected light from the reflection surface 356A and the reflected light from the reflection surface 356B are off-set to be reflected in a substantially parallel manner.

Next, how the light from the belt lamp 26b appears will be described.

Figure 37:
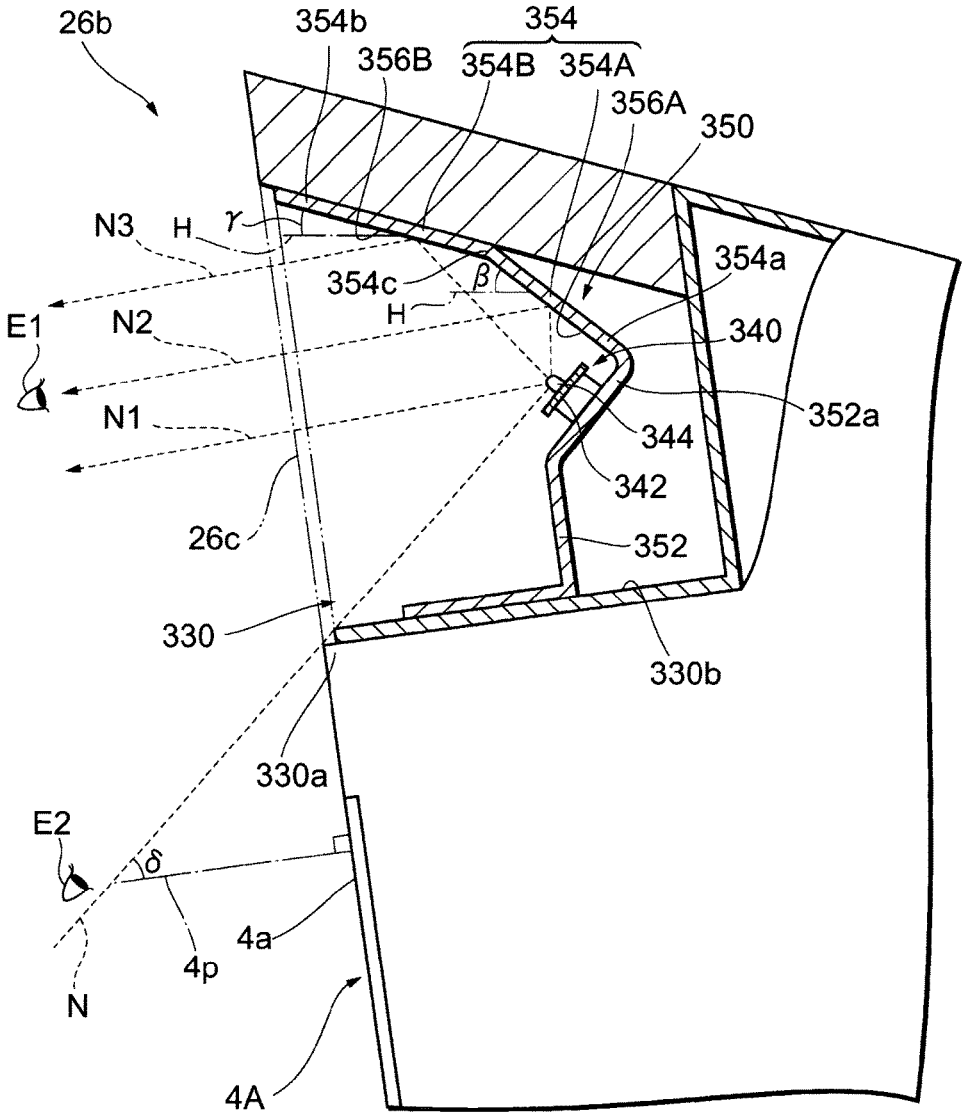
FIG. 37 is a sectional view taken along line XXXVII-XXXVII of the belt lamps shown in FIG. 36.

As shown in FIG. 37, the height of the standing spectator's eyes E1 who is facing the gaming machine 1 is positioned at the height level of the belt lamp 26b, thus the light emitted from the belt lamp 26b reaches the spectator horizontally. In other words, the light from the LEDs 344 reaches the spectator directly through the cover plate 26c which is fit into the exit aperture (that is, the opening of the cavity 330) of the belt lamp 26b as shown by arrow N1 in FIG. 37. In addition, other than the light shown by arrow N1, the reflected light from the reflection plate 354 reaches the spectator through the cover plate 26c as shown by arrows N2, N3 in FIG. 37. Here, light shown by arrows N2, N3 reach the spectator as two-tiered beams of light, since the reflection plate 354 includes the first reflection plate 354A and the second reflection plate 354B.

Therefore, the spectator can view three-tiered beams of light shown by arrows N1 to N3, as shown in FIG. 37. Since the thickness of the wall 332 to partitioning the left cavity 330A and the right cavity 330B is thin, light of both cavities 330A and 330B appear continuously to the spectator and then three-tiered belt-shaped light are visible in the entire belt lamp 26b.

On the other hand, the height level of the sitting player's eyes E2 who is facing the gaming machine 1 is below the belt lamp 26b by several dozen centimeters and positioned slightly above the straight line N connecting the LEDs 344 and the lower edge 330a of the cavity 330, as shown in FIG. 37. Therefore, the player can view the light emitted from the LEDs 344 but can not view the reflected light from the reflection plate 354. The player cannot view the reflected light from the first reflection plate 354A, because the reflecting point on the first reflection plate 354A is overlaps with the light directly emitted from the LEDs 344. In addition, the reflected light from the second reflection plate 354B is not reflected toward the player's eyes E2.

Figure 38:
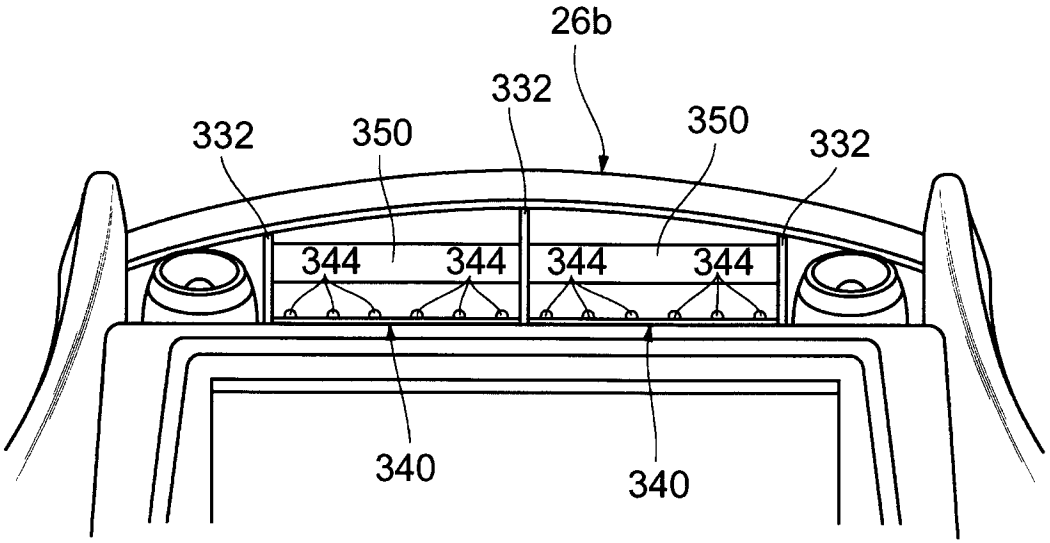
FIG. 38 is the diagram illustrating the belt lamps of FIG. 36 along the player's sight line.

Therefore, as shown in FIG. 38, the player can only view one-tiered beam of light directly emitted from the LEDs 344. The player can view the one-tiered beam of light from both cavities 330A and 330B, and the belt lamps 26b can be viewed as the one-tiered beam of light.

As thus described, the belt lamp 26b of the gaming machine 1 appears to the spectator as the three-tiered belt-shaped beams of light but as the one-tiered beam of light to the player. Therefore, the light intensity of the belt lamp 26b toward the player is smaller than the light intensity toward the spectator. In other words, the light intensity from the belt lamp 26b which enters the player's view field is reduced, whereby the player's fatigue is reduced.

In addition, the reflected light of the LEDs 344 proceeds to the spectator along two paths N2, N3, since the reflection plate 354 has the first reflection plate 354A and the second reflection plate 354B. Therefore, the appealing effect to the spectator by the belt lamp 26b is enhanced compared with the case in which the light from the LEDs 344 proceeds to the spectator along a single path, since the light intensity can be increased and the light emitting region of the belt lamp 26b can be expanded. Additionally, the viewable number of illuminants increases due to the mirror image of the LEDs 344 by the reflection plate 354, whereby the number of actual LEDs 344 can be reduced to one-third and then number of parts and energy consumption can be reduced.

Furthermore, most of the light proceeding downward the LEDs 344 is blocked by the lower edge 330a since the LEDs 344 are provided so that the straight line N intersects the perpendicular line of the front face of the cabinet 3 with the angle δ (acute angle), whereby the light intensity to the player is effectively reduced.

Figure 39:
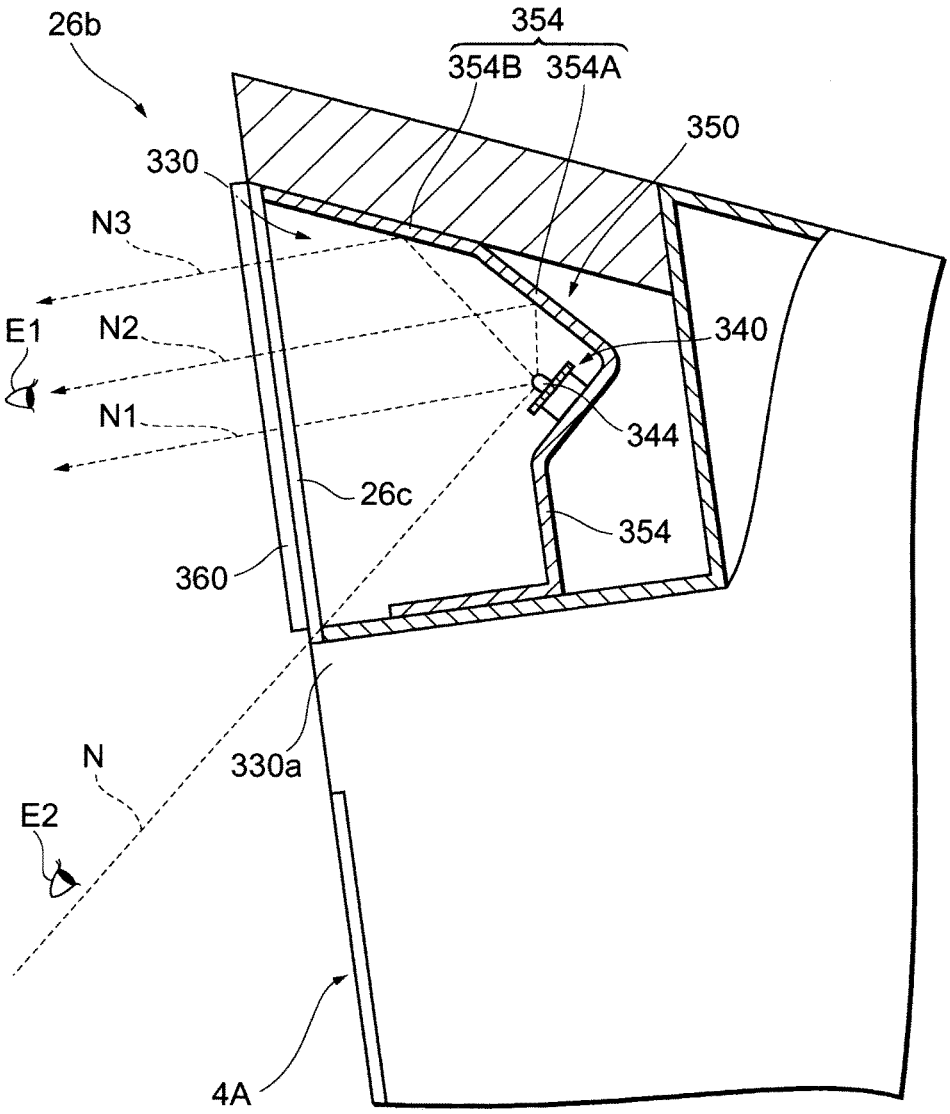
FIG. 39 is a sectional view illustrating the belt lamps of a different aspect.

Here, as shown in FIG. 39, a polarization film 360 may be applied on the surface of the cover plate 26c to adjust the light intensity of the belt lamp 26b. The polarization film 360 is applied so as to cover the entire cover plate 26c. The polarization film 360 transmits incident light with a nearly perpendicular incident angle and blocks incident light with an incident angle larger than a predefined angle. Therefore, the spectator whose eye level is substantially the same as the level of the polarization film 360 can view the emitted light from the belt lamp 26b as much as when there is no polarization film 360. On the other hand, substantially no light from the belt lamps 26b is visible by the player, since the emitted light from the belt lamps 26b is blocked by the polarization film 360. Therefore, such a polarization film 360 can effectively reduce the light intensity entering the player's view field from the belt lamp 26b, whereby the player's fatigue can be further reduced.

Figure 40:
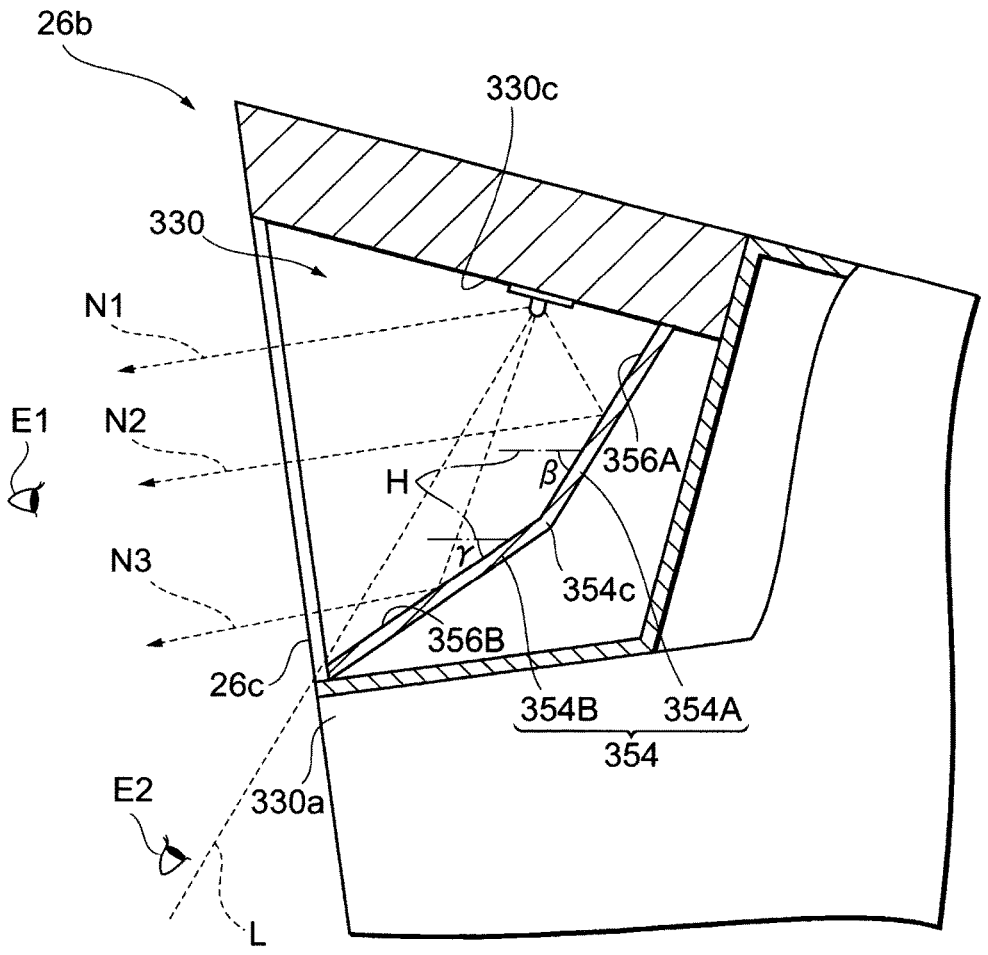
FIG. 40 is a diagram illustrating the belt lamps of a different aspect.

Here, as shown in FIG. 40, another aspect of the above-mentioned belt lamp 26b may be provided wherein the vertical positions of an illuminant unit 340 and a reflection plate 354 are inverted. In other words, with a belt lamp 26b shown in FIG. 40, the illuminant unit 340 is installed on a ceiling 330c of a cavity 330 and the reflection plate 354 is disposed below.

In the reflection plate 354, an upper part than a bending line 354c is a first reflection plate 354A having a reflection surface 356A with an inclination angle β. And the lower part than the bending line 354c is a second reflection plate 354B having a reflection surface 356B with an inclination angle γ. In other words, as with the embodiment mentioned-above, the second reflection plate 354B is more distant from the LEDs 344 than the first reflection plate 354A, and the inclination angle γ being smaller than the inclination angle β.

Similarly in the above-mentioned belt lamps 26b, the spectator can view the three-tiered beams of light shown by the arrows N1 to N3. The player can only view the light emitted from the LEDs 344. The reflected light by the reflection plate 354 is not reflected toward the player's eyes E2 which are positioned slightly above the straight line N connecting the LEDs 344 and the lower edge 330a of the cavity 330.

In other words, with the belt lamp 26b of FIG. 40, the light appears to the player as a one-tiered beam of light whereas it appears as a three-tiered belt-shaped light to the spectator, as with the belt lamp 26b of FIG. 37. As a result, the light intensity from the belt lamps 26b toward the player is smaller than the light intensity toward the spectator. In other words, the light intensity from the belt lamp 26b which enters the player's view field is reduced and the player's fatigue can be reduced.

Another embodiment of the present invention will be described in detail below, referring to the drawings.

Figure 41:
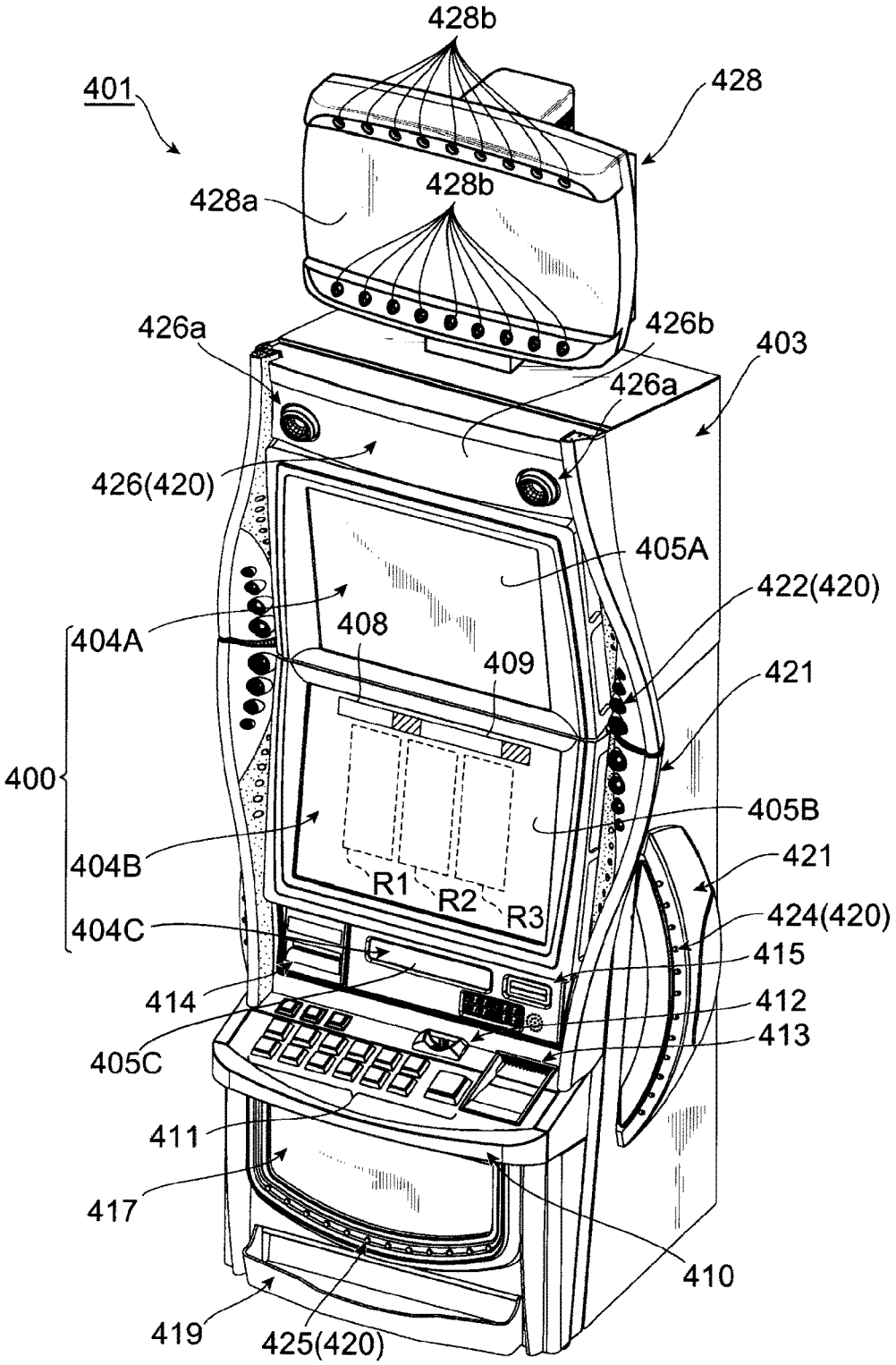
FIG. 41 is a perspective view illustrating the gaming machine of the embodiment of the present invention.

As shown in FIG. 41, the gaming machine 401 is an upright-type slot machine, which may be installed in game arcades such as casinos. The gaming machine 401 includes a cabinet 403 for accommodating electric components and mechanical components for executing predefined games. The gaming machine 401 includes an upper display 404A, a center display 404B, and a lower display 404C as a display 404 for displaying gaming information. Respective displays 404A to 404C are provided on the front face of the vertically long cabinet 403. The upper display 404A includes an LCD panel 405A disposed above the center display 404B. The LCD panel 405A displays, for example, effect images, introduction of game contents, explanation of game rules. The lower display 404C is an LCD panel disposed between the center display 404B and an operation table 410. A waist panel (effect producing unit) 417 is disposed below the operation table 410 and includes a plastics panel having images printed thereon. The plastics panel is illuminated by a back light.

The center display 404B which displays gaming progress includes a transmissive LCD panel 405B fixed to the front door of the cabinet 403. The player can view the symbols on the three-column reels R1 to R3 disposed inside the cabinet 403 through the LCD panel 405B from outside. In the region corresponding to the reels R1 to R3 on the center display 404B, a plurality of paylines running horizontally and diagonally are printed. Furthermore, a payout counter 408 and a credit counter 409 are displayed on the upper area of the center display 404B. Also, the center display 404B is slightly inclined backwardly, so that the player can play the game at ease.

The operation table 410 projecting from the front face of the cabinet 403 is provided between the lower display 404C and the waist panel 417. Operation buttons 411 (e.g., bet buttons, collect button, start button, stop button or the like) are arranged on the operation table 410 as the controller in which instructions relating to the game are input. A coin insertion slot 412 and a bill insertion slot 413 are provided on the operation table 410. A ticket printer 414 and a card reader 415 are provided between the operation table 410 and the center display 404B. Furthermore, a coin tray 419 is provided at the bottom of the cabinet 403.

In addition, illuminants 420 are disposed on the cabinet 403 such that they surround a gaming region which includes displays 404A to 404C and the operation table 410. The illuminants 420 also surround a region which includes the waist panel 417. The illuminants 420 include side lamps 422, speaker lamps 424, under lamps 425, and top lamps 426. The side lamps 422, located at the right and left sides of the cabinet 403, are provided on laterally projecting recurved-bow-shaped limbs (illuminating unit) 421. The speaker lamps 424, located at the right and left sides of the cabinet 403, are arranged along the edges of laterally projecting arc-shaped speakers 423. The under lamps 425 are arranged along the lower edge of the waist panel 417. The top lamps 426 are provided above the upper display 404A. The top lamps 426 include power lamps 426a provided at both sides, and belt lamps 426b provided between the power lamps 426a (see FIG. 43). These illuminants 420 produce attractive illumination by controlling light emission.

Appealing effect by the light from the gaming machine 401 to the spectator can be enhanced remarkably by supplementing the light of the display 404 or the operation buttons 411 on the operation table 410 with the light from the illuminants 420 surrounding the gaming region. Furthermore, the gaming machine 401 can be differentiate from other models by the illumination suitably such as changing the lighting or blinking of the illuminants 420. In this manner, an attractive gaming machine is created.

The gaming machine 401 further includes a display device 428 (topper effect producing unit) mounted on the cabinet 403. The display device 428 has a rectangular board shape. The display device 428 is provided to be substantially parallel to the LCD panel 405A of the upper display 404A.

A plastics panel 428a having images printed thereon is fitted into the front of the display device 428. The plastics panel 428a is illuminated by a back light 498 (see FIG. 45) built in the display device 428. In addition, a plurality of LEDs 428b are disposed along the horizontal edges of the plastics panel 428a at regular intervals.

Next, the internal configuration of the gaming machine 401 will be described, referring to FIGS. 42 to 45.

Figure 42:
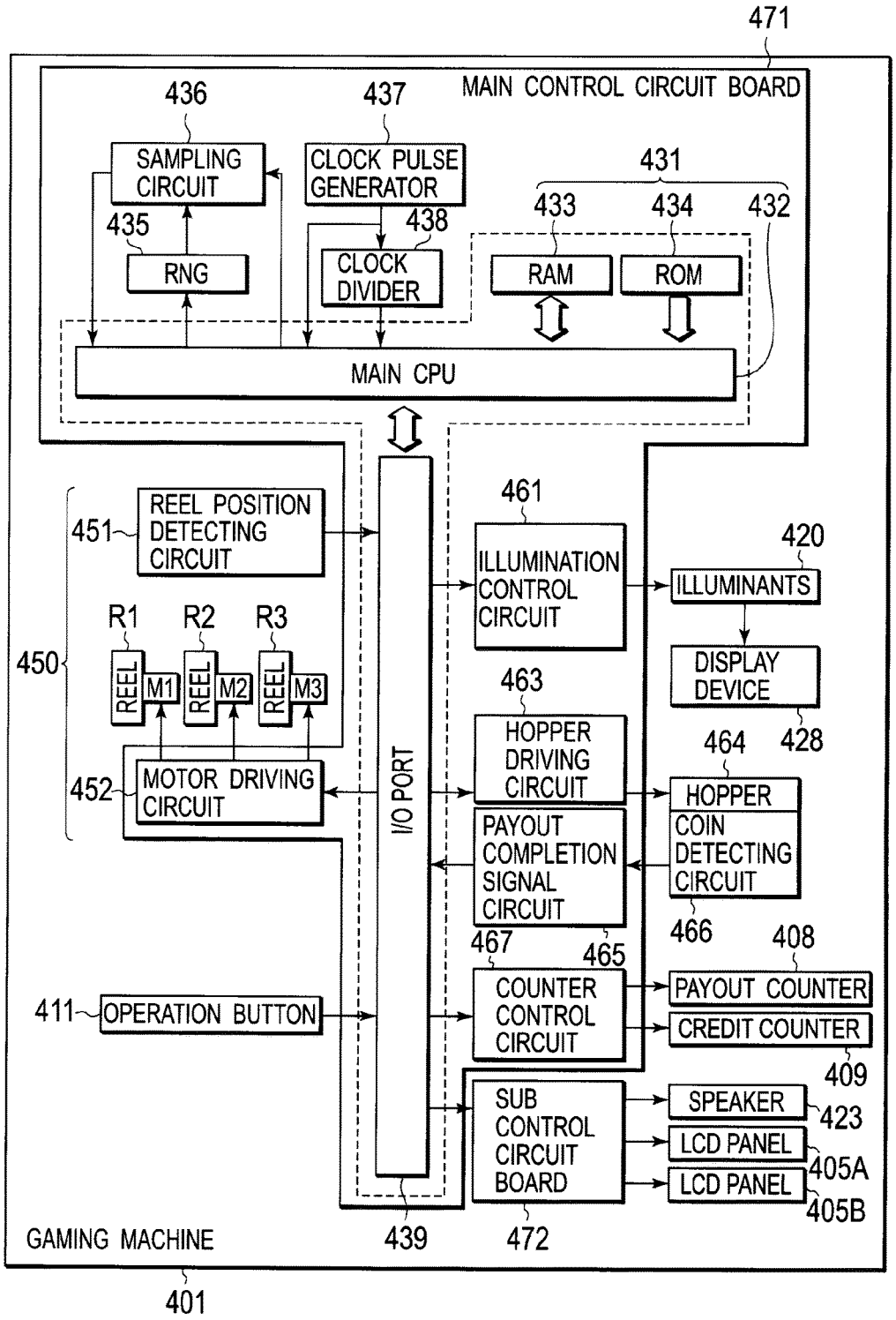
FIG. 42 is a block diagram illustrating an internal arrangement of the entire gaming machine shown in FIG. 1.

FIG. 42 is a block diagram illustrating the internal arrangement of the entire gaming machine 401. As shown in FIG. 42, the gaming machine 401 includes a plurality of components, particularly a main control circuit board 471 having a micro computer 431. The main control circuit board 471 includes the micro computer 431, a Random Number Generator (RNG) 435, a sampling circuit 436, a clock pulse generating circuit 437, a clock divider 438, an illumination control circuit 461, a hopper driving circuit 463, a payout completion signal circuit 465, and a counter control circuit 467.

The micro computer 431 includes a main CPU 432, a RAM 433, and a ROM 434. The main CPU 432 operates in accordance with programs stored in the ROM 434, and communicates signals with other components via an I/O port 439 to control the operation of the entire gaming machine 401. The RAM 433 stores data or programs used by the main CPU 432. For example, the RAM 433 temporarily keeps the random number values sampled by the sampling circuit 436 during the game, and stores the code numbers or symbol numbers of the reels R1 to R3. The ROM 434 stores programs executed by the CPU 432 and permanent data.

The RNG 435 operates in accordance with instructions of the main CPU 432 to generate random numbers within a predefined range. The sampling circuit 436 extracts an arbitrary random number from the random numbers generated by the RNG 435 in accordance with the instructions of the main CPU 432, and outputs the extracted random number to the main CPU 432. The clock pulse generating circuit 437 generates a reference clock for operating the main CPU 432. The clock divider 438 outputs a signal generated by dividing the reference clock by a constant cycle to the main CPU 432.

In addition, a reel drive unit 450 is connected to the main control circuit board 471. The reel drive unit 450 includes a reel position detecting circuit 451 for detecting respective rotation positions of reels R1 to R3, and a motor driving circuit 452 for outputting drive signals to the motors M1 to M3 that rotate the reels R1 to R3. The motors M1 to M3 are actuated to rotate the reels R1 to R3 upon input of the drive signals from the motor driving circuit 452.

Furthermore, the operation buttons 411 (a stop button to which a stop instruction for the reels R1 to R3 is input, a start button, a collect button, bet buttons, or the like) are connected to the main control circuit board 471. A signal is input to the main CPU 432 via the I/O port 439 in response to pressing-down any of the operation buttons 411.

Figure 43:
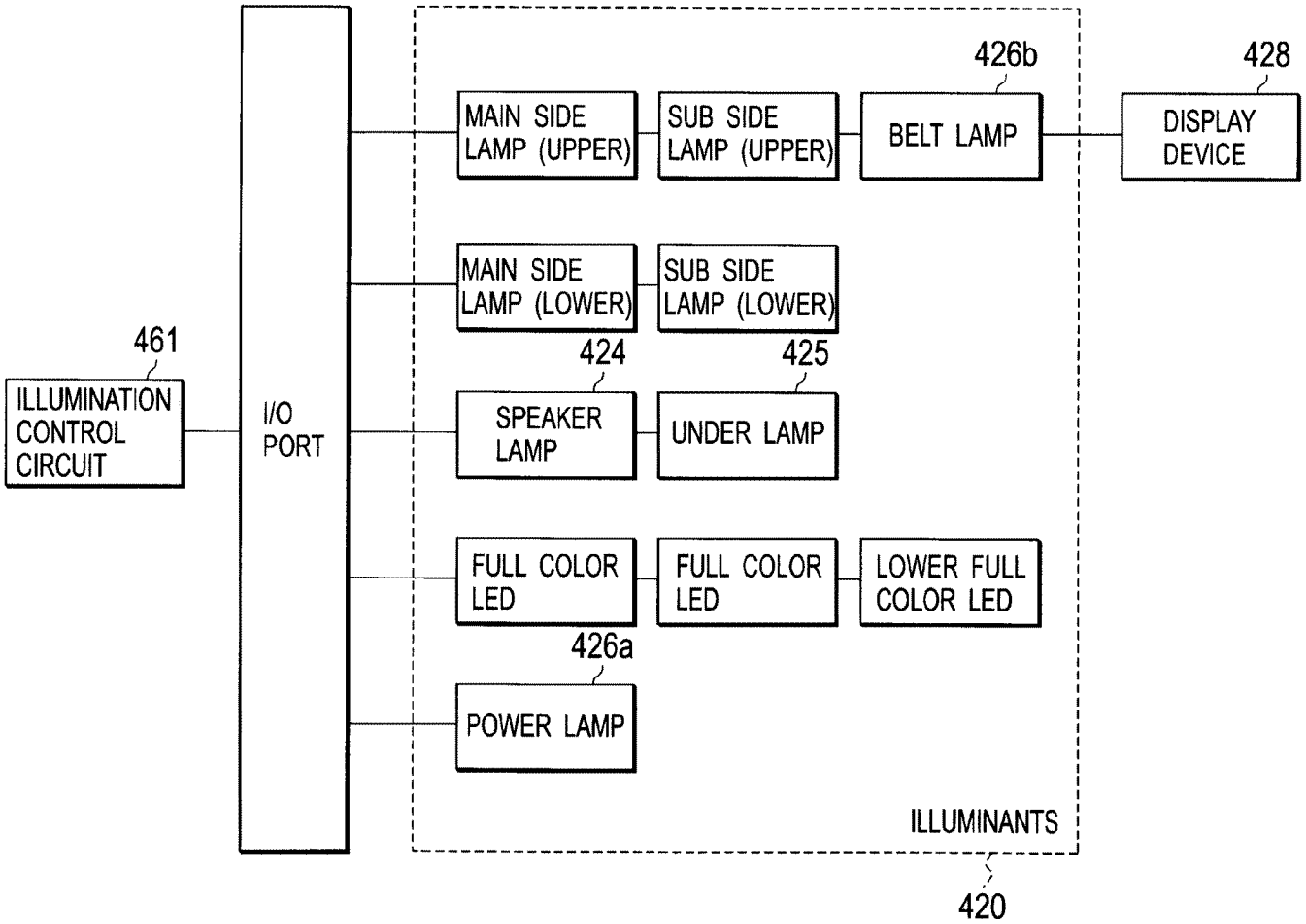
FIG. 43 is a block diagram illustrating an arrangement of illuminants shown in FIG. 2.

The illumination control circuit 461 outputs an effect signal for illuminating the illuminant 420 and the display device 428. The illuminant 420 includes, as shown in FIG. 43, a plurality of lamps including the speaker lamps 424, the under lamps 425, the power lamps 426a and the belt lamps 426b, and other LEDs. The main side lamps and the sub-side lamps in FIG. 43 constitute the side lamps 422 on the limbs 421. In addition, the full color LEDs in FIG. 43 are attached to the sides of the LCD panel 405B to illuminate. The lower full color LEDs illuminate the coin tray 419. Also, the display device 428 is serially connected to the illumination control circuit 461 via the illuminants 420.

The hopper driving circuit 463 (see FIG. 42) drives a hopper 464 in accordance with control of the main CPU 432. The hopper 464 payouts coins to the coin tray 419. A coin detecting circuit 466 is connected to the payout completion signal circuit 465. The payout completion signal circuit 465 receives the payout data (number of paid-out coins) from the coin detecting circuit 466. Furthermore, the payout completion signal circuit 465 outputs a signal indicating the completion of paying out coins to the main CPU 432 when the number of paid-out coins reaches a preset value. The coin detecting circuit 466 counts the number of coins paid out by the hopper 464 and outputs the counted value data to the payout completion signal circuit 465. The counter control circuit 467 controls presentation of various counters and displays such as the payout counter 408 or the credit counter 409.

Figure 44:
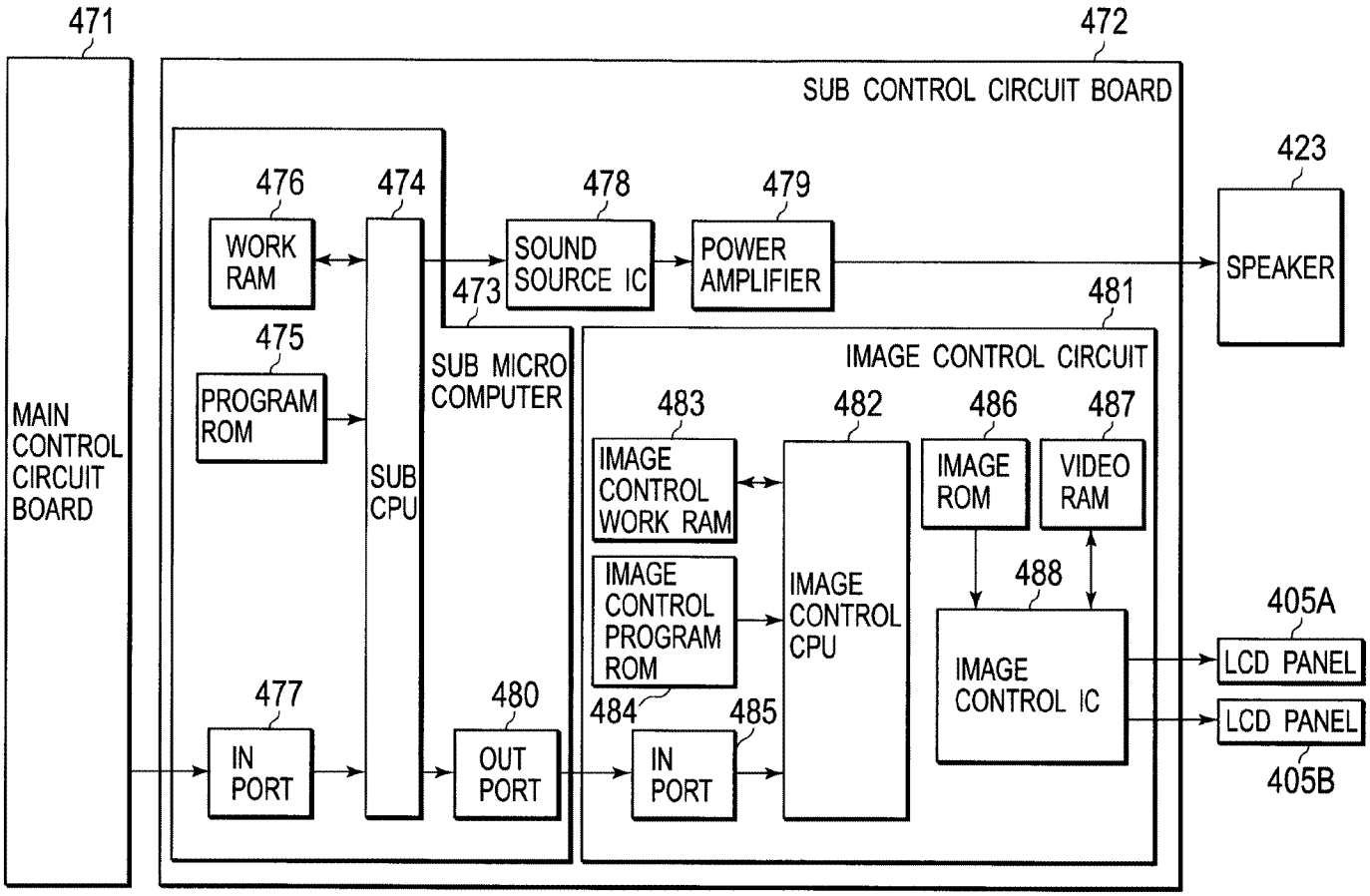
FIG. 44 is a block diagram illustrating an internal arrangement of a sub-control circuit board shown in FIG. 2.

Furthermore, as shown in FIG. 42, a sub-control circuit board 472 is connected to the main control circuit board 471. As shown in FIG. 44, the sub-control circuit board 472 receives the command from the main control circuit board 471 to control presentation on the LCD panel 405A of the upper display 404A and the LCD panel 405B of the center display 404B, and to control audio output from the speakers 423. The circuit board of the sub-control circuit board 472 is configured differently from the circuit board of the main control circuit board 471. The sub-control circuit board 472 has a sub-micro computer 473 as its main component and includes a sound source IC 478, a power amplifier 479, and an image control circuit 481. The sound source IC 478 controls audio output from the speakers 423. The image control circuit 481 functions as a display control unit of the LCD panels 405A and 405B.

The sub-micro computer 473 includes a sub-CPU 474, a program ROM 475, a work RAM 476, and I/O ports 477 and 480. The sub-CPU 474 executes controls in accordance with the control command transmitted from the main control circuit board 471. The program ROM 475 and the work RAM 476 function as storage units. Although the sub-control circuit board 472 does not have a clock pulse generator, a clock divider, an RNG, and a sampling circuit, it can executes random number sampling by the program running on the sub-CPU 474. The program ROM 475 stores the control programs executed by the sub-CPU 474. The work RAM 476 functions as a temporary storage unit when executing the control programs on the sub-CPU 474.

The image control circuit 481 includes an image control CPU 482, an image control work RAM 483, an image control program ROM 484, an image ROM 486, a video RAM 487, and an image control IC 488. The image control CPU 482 determines, based on the parameters set in the sub-micro computer 473, the images to be displayed on the LCD panels 405A and 405B in accordance with the image control programs stored in the image control program ROM 484.

The image control program ROM 484 stores the image control programs and various selection tables relating to presentation on the LCD panels 405A and 405B. The image control work RAM 483 functions as the temporary storage unit when the image control programs is executes by the image control CPU 482. The image control IC 488 generates the image in accordance with the content determined by the image control CPU 482 and outputs the image signals to the LCD panels 405A and 405B.

The image ROM 486 stores dot data for generating images. The video RAM 487 functions as the temporary storage unit when the image is generated by the image control IC 488.

Figure 45:
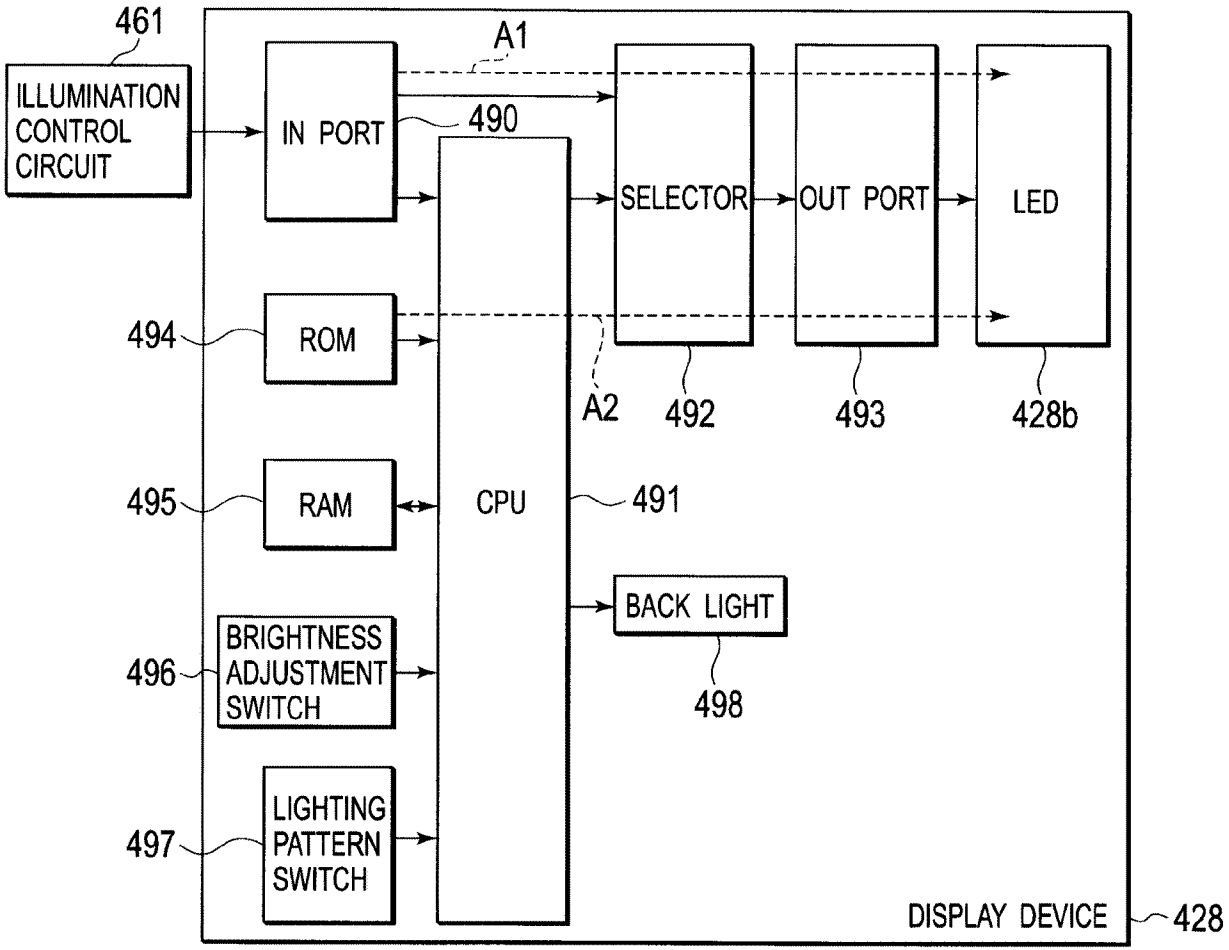
FIG. 45 is a block diagram illustrating an internal arrangement of the display device shown in FIG. 2.

FIG. 45 is a block diagram illustrating the internal configuration of the display device 428 of the gaming machine 401. As shown in FIG. 45, the display device 428 includes an IN port 490, a CPU 491, a selector 492, and an OUT port 493. The IN port 490 receives information from the illumination control circuit 461. The CPU 491 executes various arithmetic processes. The selector 492 selects and outputs the effect signals. The OUT port 493 sends the effect signals to the LEDs 428b.

The IN port 490 is serially connected to the illumination control circuit 461 of the main control circuit board 471 via the illuminant 420, as stated above. The IN port 490 is an effect information receiving unit, which receives effect information (referred to as the first effect information, hereafter) relating to illumination (lighting effects) of the display device 428 from the illumination control circuit 461. The first effect information includes effect content information such as lighting pattern of respective LEDs 428b. Thus, the LEDs 428b, which constitute the effect producing unit, performs illumination in accordance with the effect content information included in the first effect information, when the first effect information is output as the effect signals from the OUT port 493. Here, the first effect information received by the IN port 490 is output in parallel to the CPU 491 and the selector 492.

The ROM 494 and RAM 495, which are the effect information storage units, are connected to the CPU 491. Effect information (referred to as the second effect information, hereafter) relating to illumination (lighting effect) of the display device 428 is stored in the ROM 494. The second effect information includes, as with the first effect information, effect content information such as lighting pattern of respective LEDs 428b. However, the effect content information included in the second effect information is different from the effect content information included in the first effect information.

When a predefined effect producing condition is satisfied, the CPU 491 outputs the effect signal to the selector 492, in accordance with the effect content information included in the second effect information stored in the ROM 494. The CPU 491 also sends a switching command for outputting the above-mentioned effect signal in place of the first effect information to the selector 492. Here, the predefined effect producing condition in the present embodiment assumes that there is no input of the first effect information from the IN port 490 to the CPU 491. In other words, if there is no input of the first effect information from the IN port 490 to the CPU 491, the effect signal corresponding to the second effect information and the switching command are output to the selector 492. Here, without being limited to the above-mentioned condition, the effect producing condition may include elapse of a predefined time period, arrival of predefined time, reception of specific signals from the illumination control circuit 461, or the like.

Based on the signals from the CPU 491, the selector 492 outputs either the effect signal in accordance with the first effect information from the IN port 490 or the effect signal in accordance with the second effect information from the CPU 491 to the LEDs 428b via the OUT port 493. In other words, an effect signal output unit is constituted with the CPU 491, the selector 492 and the OUT port 493 as mentioned above. Based on the predefined effect producing condition, the effect signal output unit outputs either the effect signal based on the first effect information received by the IN port 490 or the effect signal based on the second effect information stored in the ROM 494 to the LEDs 428b.

Furthermore, the CPU 491 is connected with a brightness adjustment switch 496, a lighting pattern switch 497, and a back light 498. The brightness adjustment switch 496 is a DIP switch for setting the ON/OFF time interval of the duty control to adjust the brightness of the LEDs 428b. The brightness adjustment switch 496 provides multistage (e.g., four stages) brightness adjustment settings. The lighting pattern switch 497 is used for setting the lighting pattern of the LEDs 428b as the after-mentioned effect change condition. In the exemplary control described below, settings by the lighting pattern switch 497 will be the effect change condition. The lighting pattern switch 497 sets various lighting patterns. The current setting of the lighting pattern can be confirmed by checking the lighting/blinking of the specific LED(s) 428b. The back light 498 is a lighting unit which illuminates the plastics panel 428a of the display device 428 in accordance with signals from the CPU 491. For example, a cold cathode tube or the like may be employed as the back light 498.

Figure 46:
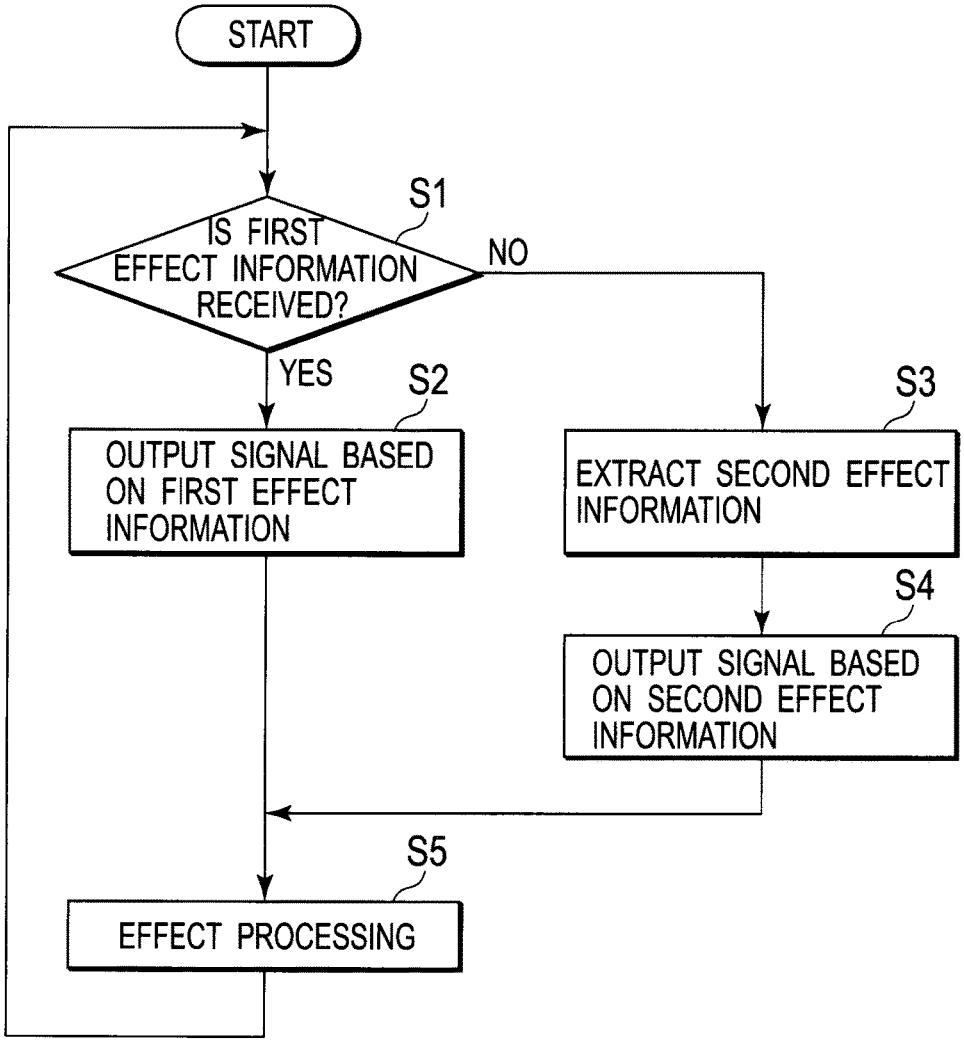
FIG. 46 is a flow diagram illustrating a procedure of effect processing in the display device according to the present invention.

Next, a procedure of effect processing in the display device 428 will be described, referring to FIG. 46.

The CPU 491 determines whether or not the IN port 490 has received the first effect information, by monitoring the first effect information from the IN port 490 constantly or intermittently (step S1). Here, if the IN port 490 has not received the first effect information (NO in step S1), the above-mentioned predefined effect producing condition is met. If, otherwise, reception of the first effect information from the IN port 490 has been detected (YES in step S1), the CPU 491 outputs the effect signal in accordance with the first effect information to the selector 492. The effect signal in accordance with the first effect information is output from the selector 492 to the LED 428b via the OUT port 493 (step S2).

On the other hand, if reception of the first effect information from the IN port 490 has not been detected (NO in step S1), the CPU 491 extracts the second effect information from the ROM 494 (step S3). And then, the CPU 491 outputs the effect signal in accordance with the second effect information and the switch command to the selector 492. The switch command is the command the selector 492 to output the effect signal including the second effect information to the LEDs 428a as mentioned above. The effect signal in accordance with the second effect information is output from the selector 492 to the LEDs 428b via the OUT port 493 (step S4).

The LEDs 428b then produce the effect in accordance with the effect signal from the OUT port 493 (step S5). The abovementioned steps S1 to S5 are repeated as the effect processing on the display device 428. Thus, the LEDs 428b produces illumination in accordance with the effect signal including the first effect information as shown by the arrow A1 in FIG. 45, if the first effect information has been input to the display device 428 from the illumination control circuit 461. On the other hand, the LEDs 428b produces illumination in accordance with the effect signal including the second effect information stored in the ROM 494 as shown by the arrow A2 in FIG. 45, if the first effect information has not been input to the display device 428 from the illumination control circuit 461.

In other words, with the display device 428, the LEDs 428b can not only illuminate in accordance with the effect signal including the first effect information from external, but also illuminate in accordance with the effect signal including the second effect information stored in the ROM 494. Therefore, more variations of the effect can be enabled and more abundant attractive effects can be produced. Furthermore, the effects by the second effect information can be continued, even if the first effect information from the illumination control circuit 461 has not been input to the display device 428 due to disconnection of signal lines or the like.

Additionally, in the above-mentioned embodiment, the display device 428 need not store the effect content information since the effect content information of the LEDs 428b is included in the first effect information. In other words, the display device 428 need not newly provide a storage unit or allocate a recording area in the ROM 494 for the abovementioned effect content information, whereby the recording area of the display device 428 can be utilized efficiently.

However, it is also possible to store at least some of the effect content information in the ROM 494. In this case, the CPU 491 extracts the stored effect content information when the first effect information has been input to the IN port 490, and then outputs it to the LEDs 428b. For example, the effect content information with regard to the lighting pattern of the LEDs 428b is stored in the ROM 494. On the other hand, the first effect information includes only the lighting timing as the effect content information. In this case, the CPU 491 extracts the effect content information relating to the lighting pattern from the ROM 494 when the first effect information has been input to the IN port 490, and then outputs it to the LEDs 428b. The LEDs 428b illuminates based on the lighting pattern from the CPU 491 and the lighting timing from the IN port 490.

Furthermore, in the above-mentioned embodiment, the display device 428 is serially connected to the illumination control circuit 461 of the main control circuit board 471 via the illuminants 420 (see FIG. 43). With such a serial connection, illuminants 420 or effect producing units can be added easily. Also, wiring required for connections can be reduced.

Furthermore, in the above-mentioned embodiment, one set of the second effect information is stored in the ROM 494. However, a plurality of sets of the second effect information including different effect content may be stored in the ROM 494. In this case, the CPU 491 selects and extracts one set among the plurality of sets of the second effect information in step S3 of the above-mentioned effect processing (see FIG. 46). Then, in step S4, the effect signal including the second effect information selected in step S3 is output to the LEDs 428b. As thus described, the display device 428 can produce a variety of effects depending on selection by the CPU 491 among the plurality of the second effect information stored in the ROM 494.

Additionally, in the case wherein the plurality of the second effect information is stored in the ROM 494, the CPU 491 may change the second effect information to be extracted from the ROM 494 in step S3, each time the effect change condition is met (NO in step S1). Here, the effect change condition may be elapse of a predefined time period or arrival of a predefined time, whether or not a change signal has been received from the illumination control circuit 461, setting content of the lighting pattern switch 497, or the like. With case wherein the second effect information is changed in accordance with the setting content of the lighting pattern switch 497, the second effect information can be arbitrarily selectable in accordance with the setting operation of the lighting pattern switch 497.

As thus described, the display device 428 can produce a variety of effects in accordance with the effect change condition by changing the second effect information to be extracted from the ROM 494 in accordance with the effect change condition. However, it is not always necessary to change the second effect information to be extracted from the ROM 494, and a variety of effects can be produced only by extracting the second effect information at random whenever the effect change condition is met.

In the above-mentioned description, an example has been described in which the effect producing unit is the display device 428. However, the entire gaming machine 401 including the display device 428 can also be the effect producing unit. In this case, the gaming machine 401 includes a system equivalent to that of the block diagram of the display device 428 shown in FIG. 45, and receives the first effect information from external of the gaming machine 401 (e.g., another gaming machine or gaming server). The gaming machine 401 then generates (outputs), in accordance with a predefined effect producing condition, either an effect signal based on the first effect information or an effect signal based on the second effect information stored in the effect information storage unit (e.g., ROM 434) of the gaming machine 401. The gaming machine 401 then produces the effect in accordance with the effect signal on the effect producing unit (e.g., illuminants 420 and speakers 423). As thus described, with case wherein the gaming machine 401 itself is the effect producing unit, more variations of the effect can be enabled and more abundant attractive effects can be produced, as with the case wherein the display device 428 is the effect producing unit.

Various modifications are possible to the present invention, which is not limited to the above-mentioned embodiments. For example, the effect producing unit is not limited to the LEDs 428b which performs illuminations (lighting effect), and may be devices producing sound effects or image effects.

What is claimed is:

[1. A gaming machine comprising:

a cabinet, a door provided on a front face of the cabinet and attaching to the cabinet at an attachment plane extending from an uppermost portion of the door to a lowermost portion of the door, that when opened protrudes laterally outward from a side face of the cabinet, and an effect producing unit configured to produce effects to a game and provided on the side face of the cabinet and protruding laterally outward from the side face of the cabinet, wherein the effect producing unit is located at a vertical position between the uppermost and lowermost portions of the door, the door and the effect producing unit do not come into contact when the door is fully opened, and when the door is opened more than 90 degrees and the door is protruded laterally outward from the side face of the cabinet, the effect producing unit fully hides behind the door not to be seen from any view point which is disposed in front of the front face and on a geometric center of the front face.]

[2. The gaming machine according to claim 1, further comprising:

a display installed on the front face of the cabinet configured to display information relating to the game, an operation unit disposed on the front face of the cabinet configured to allow a player to input instructions relating to the game, wherein the display is disposed above the operation unit, and the effect producing unit is disposed above the operation unit and below the display.]

[3. The gaming machine according to claim 1, wherein the front face of the effect producing unit and the front face of the display are parallel.]

[4. The gaming machine according to claim 2, wherein the effect producing unit includes a sound source unit which outputs sound.]

[5. The gaming machine according to claim 1, wherein the effect producing unit includes a first sound source unit which is configured to output sound and the first sound source unit is disposed on one side face of the cabinet, and further comprising a second sound source unit which is disposed on another side face of the cabinet opposite from the one side face of the cabinet.]

[6. The gaming machine according to claim 5, wherein a plurality of illuminants are arranged on the front face of the first and second sound source units.]

[7. The gaming machine according to claim 1, wherein the door includes a hinge at the side edge and is configured to swing with the hinge as an axis.]

[8. The gaming machine according to claim 7, wherein when the door is opened wider than 90 degrees, the hinge provides a force to keep the door open.]

[9. The gaming machine according to claim 1, wherein the door includes a first door which opens and closes an entire front face of the cabinet and a second door which is provided on the front face of the first door and configured to open and close a part of the first door.]

[10. The gaming machine according to claim 1, wherein the effect producing unit is at a vertical position on the side face of the cabinet that is below a top most portion of the door.]

*11. A concealed lighting arrangement of a display of a gaming machine, the gaming machine comprising:*

*a cabinet including front and rear sides, top and bottom sides, and a pair of lateral sides;*

*a display disposed on the front side of the cabinet, the display comprising at least one of a display screen and a display window, the display having a front display face, the display configured to display game information in a direction that is generally frontward of the cabinet, wherein,*

*the concealed lighting arrangement comprises:*

*a plurality of light emitting devices disposed on the front side of the cabinet, proximate a perimeter of the display, and at a position that is rearward of the front display face of the display, wherein,*

*the light emitting devices are concealed from direct view from a position at the front side of the cabinet such that only that light emitted by the light emitting devices, and reflected, is viewable from the position at the front side of the cabinet.*

*12. The concealed lighting arrangement of claim 11, wherein the plurality of light emitting devices are configured to emit light in a direction that is transverse the frontward direction that the game information is displayable by the display.*

*13. The concealed lighting arrangement of claim 11, wherein the plurality of light emitting devices are configured to emit light in a direction that is generally opposite the frontward direction that the game information is displayable by the display.*

*14. The concealed lighting arrangement of claim 11, further comprising a display frame member disposed along a periphery of the display, the frame member including a front douser having an inner perimeter side and an outer perimeter side, the inner perimeter side forming a frame member opening through which the game information is displayable in the generally frontward direction, wherein*

*the plurality of light emitting devices are disposed along a side of the frame member at a position that is behind the front douser and between the inner perimeter side and the outer perimeter side of the front douser; and wherein,*

*the front douser of the frame member is opaque with respect to light emitted by the plurality of light emitting devices, and the frame member includes a plurality of light transmitting portions that refract light emitted by the plurality of light emitting devices, the light transmitting portions disposed at a position that is behind the front douser.*

*15. The concealed lighting arrangement of claim 14, wherein each of the light transmitting portions comprises a lens for distributing light emitted from at least one of the plurality of light emitting devices.*

*16. The concealed lighting arrangement of claim 11, wherein the cabinet further comprises a reflecting surface configured to reflect light emitted by the plurality of light emitting devices, the reflecting surface including a portion thereof that is disposed at a position that is rearward of the plurality of light emitting devices.*

*17. The concealed lighting arrangement of claim 16, wherein the reflecting surface comprises a non-smooth portion configured to diffuse light.*

*18. The concealed lighting arrangement of claim 16, wherein the light emitting devices are disposed so as to emit light in a direction that is toward the reflecting surface.*

*19. The concealed lighting arrangement of claim 16, wherein the reflecting surface is disposed at a side of the display such that light reflected therefrom is directed in a direction that is generally frontward of the gaming machine.*

*20. The concealed lighting arrangement of claim 19, wherein a portion of the reflecting surface is concave relative to the front display face.*

*21. The concealed lighting arrangement of claim 20, wherein the concave portion of the reflecting surface is angled inward and toward the display such that light reflected by the concave reflecting surface is directed toward a position that is frontward of the cabinet.*

*22. The concealed lighting arrangement of claim 11, wherein the display is a component of a door of the gaming machine, the door pivotable about an axis.*

*23. The concealed lighting arrangement gaming machine of claim 11 further comprising an operation unit that is provided on the cabinet and allows a player to input operations relative to a game.*

* * * * *